US012656866B2

(12) United States Patent
Bao et al.

(10) Patent No.: US 12,656,866 B2
(45) Date of Patent: Jun. 16, 2026

(54) DEVICES AND METHODS WITH SUBSTRATE-LESS NANOMESH SENSORS

(71) Applicant: The Board of Trustees of the Leland Stanford Junior University, Stanford, CA (US)

(72) Inventors: Zhenan Bao, Stanford, CA (US); Kyun Kyu Kim, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 100 days.

(21) Appl. No.: 18/534,414

(22) Filed: Dec. 8, 2023

(65) Prior Publication Data

US 2024/0201782 A1 Jun. 20, 2024

Related U.S. Application Data

(60) Provisional application No. 63/431,306, filed on Dec. 8, 2022.

(51) Int. Cl.
*G06F 3/01* (2006.01)
*G06F 1/16* (2006.01)

(52) U.S. Cl.
CPC .............. *G06F 3/015* (2013.01); *G06F 1/163* (2013.01); *G06F 3/017* (2013.01)

(58) Field of Classification Search
CPC .......... G06F 3/015; G06F 1/163; G06F 3/017; G06F 3/014
See application file for complete search history.

(56) References Cited

U.S. PATENT DOCUMENTS 9,841,331 B2    12/2017  Wood et al.
10,151,649 B2   12/2018  Lewis et al.
(Continued)

FOREIGN PATENT DOCUMENTS

CN          106527738 B      6/2019

OTHER PUBLICATIONS

Tech at Meta: Reality Labs. "Inside Facebook Reality Labs: Wrist-based interaction for the next computing platform." Meta, Mar. 18, 2021, 18 pgs. https://tech.fb.com/ar-vr/2021/03/inside-facebook-reality-labs-wrist-based-interaction-for-the-next-computing-platform/.
(Continued)

*Primary Examiner* — Jeff Piziali
(74) *Attorney, Agent, or Firm* — Mueting Raasch Group

(57) ABSTRACT
In certain examples, methods include directly applying a nanomesh in a substrate-less form, including a multitude of conductive strands connected to a sensing circuit, to a non-rigid portion (e.g., skin) of a user, and causing the multitude of conductive strands to conform to the user portion; and causing output signals to be generated, in response to movement of the user portion and to the multitude of conductive strands stretching, to indicate the movement of the user portion while the nanomesh is secured to or against the user portion. In more particular examples which simplify and provide more accurate sensing measurements, a liquid form of nanomesh is directly applied over the user portion (e.g., spanning multiple moveable user joints) and without a substrate against the user portion, and logic circuitry is trained to interpret motions of the user based on changes in the nanomesh's conductance during the motions.

20 Claims, 55 Drawing Sheets

(56) References Cited

U.S. PATENT DOCUMENTS

| | | | | |
|---|---|---|---|---|
| 10,528,135 | B2 | 1/2020 | Bailey et al. | |
| 10,602,965 | B2 | 3/2020 | Connor | |
| 11,291,114 | B2* | 3/2022 | Someya | A61B 5/263 |
| 2012/0172682 | A1* | 7/2012 | Linderman | A61B 5/389 |
| | | | | 600/300 |
| 2014/0238153 | A1* | 8/2014 | Wood | A43B 23/029 |
| | | | | 73/862.627 |
| 2015/0019135 | A1* | 1/2015 | Kacyvenski | G01P 7/00 |
| | | | | 702/19 |
| 2017/0249041 | A1* | 8/2017 | Moller | G06F 3/016 |
| 2018/0271393 | A1* | 9/2018 | Lee | A61F 7/007 |
| 2018/0340847 | A1* | 11/2018 | Pan | A41D 1/002 |
| 2020/0333829 | A1* | 10/2020 | Martinez | D21H 21/20 |
| 2021/0002816 | A1* | 1/2021 | Doshi | A61B 5/112 |
| 2021/0106813 | A1* | 4/2021 | Fan | A61N 1/0484 |
| 2021/0215554 | A1* | 7/2021 | Araromi | A61B 5/6843 |
| 2021/0309877 | A1* | 10/2021 | Gao | G06F 3/0443 |
| 2022/0055340 | A1* | 2/2022 | Toyosu | H05K 3/022 |
| 2022/0199286 | A1* | 6/2022 | Someya | H01B 7/06 |
| 2023/0305633 | A1* | 9/2023 | Wagner | G06F 3/0346 |
| 2023/0309829 | A1* | 10/2023 | Khbeis | A61B 5/6801 |
| | | | | 200/238 |
| 2024/0077949 | A1* | 3/2024 | Wagner | G10L 17/22 |
| 2024/0231489 | A1* | 7/2024 | Kao | G06F 3/016 |
| 2025/0000419 | A1* | 1/2025 | Lee | A61B 5/4205 |
| 2025/0152064 | A1* | 5/2025 | Connor | A41D 1/002 |

OTHER PUBLICATIONS

Liu, Longhui, et al. "Recent advances in printed liquid metals for wearable healthcare sensors: A review." Journal of Physics D: Applied Physics 55.28 (2022): 283002. (Abstract only).

Qiao, Yancong, et al. "Substrate-free multilayer graphene electronic skin for intelligent diagnosis." ACS Applied Materials & Interfaces 12.44 (2020): 49945-49956. (Abstract only).

Takakuwa, Masahito, et al. "Direct gold bonding for flexible integrated electronics." Science Advances 7.52 (2021): eabl6228.

Glauser, Oliver, et al. "Interactive hand pose estimation using a stretch-sensing soft glove." ACM Transactions on Graphics (ToG) 38.4 (2019): 1-15.

Zheng, Feng. "Learning the signatures of the human grasp using a scalable tactile glove." Journal of Semiconductors 40.7 (2019): 070202.

Zhou, Zhihao, et al. "Sign-to-speech translation using machine-learning-assisted stretchable sensor arrays." Nature Electronics 3.9 (2020): 571-578.

Miyamoto, Akihito, et al. "Inflammation-free, gas-permeable, light-weight, stretchable on-skin electronics with nanomeshes." Nature nanotechnology 12.9 (2017): 907-913.

Wang, Jane X. "Meta-learning in natural and artificial intelligence." Current Opinion in Behavioral Sciences 38 (2021): 90-95.

Sundaram, Subramanian, et al. "Learning the signatures of the human grasp using a scalable tactile glove." Nature 569.7758 (2019): 698-702. (Abstract only).

Luo, Yiyue, et al. "Learning human-environment interactions using conformal tactile textiles." Nature Electronics 4.3 (2021): 193-201.

Chun, Sungwoo, et al. "An artificial neural tactile sensing system." Nature Electronics 4.6 (2021): 429-438. (Abstract only).

Caesarendra, Wahyu, et al. "EMG finger movement classification based on ANFIS." Journal of Physics: conference series. vol. 1007. IOP Publishing, 2018.

Moin, Ali, et al. "A wearable biosensing system with in-sensor adaptive machine learning for hand gesture recognition." Nature Electronics 4.1 (2021): 54-63.

Kim, Kyun Kyu, et al. "A deep-learned skin sensor decoding the epicentral human motions." Nature communications 11.1 (2020): 2149.

Yan, Youcan, et al. "Soft magnetic skin for super-resolution tactile sensing with force self-decoupling." Science Robotics 6.51 (2021): eabc8801.

You, Insang, et al. "Artificial multimodal receptors based on ion relaxation dynamics." Science 370.6519 (2020): 961-965.

Kaltenbrunner, Martin, et al. "An ultra-lightweight design for imperceptible plastic electronics." Nature 499.7459 (2013): 458-463.

Tang, Lixue, Jin Shang, and Xingyu Jiang. "Multilayered electronic transfer tattoo that can enable the crease amplification effect." Science Advances 7.3 (2021): eabe3778.

Araromi, Oluwaseun A., et al. "Ultra-sensitive and resilient compliant strain gauges for soft machines." Nature 587.7833 (2020): 219-224. (Abstract only).

Lee, Sunghoon, et al. "Nanomesh pressure sensor for monitoring finger manipulation without sensory interference." Science 370.6519 (2020): 966-970.

Wang, Y. et al. A durable nanomesh on-skin strain gauge for natural skin motion monitoring with minimum mechanical constraints. Sci. Adv. 6, eabb7043 (2020).

Hendrycks, Dan, and Kevin Gimpel. "A baseline for detecting misclassified and out-of-distribution examples in neural networks." arXiv preprint arXiv:1610.02136 (2016).

Shimodaira, Hidetoshi. "Improving predictive inference under covariate shift by weighting the log-likelihood function." Journal of statistical planning and inference 90.2 (2000): 227-244.

Choi, Suji, et al. "Highly conductive, stretchable and biocompatible Ag—Au core-sheath nanowire composite for wearable and implantable bioelectronics." Nature nanotechnology 13.11 (2018): 1048-1056.(Abstract only).

Kim, Kyun Kyu, et al. "Highly sensitive and stretchable multidimensional strain sensor with prestrained anisotropic metal nanowire percolation networks." Nano letters 15.8 (2015): 5240-5247.

Ershad, Faheem, et al. "Ultra-conformal drawn-on-skin electronics for multifunctional motion artifact-free sensing and point-of-care treatment." Nature communications 11.1 (2020): 3823.

Wu, Zhirong, et al. "Unsupervised feature learning via non-parametric instance discrimination." Proceedings of the IEEE conference on computer vision and pattern recognition. 2018.

Hjelm, R. Devon, et al. "Learning deep representations by mutual information estimation and maximization." arXiv preprint arXiv:1808.06670 (2018).

Kim, Dooyoung, et al. "Semi-supervised gait generation with two microfluidic soft sensors." IEEE robotics and automation letters 4.3 (2019): 2501-2507.

He, Kaiming, et al. "Momentum contrast for unsupervised visual representation learning." Proceedings of the IEEE/CVF conference on computer vision and pattern recognition. 2020.

Chen, Ting, et al. "A simple framework for contrastive learning of visual representations." International conference on machine learning. PmLR, 2020.

Iwana, Brian Kenji, and Seiichi Uchida. "Time series data augmentation for neural networks by time warping with a discriminative teacher." 2020 25th International Conference on Pattern Recognition (ICPR). IEEE, 2021.

McInnes, Leland, John Healy, and James Melville. "Umap: Uniform manifold approximation and projection for dimension reduction." arXiv preprint arXiv:1802.03426 (2018).

Mahmood, Musa, et al. "Fully portable and wireless universal brain-machine interfaces enabled by flexible scalp electronics and deep learning algorithm." Nature Machine Intelligence 1.9 (2019): 412-422.

Kim, Dooyoung, et al. "Deep full-body motion network for a soft wearable motion sensing suit." IEEE/ASME Transactions on Mechatronics 24.1 (2018): 56-66.

Wen, Feng, et al. "Machine learning glove using self-powered conductive superhydrophobic triboelectric textile for gesture recognition in VR/AR applications." Advanced science 7.14 (2020): 2000261.

Wang, Ming, et al. "Gesture recognition using a bioinspired learning architecture that integrates visual data with somatosensory data from stretchable sensors." Nature Electronics 3.9 (2020): 563-570.

Edin, Benoni B. "Quantitative analyses of dynamic strain sensitivity in human skin mechanoreceptors." Journal of neurophysiology 92.6 (2004): 3233-3243.

(56) References Cited

OTHER PUBLICATIONS

Johansson, Roland S., and J. Randall Flanagan. "Coding and use of tactile signals from the fingertips in object manipulation tasks." Nature Reviews Neuroscience 10.5 (2009): 345-359.

Grill, Stephen E., and Mark Hallett. "Velocity sensitivity of human muscle spindle afferents and slowly adapting type II cutaneous mechanoreceptors." The Journal of Physiology 489.2 (1995): 593-602.

Kim, Dae-Hyeong, et al. "Epidermal electronics." science 333.6044 (2011): 838-843.

Ko, Dongwook, et al. "Critical work of adhesion for economical patterning of silver nanowire-based transparent electrodes." Journal of Materials Chemistry A 7.24 (2019): 14536-14544. (Abstract only).

* cited by examiner

| Ref | This work | Wearable Glove [12] | Wearable Glove [16] | Wearable EMG [17] | Skin-like strain [19] | Skin-like EEG [43] | Soft strain sensor [23] | Tactile textiles [11] | Soft Strain sensor [44] | Textile Glove [45] | Vision and strain sensor [46] |
|---|---|---|---|---|---|---|---|---|---|---|---|
| Sensor structure | Direct printed substrate-less nanomesh | Glove + Conductive thread sensor | Glove + Conductive yarn | PET+ Screen printed silver ink | Polyimide+ Laser induced crack | Serpentine electrodes through micro-fabrication | Sleeve + laser-machined carbon fiber polymer composites | Glove + Conductive yarn | Wearable suit + liquid metal sensor | Glove + triboelectric textile | Hydrogel layer + carbon nanotube sensor |
| Sensing Target | Task & user agnostic | Object | Gesture | Gesture | Gesture | Command | Gesture | Gesture, object | Gesture | Gesture | Gesture |
| Function | Keyboard typing 4 Command 6 objects | 26 objects | 10 sign languages | 13 Gestures | 5 gestures | 5 Command signals | 3 gestures/hand opening | 10 letter objects 10 poses 9 actions | Motion tracking for 3 motion flow | 11 two hand gestures 3 gestures for different games | 10 gesture comments |
| Learning Method | Unsupervised Meta learning | Supervised Learning | Supervised Learning | HD Computing | Supervised Learning | Supervised Learning | Supervised Learning | Supervised Learning | Supervised Learning | Supervised Learning | Supervised Learning |
| Data Samples | Unlabeled random motions (900 s) Few-shot transfer (1 ~ 5 shots) | Labeled 1,353 shots | Labeled 440 shots/class | Labeled 4 s window per gesture | Labeled 50 shots/class (train) 5 shots (transfer) | Labeled 450 shots/class | 3 data Collection session (a single 25 s session for testing data) | 82,836 frames (Pose classification) 62,932 frames (Letter classification) 90,295 frames (Action classification) | 7560 frames for each motion sequence | 200 samples per class (two hand gestures) 120 samples per class (games) | 2000 samples of hand image and somato-sensory pairs for training |
| Multi-user adaptation | O | X | X | O | △ | X | X | X | X | X | △ |
| Multi-task adaptation | O | X | X | X | X | X | X | X | X | X | X |
| No Layer modification | O | X | X | O | O | X | X | X | X | X | X |
| Skin conformability | O | X | △ | O | O | O | X | X | X | X | O |

FIG. 5

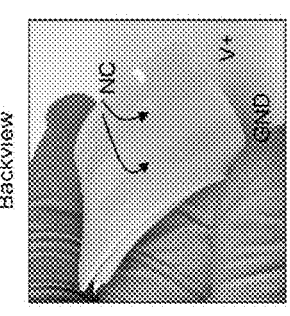
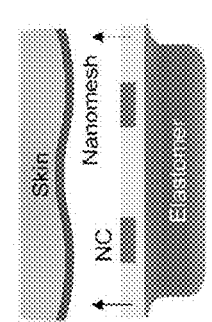
FIG. 7A
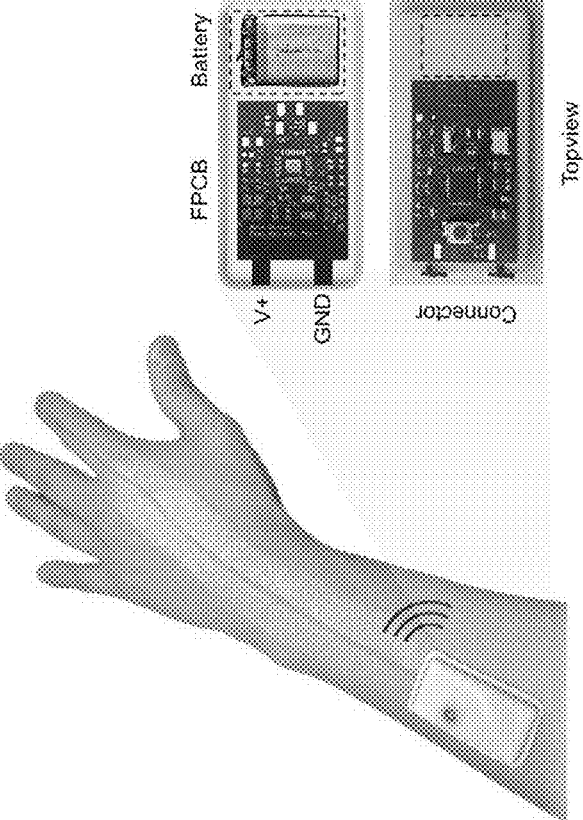
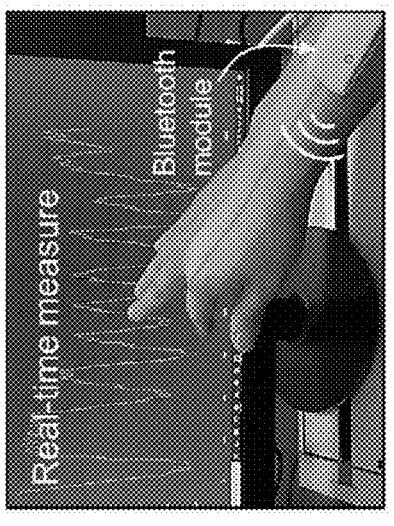
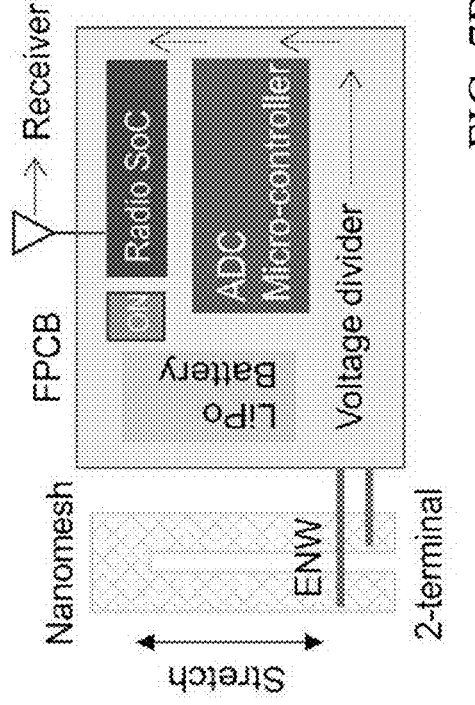
FIG. 7B

| | Jittering | Elongation | Cropping | Magwrap | Shifting | No Aug |
|---|---|---|---|---|---|---|
| Average | 0.820521 | 0.621565 | 0.554313 | 0.503792 | 0.545877 | 0.610853 |
| Max | 0.88626 | 0.75829 | 0.68246 | 0.69668 | 0.69668 | 0.7109 |
| Epoch 1 | 0.74882 | 0.51185 | 0.54028 | 0.48341 | 0.45972 | 0.62559 |
| Epoch 20 | 0.85308 | 0.63981 | 0.54502 | 0.43128 | 0.36493 | 0.60664 |
| Epoch 40 | 0.88152 | 0.63033 | 0.48341 | 0.57346 | 0.6019 | 0.63033 |
| Epoch 60 | 0.79147 | 0.67299 | 0.56872 | 0.65403 | 0.61611 | 0.70142 |
| Epoch 80 | 0.8436 | 0.58294 | 0.50237 | 0.38389 | 0.57346 | 0.64929 |
| Epoch 100 | 0.80095 | 0.71564 | 0.33175 | 0.46445 | 0.48815 | 0.30806 |

FIG. 11E

FIG. 23B
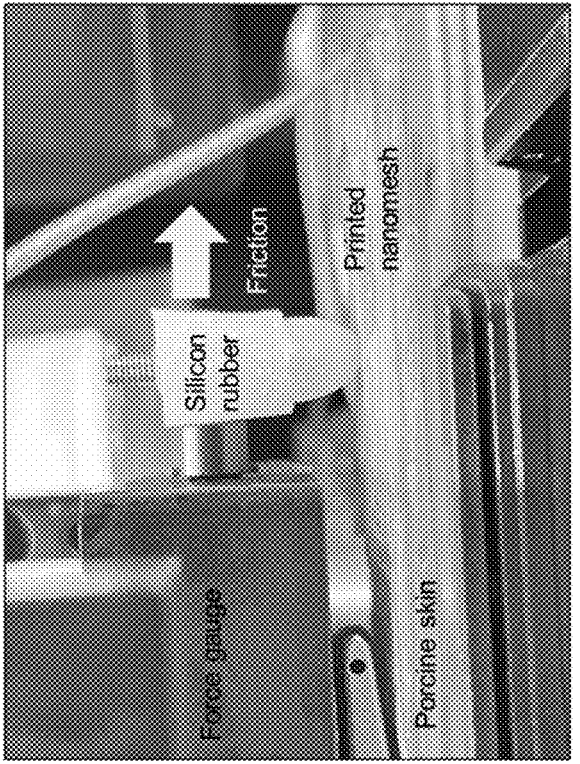
FIG. 23C
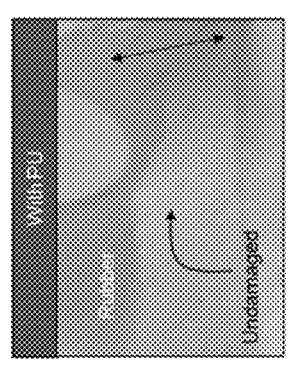
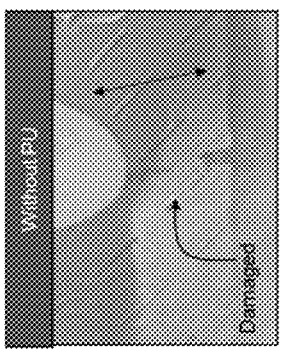
FIG. 23A

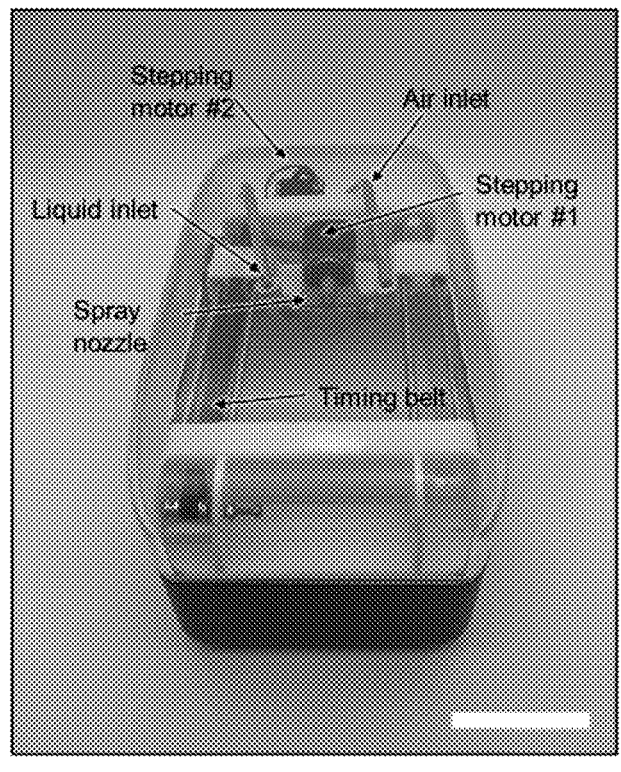
FIG. 26A
FIG. 26D
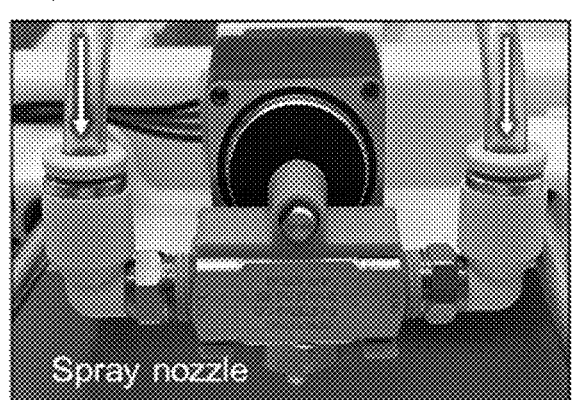
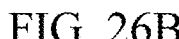
FIG. 26B
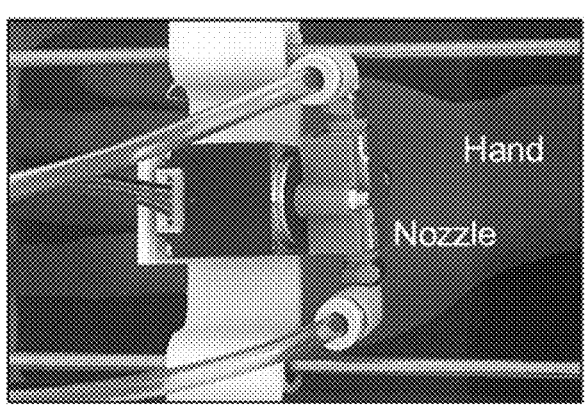
FIG. 26C

Algorithm 1 TD-C Learning

Input: unlabeled pretrain dataset $X_{pretrain} = \{s_i\}$, Signal encoding model f, data augmentation g, Input: constant $\tau$, temp, $\alpha$, window size $D_w$, batch size N

Initialize: input sequences $\{x_t\}$ through sliding time window

Initialize: positive pair set $Z^+$ and negative pair set $Z^-$ for epoch = 1, M do for all sampled mini-batch $\{x_{t_k}\}_{k=1}^N$ do for all $k \in [1,N]$ do

$x'_{t_k} \leftarrow g(x_{t_k}), x''_k \leftarrow g(x_{t_k})$     # Jittering augmentation $z'_{t_k} \leftarrow f(x'_{t_k}), z''_k \leftarrow f(x''_{t_k})$     # Sequence encoding end for for all $i \in \{1, ..., N\}$ and $j \in \{1, ..., N\}$ do

$TD_{ij} \leftarrow e^{-\alpha|t_i - t_j|^2}$

Store $(z'_{t_i}, z'_{t_j}), (z'_{t_i}, z''_{t_j}), (z''_{t_i}, z'_{t_j}), (z''_{t_i}, z''_{t_j})$ in $Z^+$ if $|t_i - t_j| \leq D_w/\tau$ else in $Z^-$ end for define $l((z_i, z_j))$ as $l((z_i, z_j)) = \exp(\frac{cossim(z_i,z_j)}{temp})$ $TDC\_Loss = -\mathbb{E}_{i,j,st(z_i,z_j)\in Z^+}\left[\log \frac{TD_{ij} \cdot l((z_i,z_j))}{\sum_{p\in Z^+} TD_{ij} \cdot l(p) + \sum_{p\in Z^-} TD_{ij} \cdot l(p)}\right]$ update network f to minimize TDC_Loss end for end for return Signal encoding model $f(\cdot)$

---

Algorithm 2 Transfer Learning

Input: few-shot labeled dataset $X_{train}^{user} = \{x^k, a^k, t^k\}_{k=1}^N$, Signal encoding model f

Input: hyperparameter $\alpha$, $\beta$, batch size M

Input: loss function TDC_Loss, NCELoss, BCELoss for epoch = 1, 20 do for k = 1, N do

$z^k, \varnothing^k = f(x^k)$     # Signal encoding $a_\varnothing^k = \begin{cases} 0, if\ a^k = 0 \\ 1, if\ a^k \neq 0 \end{cases}$     # Phase variable label end for for all sampled mini-batch $b = \{z^k, \varnothing^k, a^k, t^k, a_\varnothing^k\}_{k=1}^M$ do

$\mathcal{L}(b) = TDC\_Loss(\{z^k\}) + \alpha NCELoss(\{z^k, a^k\}) + \beta BCELoss(\{\varnothing^k, a_\varnothing^k\})$ update networks f to minimize $\mathcal{L}$ end for end for return Signal encoding model $f(\cdot)$, encoded signals $\{z^k, a^k, a_\varnothing^k\}_{k=1}^N$

---

Algorithm 3 Metric-based Inference

Input: Signal encoding model $f(\cdot)$, encoded signals $\{z^k, a^k, a_\varnothing^k\}_{k=1}^N$

Input: phase threshold $\gamma$

Input: real-time input sequence x $z, \varnothing = f(x)$     # Signal encoding if $\varnothing > \gamma$ then     # Active phase for k = 1, N do

$d_k \leftarrow cossim(z, z^k)$ end for

$i \leftarrow argmax_k(d_k)$ return $a^i$ else     # Inactive phase return 0 end if

FIG. 29

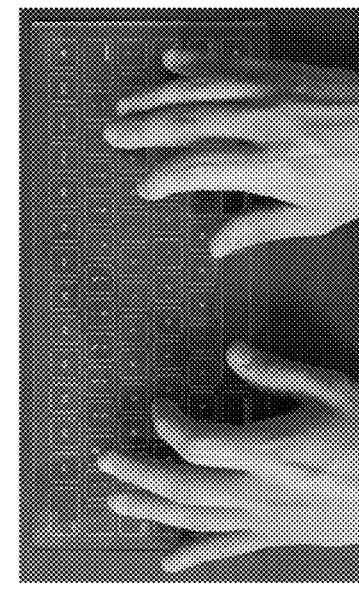
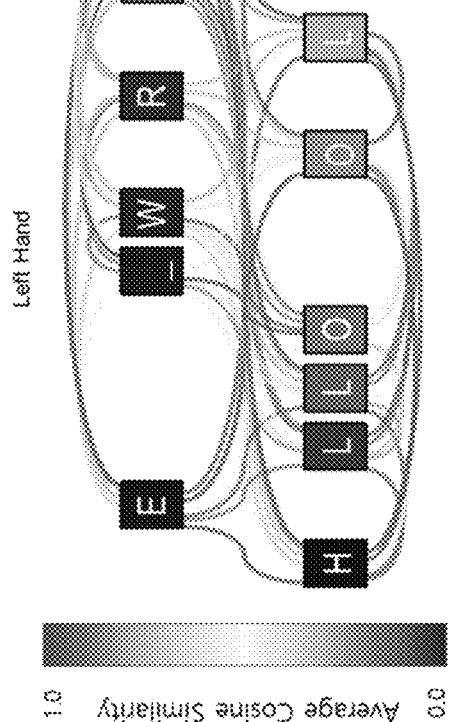
FIG. 32
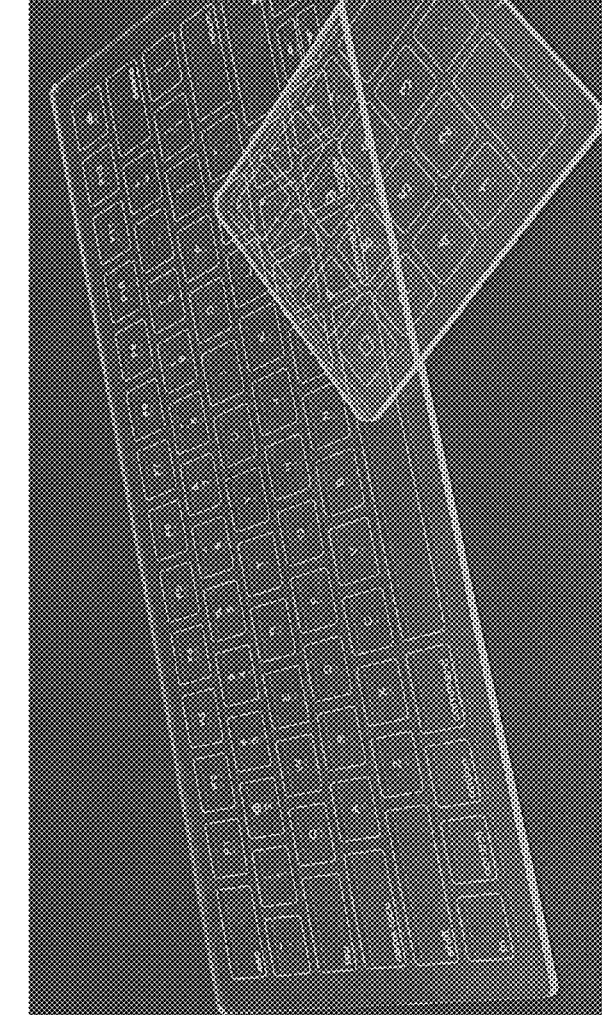
FIG. 33

FIG. 38

DEVICES AND METHODS WITH SUBSTRATE-LESS NANOMESH SENSORS

BACKGROUND

Aspects of the present disclosure are related generally to the field of wearable sensor electronics.

A variety of different types of wearable devices are described in the literature. These devices include those based on flexible electronics and stretchable wearables with addressable arrays of sensors, and metal electrodes proximate to or against the human body. As electronic devices have become smaller, wearable can include such electronics to identify the movement and intended tasks of the human hand. For example, electromyography (EMG) wrist bands and wearable electronic gloves can track the movements of human hands. Further, these wearables are bulky and tend to constrain movements of the body, thereby limiting their widespread adoption. Further, wearables with addressable arrays of sensors require multiple sensors and a relatively high level of system complexity to pinpoint the motions of the user. Since the large variability of tasks and differences in individual body shapes will generate different sensor signal patterns, these methods can require intensive data collection for every single user and/or task.

Accordingly, conventional wearable devices suffer from many drawbacks including, as examples, being excessively bulky and costly, and requiring designs that innately capture and/or extenuate interference due to noise artifacts associated with the user's motions. Moreover, for wearables designed to be ultrathin for comfort, the devices tend to be unstable and fragile especially when used in normal conditions and over time.

Therefore, there is a need for apparatuses (e.g., devices, systems, materials, etc.) and related methods of manufacturing and/or use to address and overcome one or more of the above deficiencies and other deficiencies, as may become apparent in connection with appreciating exemplary aspects and embodiments of the present disclosure

SUMMARY OF VARIOUS ASPECTS AND EXAMPLES

Various examples/embodiments presented by the present disclosure are directed to issues such as those addressed above and others which may become apparent from the following disclosure. For example, some of these disclosed aspects are directed to methods and devices that use or leverage from directly applying, for the core of a wearable, a nanomesh in a substrate-less form such as a form based in or including liquid, droplets, plasma and/or other matter through conductive strands may be formed, and with direct application, the nanomesh may be used as a porous, breathable material, that is biocompatible with the user portion, used without a substrate as an interface between the nanomesh and the user portion.

In one specific example of a method according to the present disclosure, steps of the method include directly applying a nanomesh in a substrate-less form, including a multitude of conductive strands connected to a sensing circuit, to a non-rigid portion (e.g., skin) of a user, and causing the multitude of conductive strands to conform to the user portion. In use, output signals are generated, in response to movement of the user portion and to the multitude of conductive strands stretching, to indicate the movement of the user portion while the nanomesh is secured to or against the user portion. In more particular examples, which may be implemented to simplify and provide more accurate sensing measurements, a liquid form of nanomesh is directly applied over the user portion (e.g., spanning multiple moveable user joints) and without a substrate against the user portion, and logic circuitry is trained to interpret motions of the user based on changes in the nanomesh's conductance during the motions.

In certain other examples which may also build on the above-discussed aspects, methods are directed to forming a wearable or aspects of the wearable. For example, on such method includes: forming a nanomesh, including a multitude of conductive strands connected to a sensing circuit, for direct application in a substrate-less form to secure to a non-rigid portion of a user ("the user portion"), wherein the nanomesh is to conform to the user portion; and causing output signals to be generated, in response to movement of the user portion and to the multitude of conductive strands stretching and unstretching, to indicate movement of the user portion while the nanomesh is secured to or against the user portion.

In more specific examples related to the above methodology and wearable type of device, another method according to the present disclosure includes: providing a nanomesh directly applied in a substrate-less form, including a multitude of conductive strands connected to a sensing circuit, to a non-rigid portion of a user ("the user portion") and causing the multitude of conductive strands to conform to the user portion; and causing output signals to be generated, in response to movement of the user portion and to the multitude of conductive strands stretching and unstretching, to indicate the movement of the user portion while the nanomesh is secured to or against the user portion. The step of providing the nanomesh may include directly applying the nanomesh in a substrate-less form and/or facilitating (e.g., participating in the act) the application or use of the nanomesh to enable the output signals to be generated.

According to another related aspect, the present disclosure is directed to an apparatus that includes a multitude of conductive strands integrated to form a nanomesh. The nanomesh is to connect to a sensing circuit and to be directly applied in a substrate-less form to secure to a non-rigid portion of a user ("the user portion" such as the user's skin or, in the case of an implant, other tissue of the user). The multitude of conductive strands is formable on, and to conform to, the user portion and, in response to movement of the user portion, to stretch and unstretch and generate signals, via the conductive strands, indicative of the movement of the user portion while the nanomesh is secured to the user portion. In directly applying the substrate-less form so as to be secured to the user portion, the absence of such a substrate should be apparent in light of the material (e.g., as observed before, during or after the step of applying) being able to form and be secured to the user portion (e.g., without requiring a glove over the top to secure) and/or without requiring that pre-applied non-substrate form be structurally supported for delivery by an underlying structure. In some example embodiments, the nanomesh is secured to the user portion via adhesion properties of the nanomesh (e.g., discernible in its substrate-less form before and/or after being directly applied to the user portion).

In more particular examples, the apparatus may include the sensing circuit and may further include current sourcing circuitry to cause current to flow in the conductive strands, and in operation the sensing circuit is to detect, in response to the generated signals indicative of the movement of the user portion, variations of resistance, or conductance, manifested in the conductive strands. Further, the sensing circuit may cooperate with a wireless signal transmitter (which may also be part of the apparatus) to wirelessly send the signals, as generated via the conductive strands, to a remotely-located computing data processor circuit.

In other related embodiments of the present disclosure, a computing data processor circuit may be trained and/or used to sense, in response to the signals generated via the conductive strands, specific movements of the user portion. In connection with such training, the computing data processor circuit may be configured to recognize different prioprioception-like patterns, in response to the signals generated via the conductive strands, and in response sensing different types of the movement of the user portion.

In other related embodiments of the present disclosure, such a computing data processor circuit is cooperatively configured with the nanomesh and the sensing circuit to act as a substrate-less artificial mechanoreceptor equipped with meta-learning. Moreover, the computing data processor circuit, the nanomesh and the sensing circuit may be configured to recognize position and bending angle of a joint of the user, to recognize an active phase of one or more motion-based gestures of the user, and/or to discern or predict one or more different types of motion-based gestures of the user.

Various further specific example embodiments according to the present disclosure include the following aspects. The substrate-less form including or composed of a liquid or printable ink that includes metal coated nanostructures (e.g., gold coated Ag(Core)/Au(Shell), platinum coated Ag(Core)/Pt (Shell)) configured to prevent cytotoxic silver ions from directly contacting the skin. Alternatively, the substrate-less form including or composed of pure gold nanostructures or pure copper nanostructures.

In yet another such specific example embodiment, one or more sensor circuits coupled with the cured (or solidified) substrate-less nanomesh are to determine: body movement for controlling robotic movement, discrete states of motions for identifying pressed and/or unpressed state(s) of a keyboard button, the relative location of the body joint, specific keys in virtual keyboard typing.

Certain other specific aspects and examples of the present disclosure are directed more-detailed experimental/proof-of-concept embodiments. These contexts included successful demonstrations based on a substrate-less nanomesh artificial mechanoreceptor equipped with meta-learning. The system mimics human sensory intelligence and exhibits high efficacy and rapid adaptation to a variety of human tasks. Similar to cutaneous receptors recognizing motion via skin elongation, the nanomesh receptor gathers hand proprioception signal patterns with a single sensing element. The substrate-less feature of the nanomesh receptor allows intricate signal patterns to be collected from many areas using a single sensor. With a highly separable motion feature space, the learning framework can effectively learn to distinguish different signals, and this knowledge can be used to robustly predict different user tasks with the aid of a metric-based inference mechanism. The robustness of the applicable model allows quick adaptation to multiple users regardless of the variations in density for printed nanomesh receptors. By increasing the number of nanomesh elements to five fingers or more would enable recognition of more complex motions, allowing future applications in robotics, metaverse technologies, and prosthetics.

In various applications, the nanomesh may be applied to the skin such as the finger, hand, wrist, arm, neck or leg of a human or other live being and in a more general sense (where skin may refer to a tissue such as a (surrounding) membrane) the nanomesh may be applied as an implant for monitoring small cardiovascular movements, physiologic phenomena and various types of specific motion including organ-specific activities. In these context, at least one nanomesh or a combination of separate nanomeshes (operating or being interpreted independently or together) may be applied to one or more regions of a bladder, kidneys, liver, intestines, ligaments, etc., and combinations of such body parts).

The above discussion is not intended to describe each aspect, embodiment or every implementation of the present disclosure. The figures and detailed description that follow also exemplify various embodiments.

BRIEF DESCRIPTION OF FIGURES

Various example embodiments, including experimental examples, may be more completely understood in consideration of the following detailed description in connection with the accompanying drawings, each in accordance with the present disclosure (and each tracking in order with the figures from the U.S. Provisional Application referenced herein and the colorized version of the instant application provides further clarity regarding mapping for certain of the figures with color-based keys), in which:

FIG. 5 illustrates an example taxonomy of augmented soft sensors combined with machine intelligence, according to example embodiments of the present disclosure.

FIGS. 7A and 7B illustrate aspects of an example wireless module for measuring changes of nanomesh (e.g., as may be used in telemedicine), according to example embodiments of the present disclosure;

FIGS. 10A and 10B illustrate example details of the learning model architecture, according to example embodiments of the present disclosure;

FIGS. 11A, 11B, 11C, 11D and 11E illustrate example ablation studies on different learning methods and different temporal signal data augmentations, according to example embodiments of the present disclosure;

5                                                                              6

Figure 13:
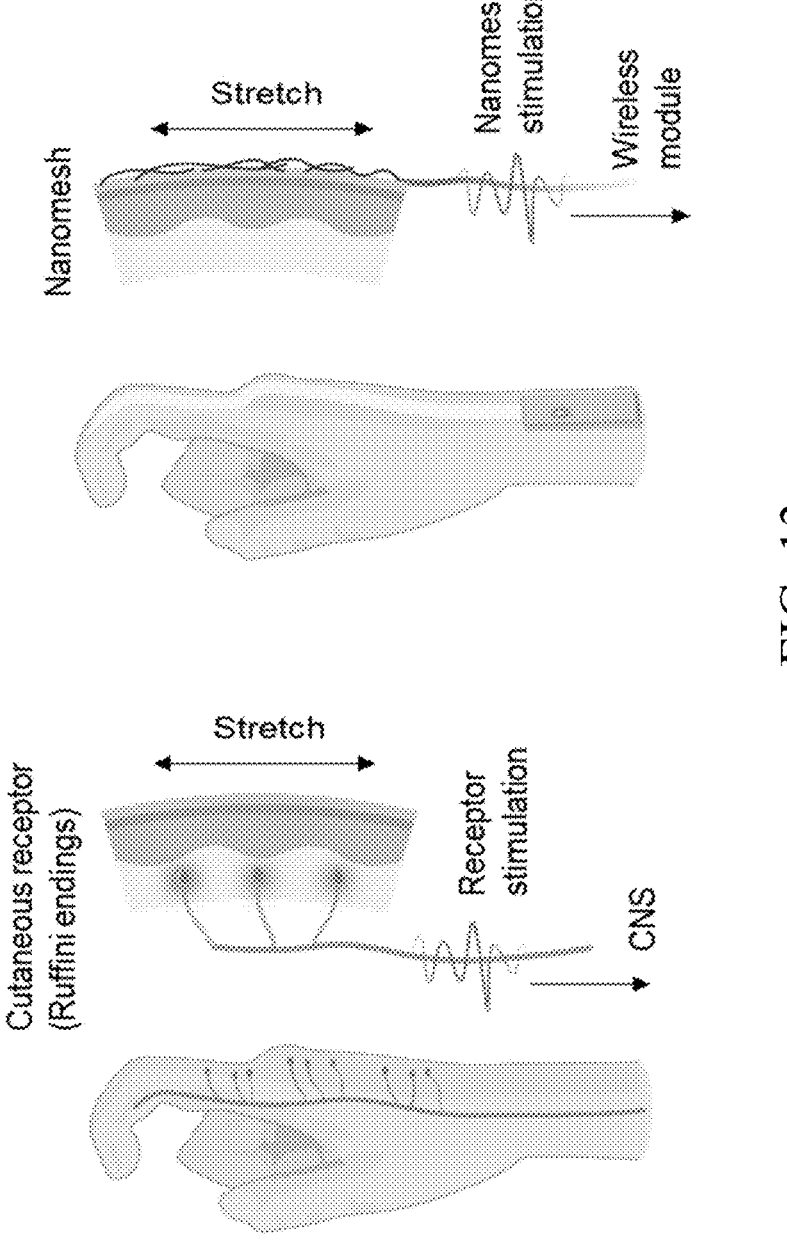
Figure 16A:
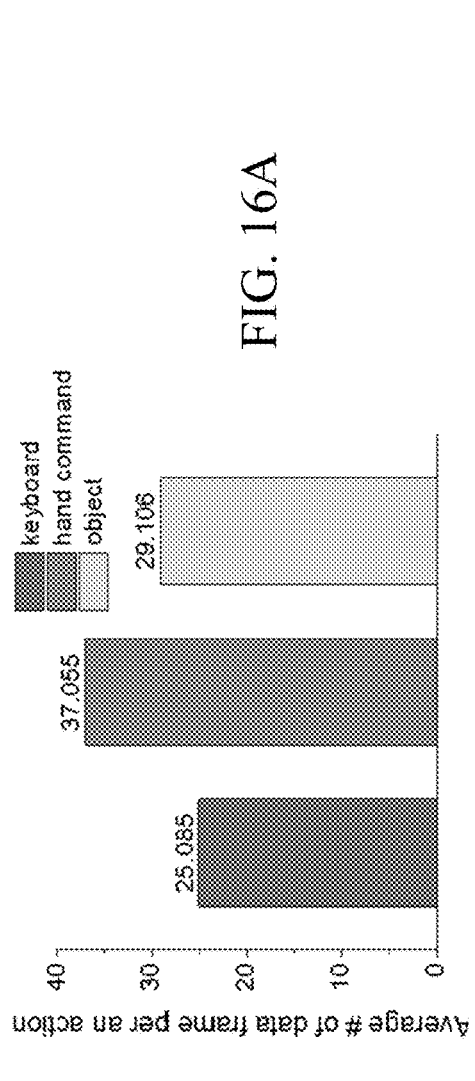
Figure 16B:
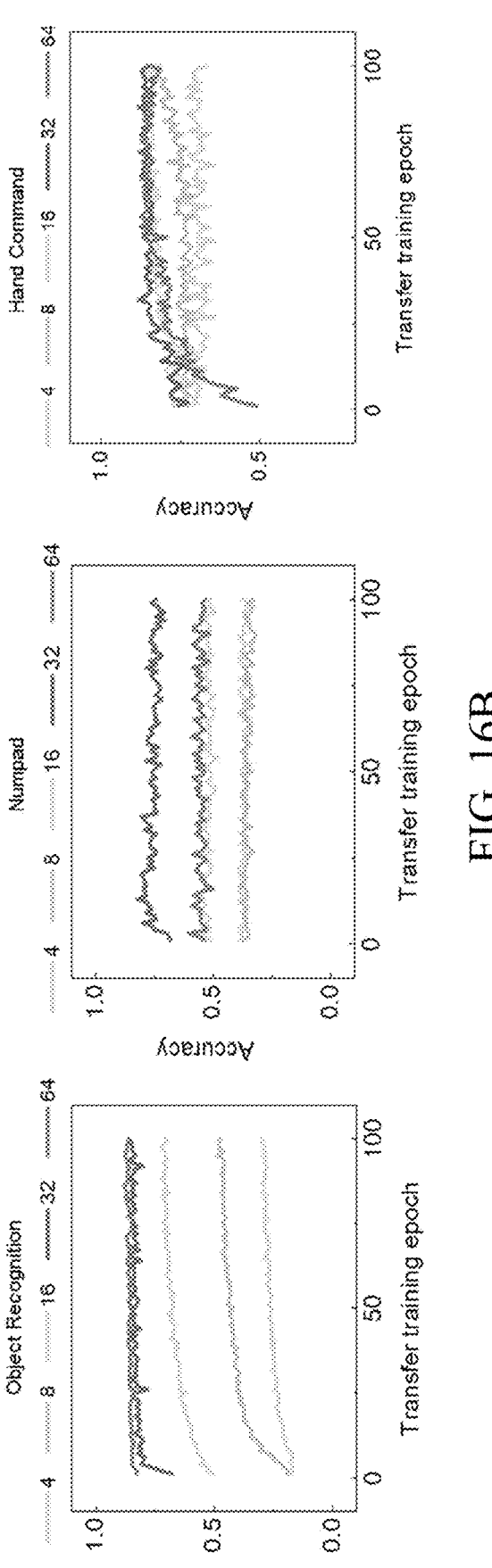
Figures 19A, 19B, 20A, 20B:
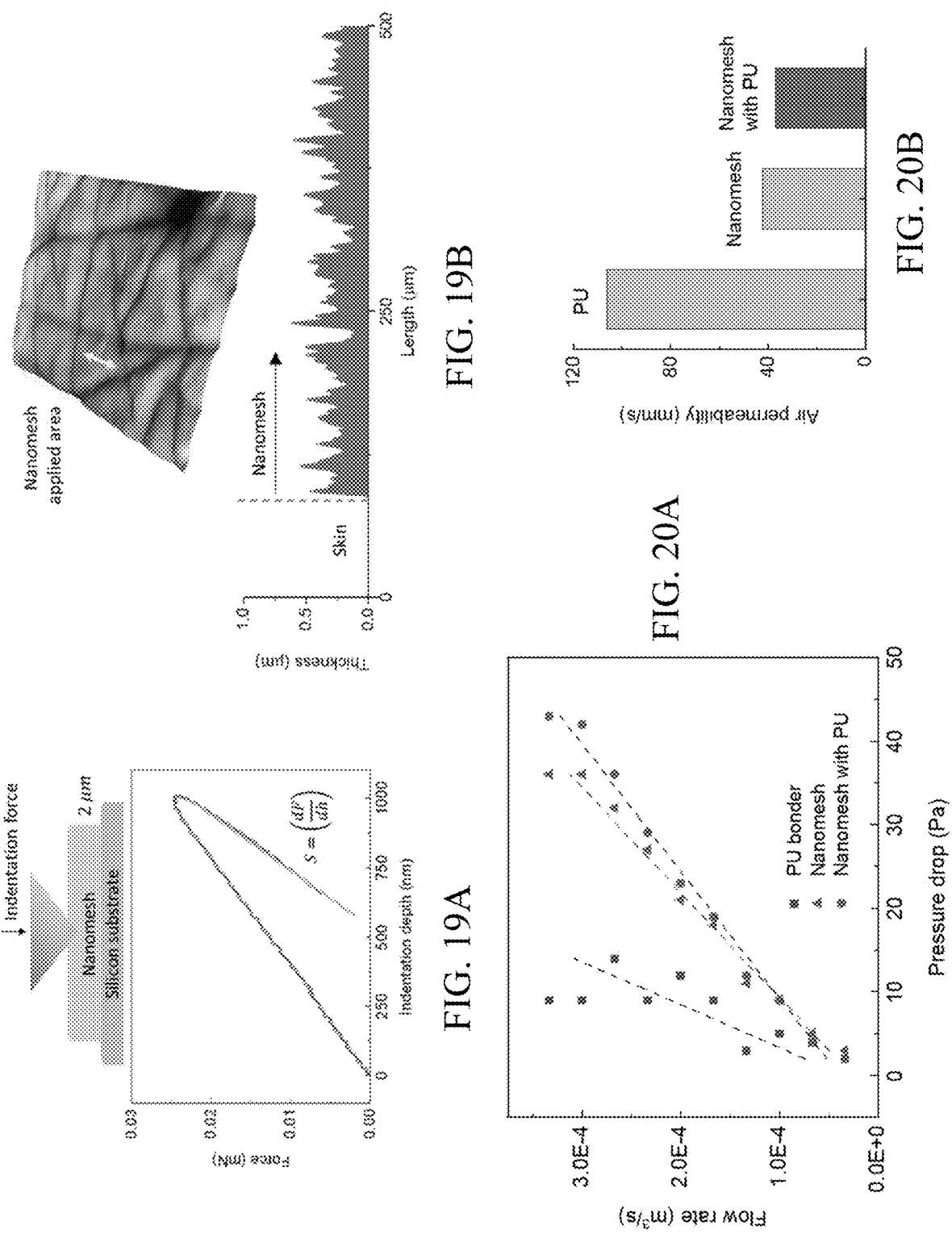
Figures 20C, 21A, 21B:
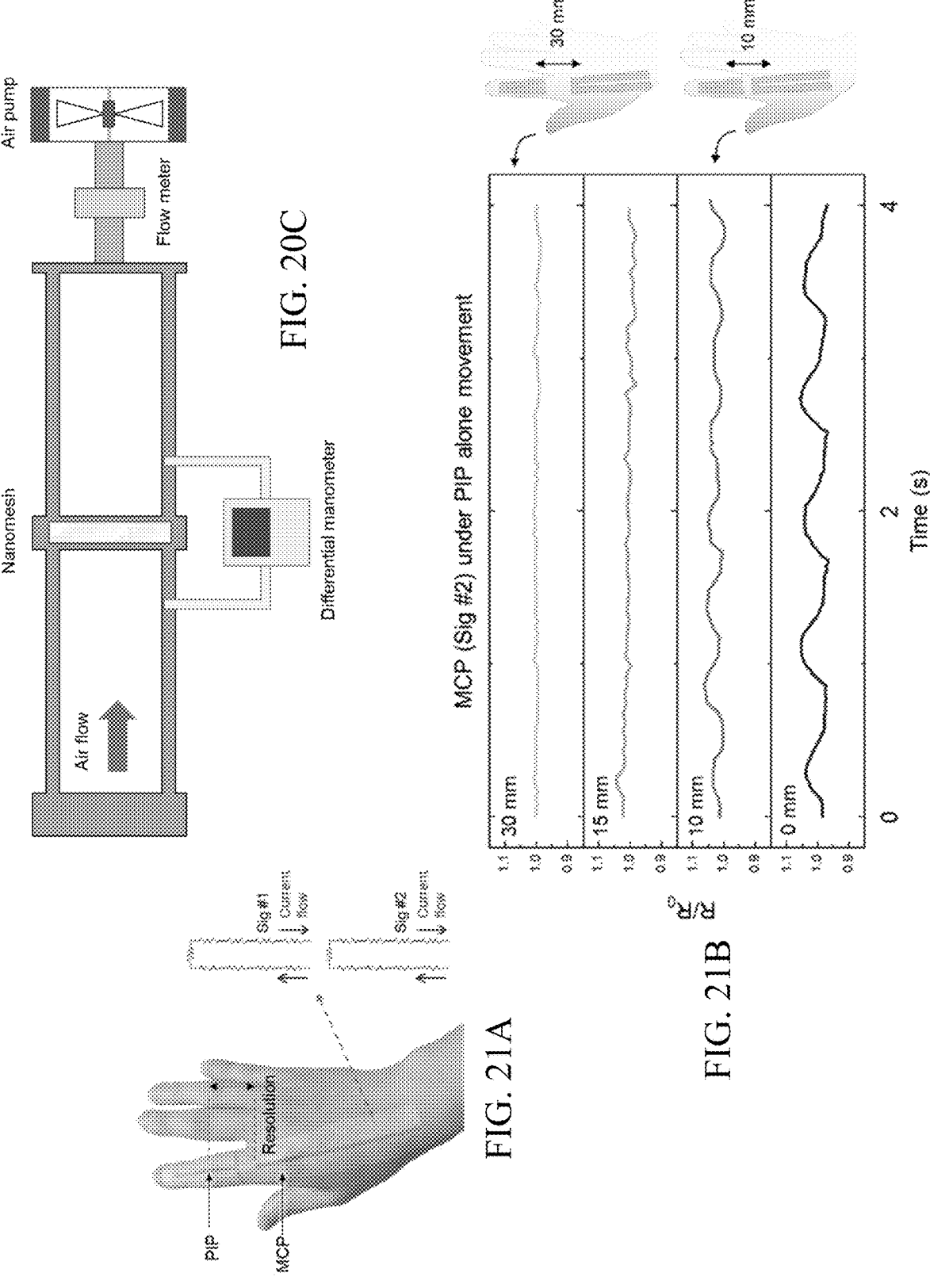
Figures 22A, 22B, 22C, 22D, 22E, 22F:
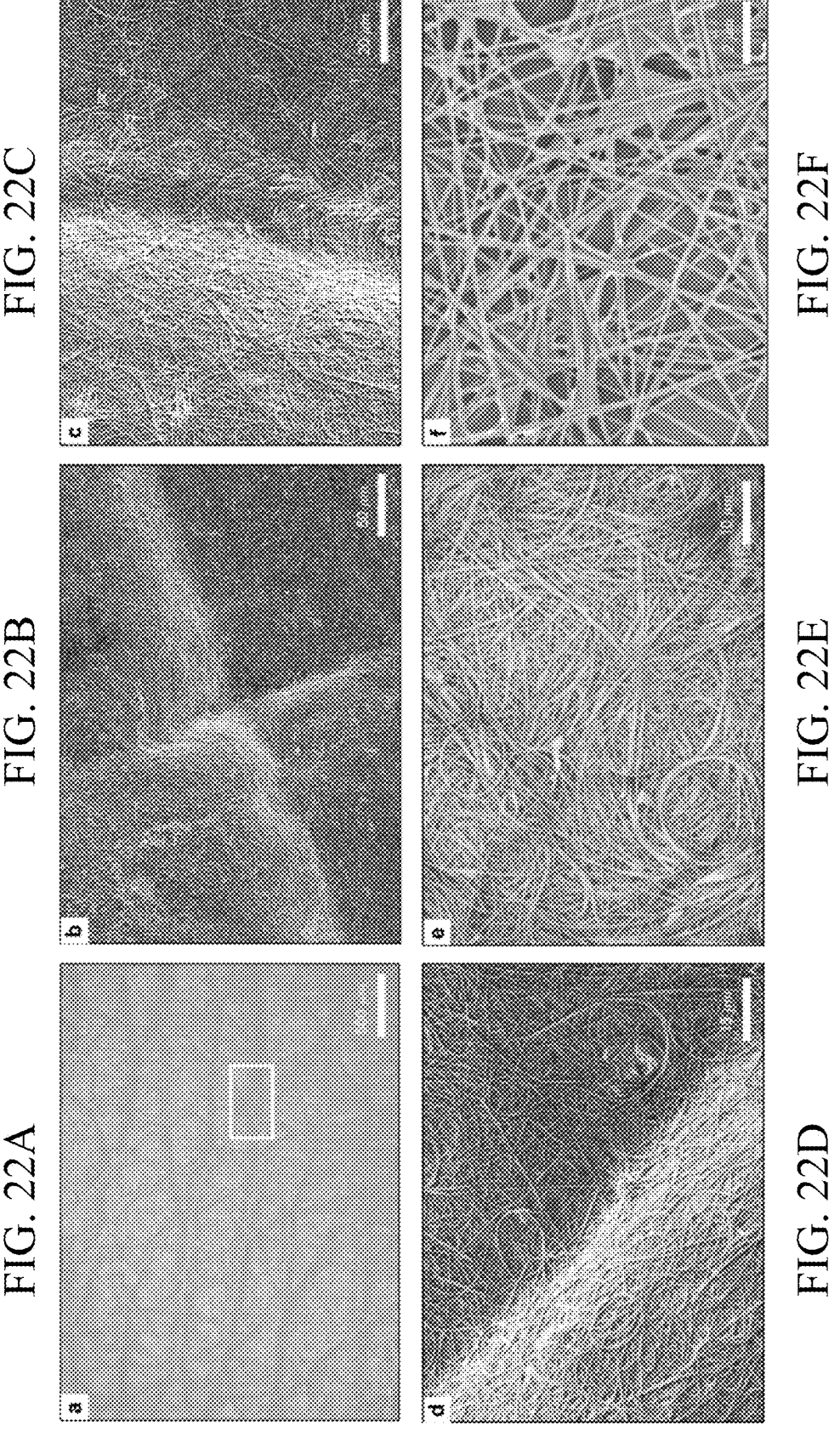
Figures 24, 25A, 25B:
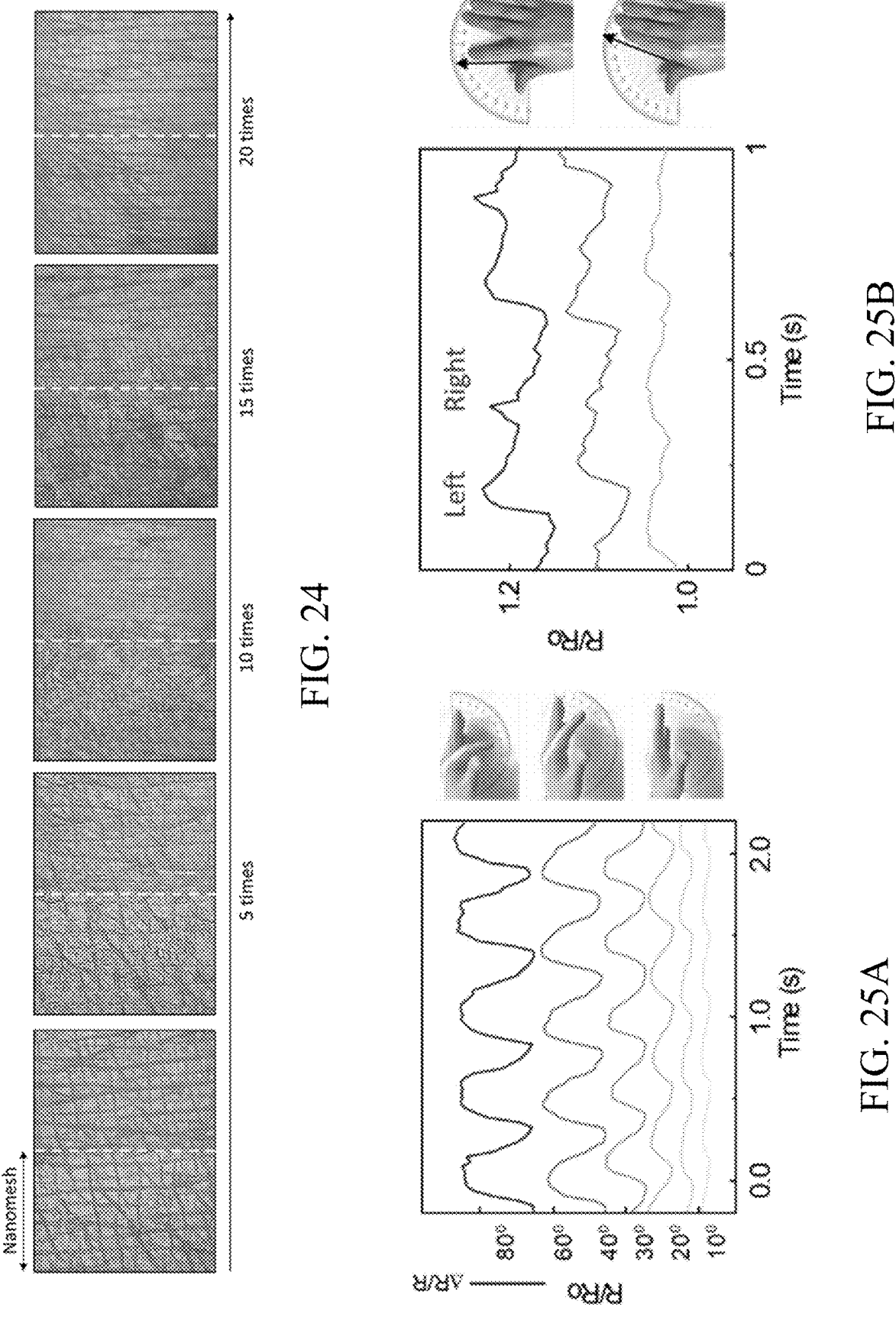
Figure 28:
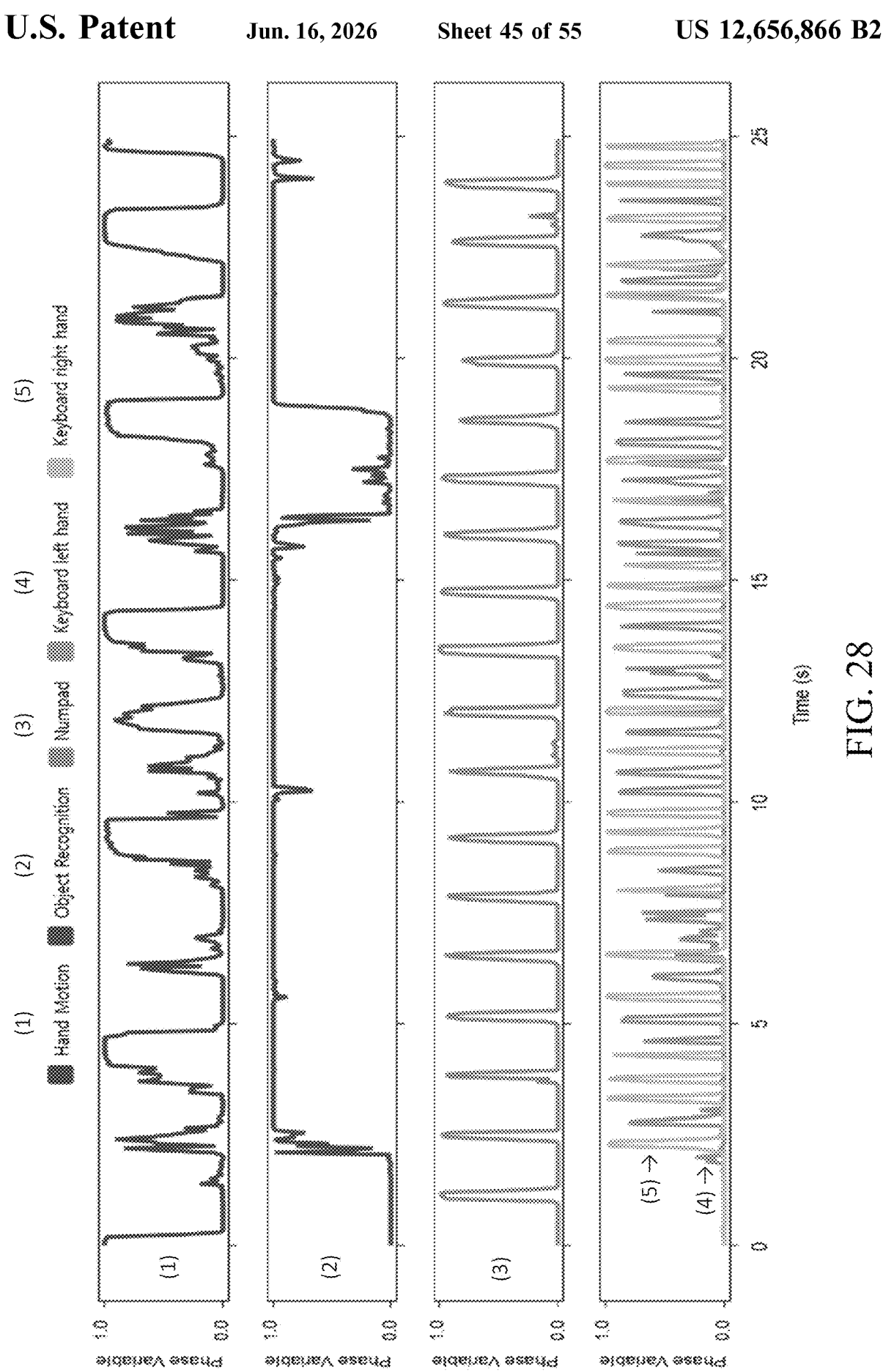
Figure 30:
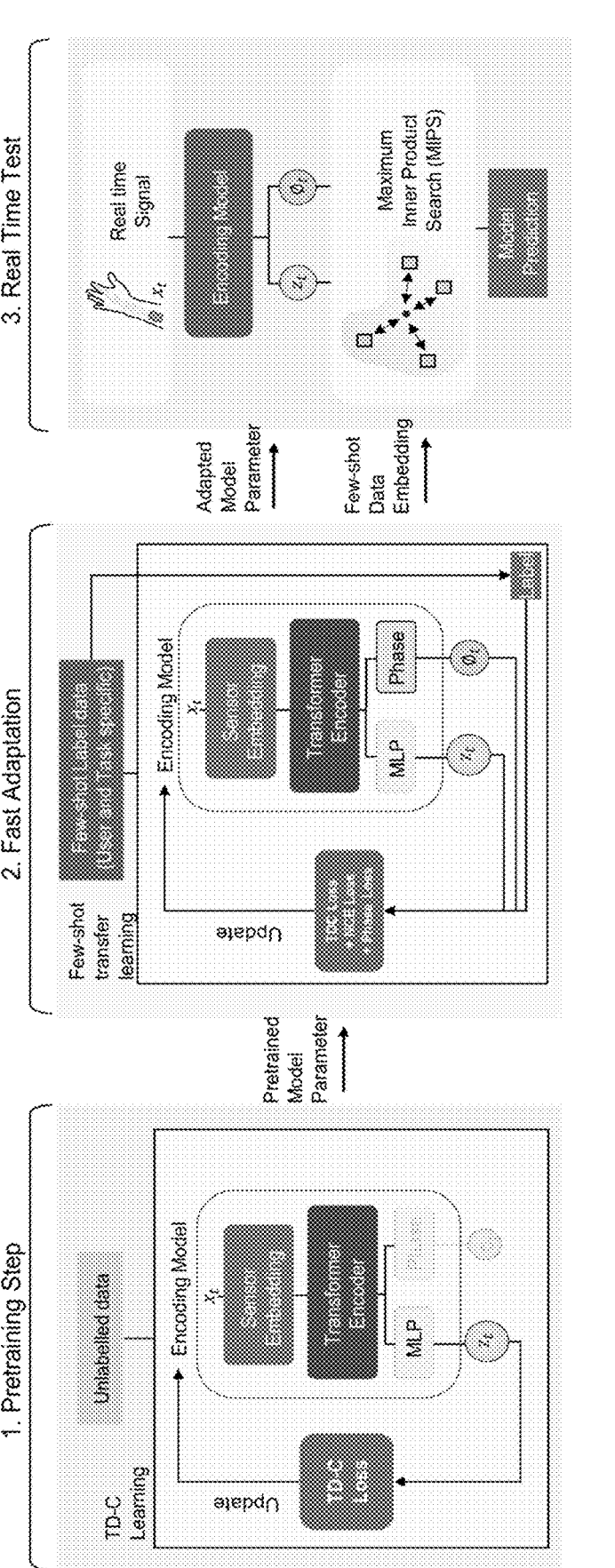
Figure 31A:
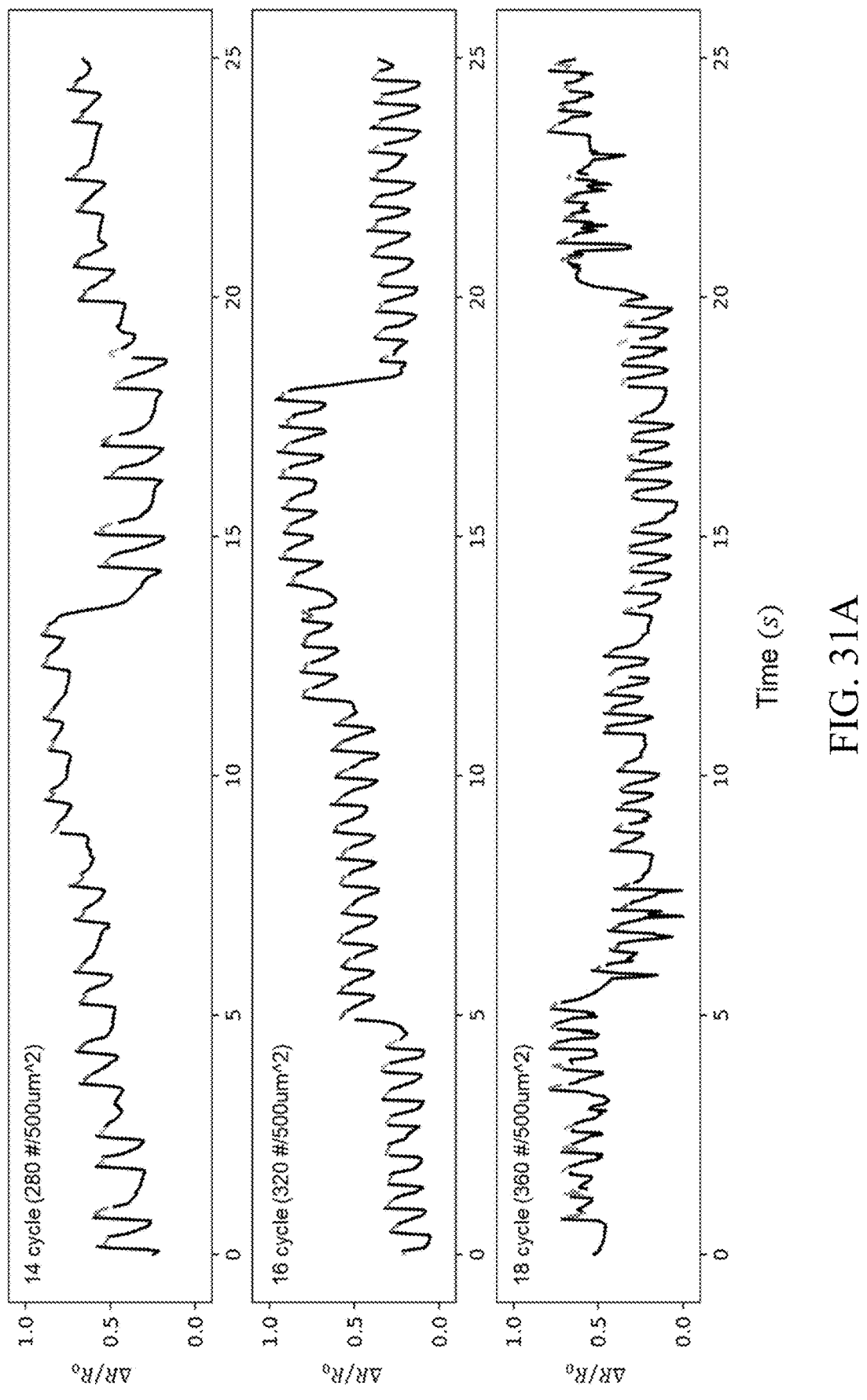
Figures 31B, 31C:
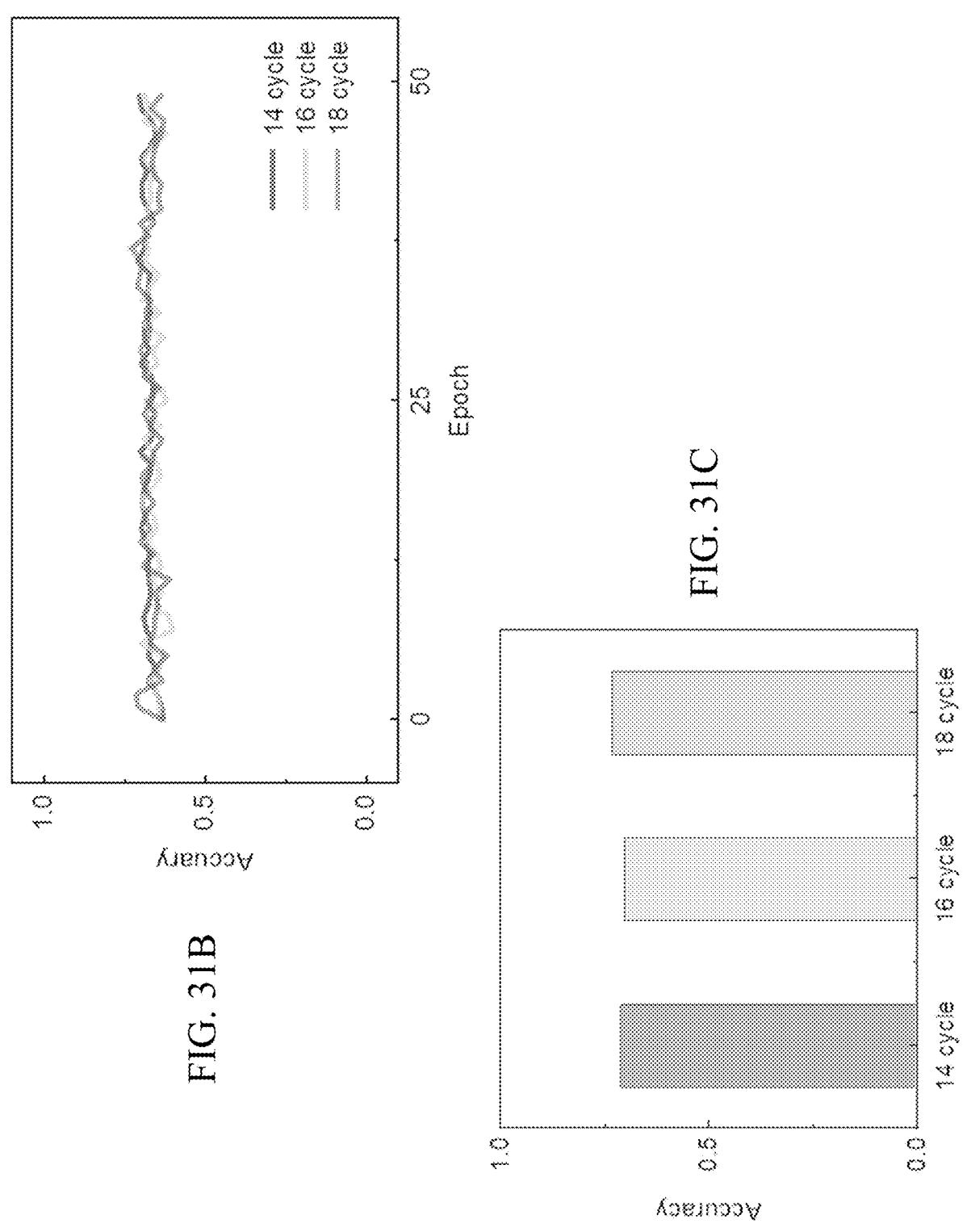
Figures 34A, 34B:
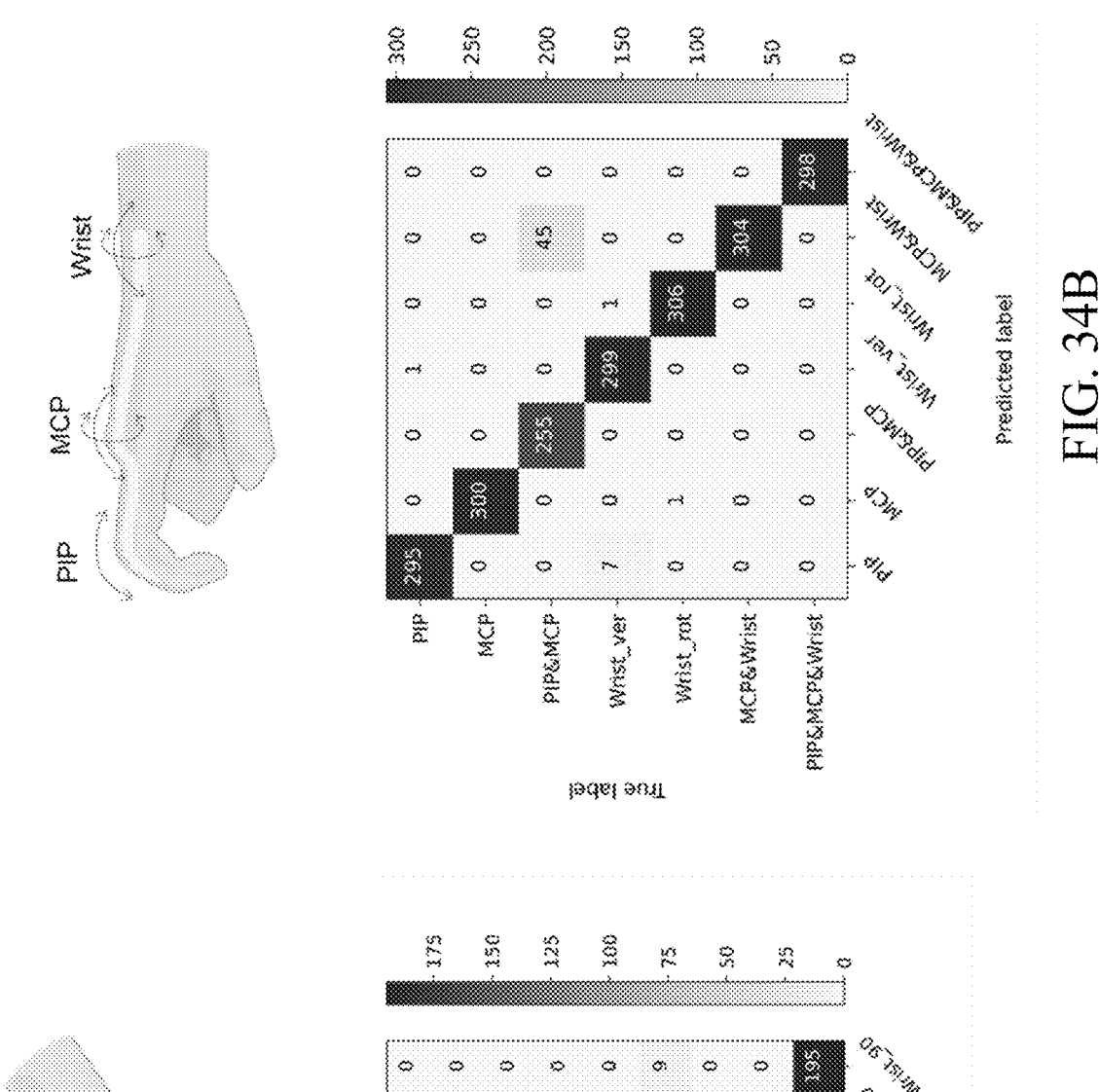
Figures 34C, 35, 36:
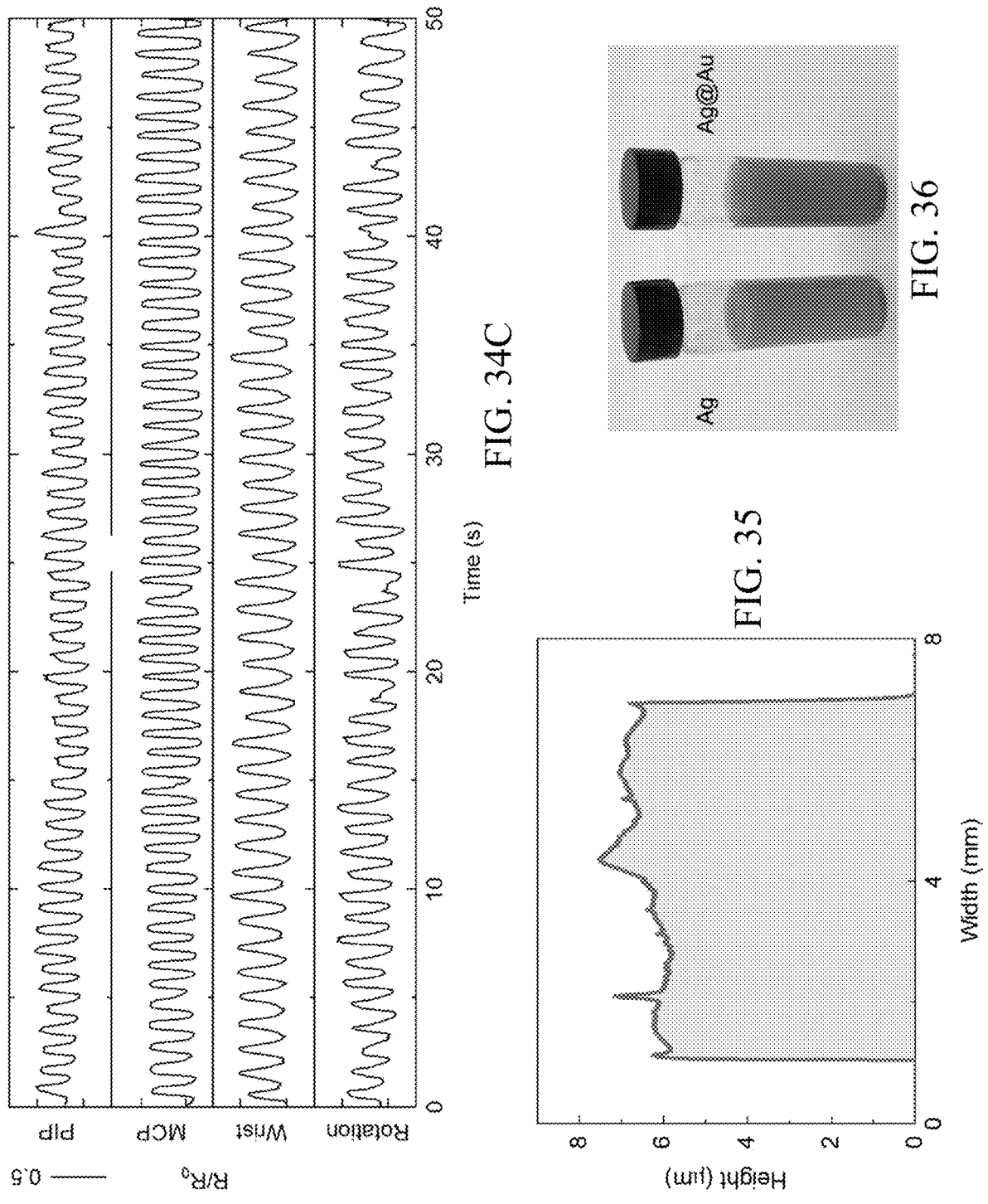
Figure 37A:
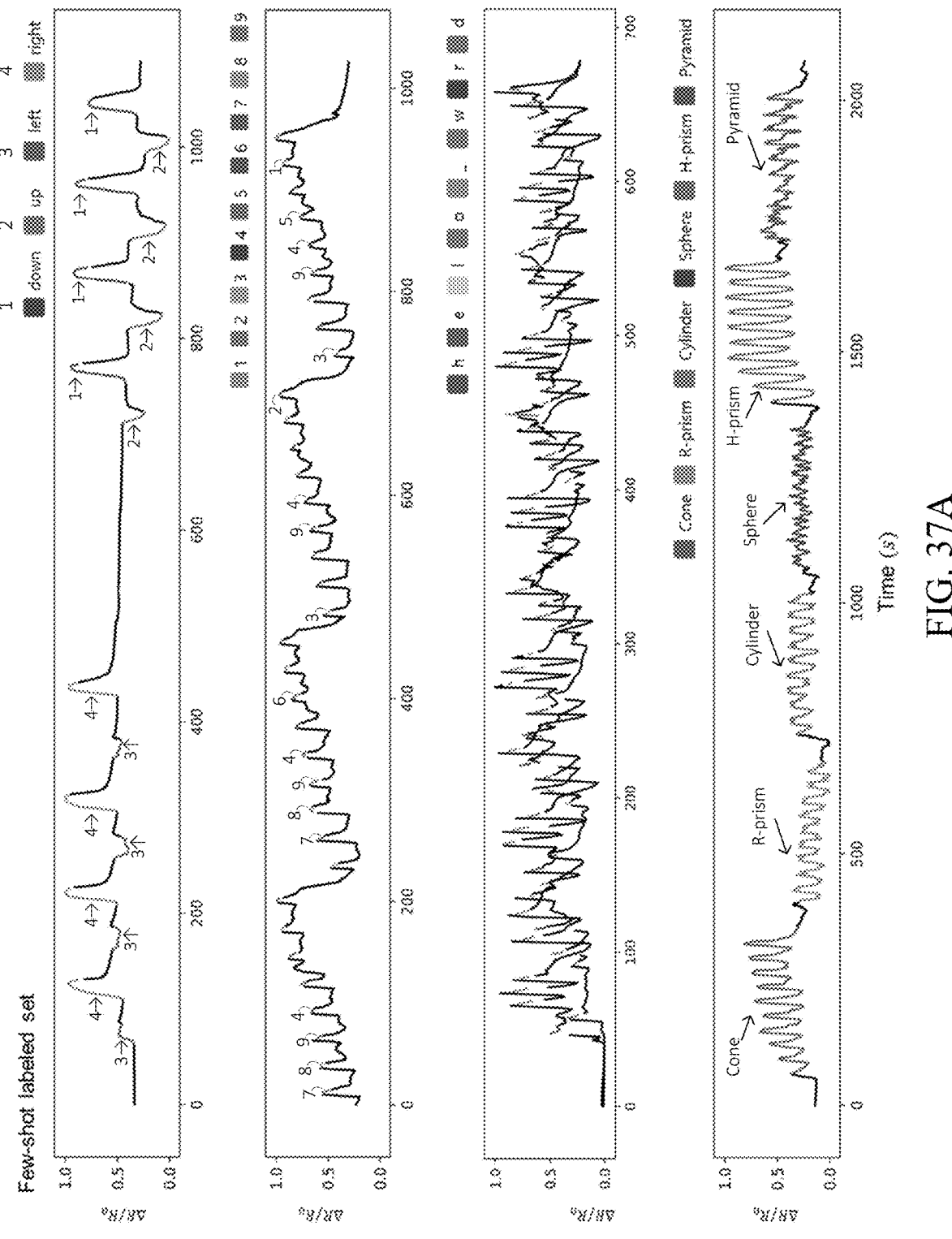
Figure 37B:
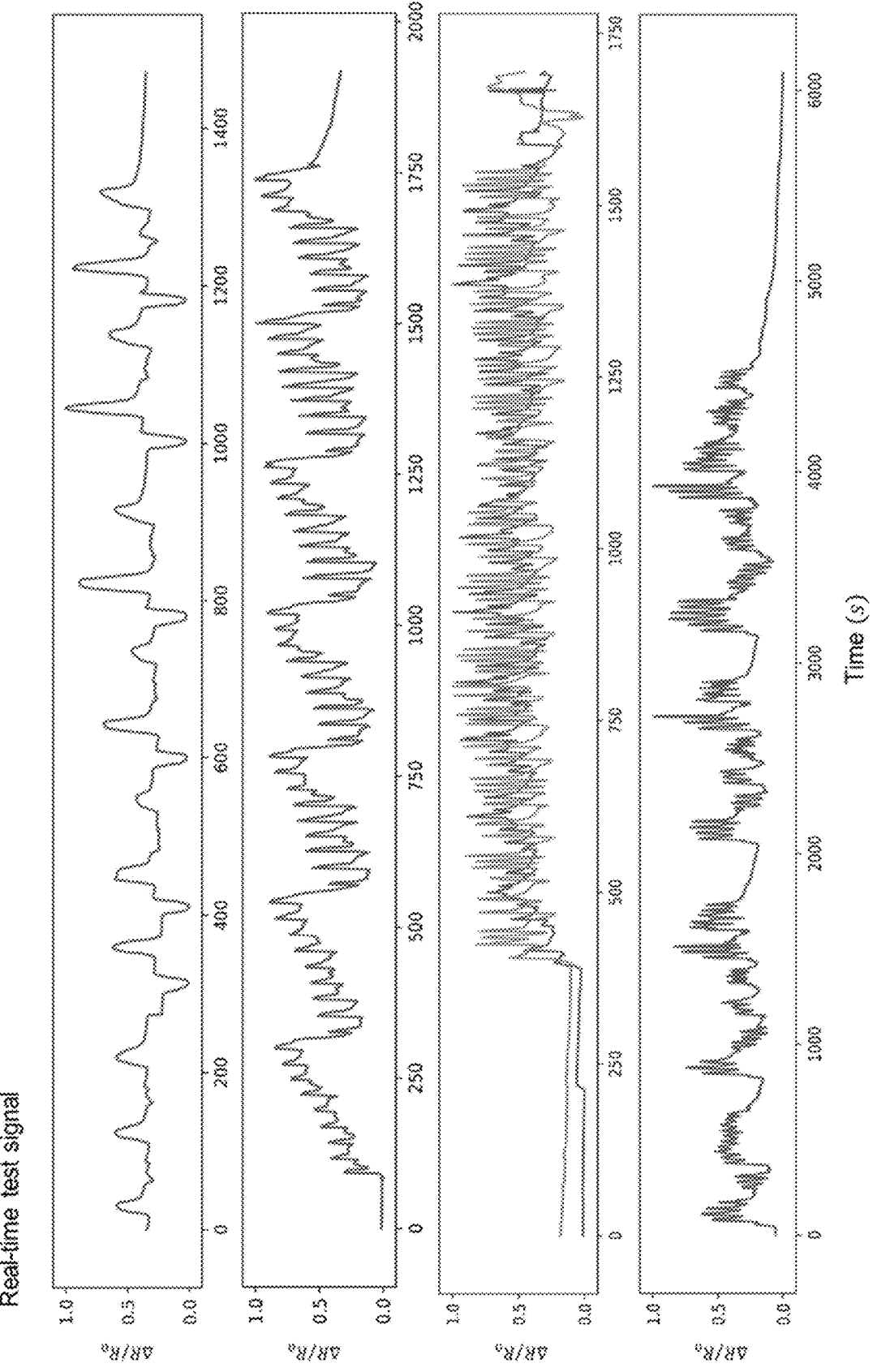

FIG. 13 illustrates an example nanomesh system which translates skin stretch into proprioception, according to example embodiments of the present disclosure;

FIGS. 14A, 14B, 14C, 14D and 14E illustrate example model performance analysis based on different hyperparameter sizes, according to example embodiments of the present disclosure;

FIGS. 15A, 15B, 15C, 15D and 15E illustrate example aspects of impact of various environmental conditions of nanomesh, according to example embodiments of the present disclosure;

FIGS. 16A and 16B illustrate an example aspects of a performance comparison for different time window sizes, according to example embodiments of the present disclosure;

FIGS. 17A, 17B, 17C, 17D, 17E and 17F illustrate example graph simulation of nanomesh with different densities and its mechanical properties, according to example embodiments of the present disclosure;

FIGS. 18A, 18B, 18C, 18D, 18E and 18F illustrate an example biocompatibility test of a nanomesh-based apparatus, according to example embodiments of the present disclosure;

FIGS. 19A and 19B illustrate example aspects showing mechanical properties of a nanomesh, according to example embodiments of the present disclosure;

FIGS. 20A, 20B and 20C illustrate example aspects of nanomesh breathability and related measurements, according to example embodiments of the present disclosure;

FIGS. 21 and 21B illustrate example spatial resolution of nanomesh, according to example embodiments of the present disclosure;

FIGS. 22A, 22B, 22C, 22D, 22E and 22F are example SEM images of reinforced nanomesh with protective coating (e.g., PU bonder), according to example embodiments of the present disclosure;

FIGS. 23A, 23B, 23C, 23D and 23E illustrate an example friction test of reinforced nanomesh, according to example embodiments of the present disclosure;

FIG. 24 illustrates example removal of nanomesh, according to example embodiments of the present disclosure;

FIGS. 25A, 25B, 25C, 25D and 25E illustrate example nanomesh performance on daily activities, according to example embodiments of the present disclosure;

FIGS. 26A, 26B, 26C and 26D illustrate example aspects of a portable printer setup, according to example embodiments of the present disclosure;

FIGS. 27A, 27B, 27C and 27D illustrate example domain differences between users and algorithmic motivations to overcome out-of-distribution, according to example embodiments of the present disclosure;

FIG. 28 illustrates example system-performance aspects, according to example embodiments of the present disclosure, involving a predicted phase variable when inferencing different tasks;

FIG. 29 provides an example pseudocode for learning algorithm, according to example embodiments of the present disclosure;

FIG. 30 illustrates an example schematic diagram of total learning steps, according to example embodiments of the present disclosure;

FIGS. 31A, 31B, and 31C illustrate example performance comparison for an exemplary sensor with different nanomesh density, according to example embodiments of the present disclosure;

FIG. 32 illustrates an example set of average cosine similarity connections between different letters signals when typing with left and right hands, according to example embodiments of the present disclosure;

FIG. 33 illustrates an example acrylic keyboard identifier, according to example embodiments of the present disclosure;

FIGS. 34A, 34B and 34C illustrate example nanomesh achieving various proprioceptions, according to example embodiments of the present disclosure;

FIG. 35 illustrates example substrate thickness measurement, according to example embodiments of the present disclosure;

FIG. 36 is an example image of nanomesh solutions of Ag and Ag@Au, according to example embodiments of the present disclosure;

FIGS. 37A and 37B respectively illustrate example few-shot labeled set and real-time test signals, according to example embodiments of the present disclosure; and FIG. 38 illustrates example sentence correction through open-source word correction library/algorithm (e.g., Jamspell), according to example embodiments of the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses (e.g., systems and device) and methods involving apparatus characterized at least in part by a nanomesh in a substrate-less form (e.g., liquid, droplets, plasma, etc.) and, with direct application, the nanomesh may be used as a porous, breathable material, that is biocompatible with the user portion, to be used without a substrate as an interface between the nanomesh and the user portion. While the present disclosure is not necessarily limited to such aspects, an understanding of specific examples in the following description may be understood from discussion in such specific contexts.

In certain embodiments, apparatuses and methods in accordance with the present disclosure are directed to implementations that use a substrate-less nanomesh which includes a multitude of conductive strands for connecting to a sensing circuit. The nanomesh may be directly applied on a non-rigid portion of a user (e.g., deposited or printed on the user's skin) and may include input/output wires for coupling signals to logic circuitry (e.g., CPU-based data processing circuitry) for controlling operation and interpreting how the conductive strands of the nanomesh may represent one or more motions of the user at least in connection with the user's region corresponding to the portion of the user. In operation, the multitude of conductive strands are conformed to the user portion and are used to generate output signals, in response to movement of the user portion and to the multitude of conductive strands stretching, to indicate the movement of the user portion while the nanomesh is secured to or against the user portion.

In certain more specific examples, methods include directly applying a nanomesh in a substrate-less form, including a multitude of conductive strands connected to a sensing circuit, to a non-rigid portion (e.g., skin) of a user, and causing the multitude of conductive strands to conform to the user portion; and generating output signals, in response to movement of the user portion and to the multitude of conductive strands stretching, to indicate the movement of the user portion while the nanomesh is secured to or against the user portion. In more particular examples which simplify and provide more accurate sensing measurements, a liquid form of nanomesh is directly applied over the user portion (e.g., spanning multiple moveable user joints) and without a substrate against the user portion, and logic circuitry is trained to interpret motions of the user based on changes in the nanomesh's conductance during the motions.

More specific examples in this regard employ a substrate-less (preferably biocompatible) ink for applications in conductive material printing. One such example embodiment may be implemented so as to simplify and provide more accurate sensing measurements, via a liquid form of nanomesh being directly applied over the user portion (e.g., spanning multiple moveable user joints) and without a substrate against the user portion. Logic circuitry coupled to the nanomesh may be trained to interpret motions of the user (e.g., across multiple joints) based on changes in the nanomesh's conductance during the motions.

In other specific example embodiments include a substrate-less nanomesh receptor that is coupled with an unsupervised meta-learning framework to provide user-independent, data-efficient recognition of different hand tasks. The nanomesh, which is may be from biocompatible materials, especially for being directly printed on a person's hand, can be used to mimic human cutaneous receptors by translating electrical resistance changes from fine skin-stretches into proprioception. A single nanomesh can simultaneously measure finger movements from multiple joints, providing a simple user implementation and low computational cost. In additional example embodiments, a time-dependent contrastive learning algorithm may be used to differentiate between different unlabeled motion signals. This meta-learned information is then used to rapidly adapt to various users and tasks, including command recognition, keyboard typing, and object recognition.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same connotation and/or reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Consistent with the above aspects, such a manufactured device or method of such manufacture may involve aspects presented and claimed in U.S. Provisional Application Ser. No. 63/431,306 filed on Dec. 8, 2022 (S22-322) with an Appendix, to which priority is claimed. To the extent permitted, such subject matter is incorporated by reference in its entirety generally and to the extent that further aspects and examples (such as experimental and/more-detailed embodiments) may be useful to supplement and/or clarify.

Certain example embodiments, in accordance with the present disclosure, may be implemented to be conformable on (e.g., conformably attached and secured to) skin or other tissue of a user, substantially reducing the bulkiness that conventional devices have. In more specific examples, such a substrate-less sensor can be directly applied and secured to a user's skin (or tissue) with a portable printer, and output signals derived or received from the nanomesh can be readable through an attached wireless logic circuit (module). Such experimental efforts have shown that multi-joint proprioceptive information can be gathered through only single sensor element, which this reduces system complexity where conventional devices require multiple sensors to achieve multi-joint information. Low-dimensional multi-joint information provided from the exemplary substrate-less sensor reduces computational processing time otherwise consumed by the learning network and allow for faster adaptation to multiple tasks. Moreover, such sensors permit for quick adaptation to different daily tasks, such as motion command, keypad typing, two-handed keyboard typing, and even object recognition, where users give only few-shot examples linking their sensor signals to the corresponding task labels.

In certain other specific embodiments according to the present disclosure, such nanomesh-based devices and apparatuses include a programmable CPU (as a form of a logic circuit) that is trained to interpret motions of the user based on changes in the nanomesh's conductance during the motions. Such an apparatus may include a computing data processor circuit to sense and pseudo-autonomously learn, in response to the signals generated via the conductive strands, the movement of the user portion, and wherein the computing data processor circuit, the nanomesh and the sensing circuit are cooperatively configured as a substrate-less artificial mechanoreceptor equipped with meta-learning.

In connection with some of the sensory feedback provided by the changes in the nanomesh's conductance during the user's motions, certain implementation of certain of the above embodiments are aligned with a form of proprioception. Proprioception provides an understanding of the real-time postural configuration of the user portion (say user's hand or finger) and plays a key role in interactive tasks such as object recognition, manipulation, and communication. In humans, fundamental knowledge on proprioception is developed at an early age in children, the sensorimotor stage, and involves correlating hand motions with the information relayed by cutaneous receptors distributed throughout various locations of skin associated with skin stretching during the motion. As may be implemented with one or more of the above substrate-less nanomesh devices (e.g., artificial mechanoreceptor equipped with meta-learning), this sensorimotor information serves as a prior knowledge of an analogous type that helps infants to quickly learn to perform new tasks with only a few trials.

Figure 1A:
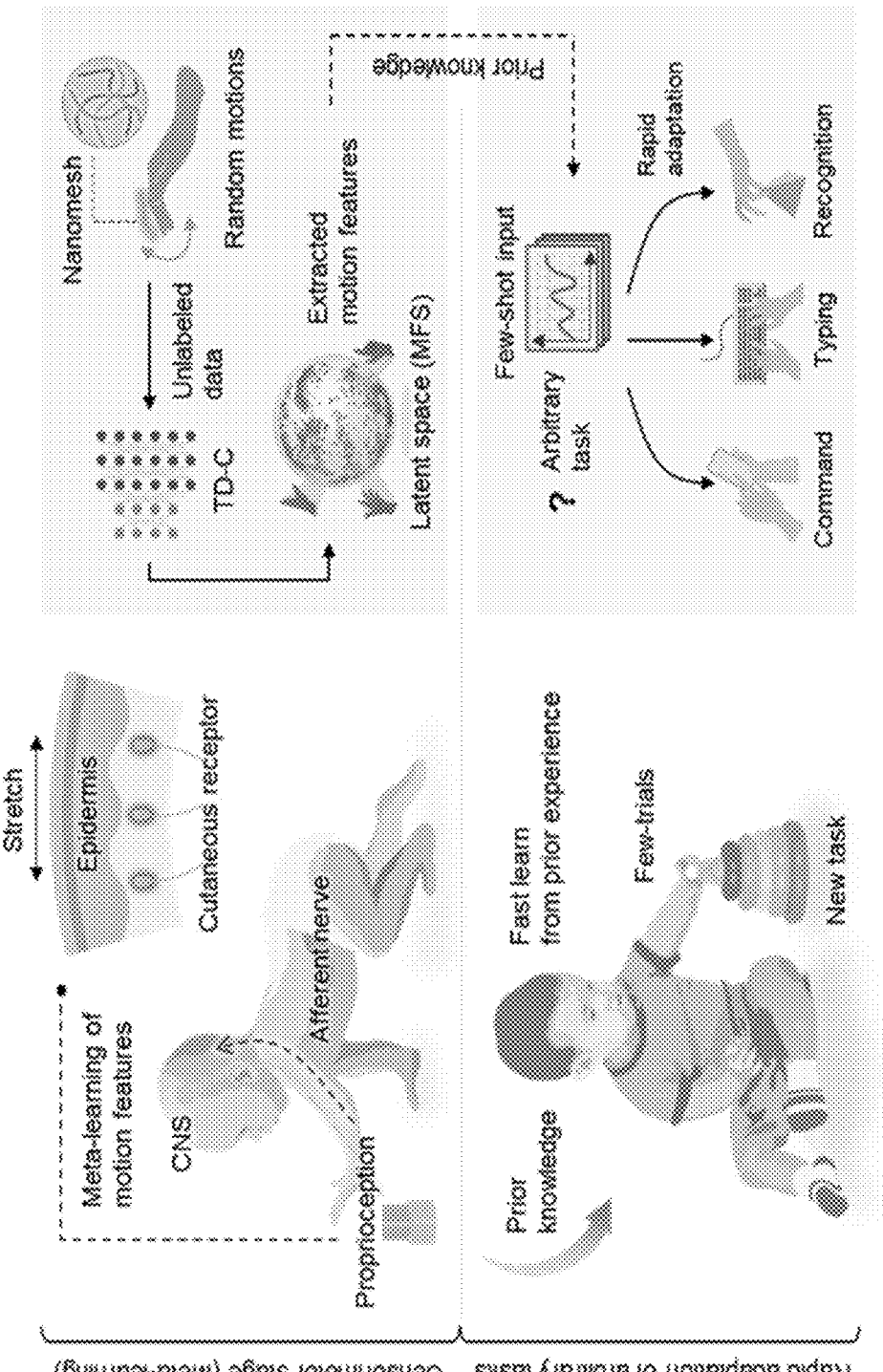
FIGS. 1A and 1B illustrate, according to certain exemplary aspects of the present disclosure, examples of aspects showing an artificial sensory intelligence system.
Figure 1B:
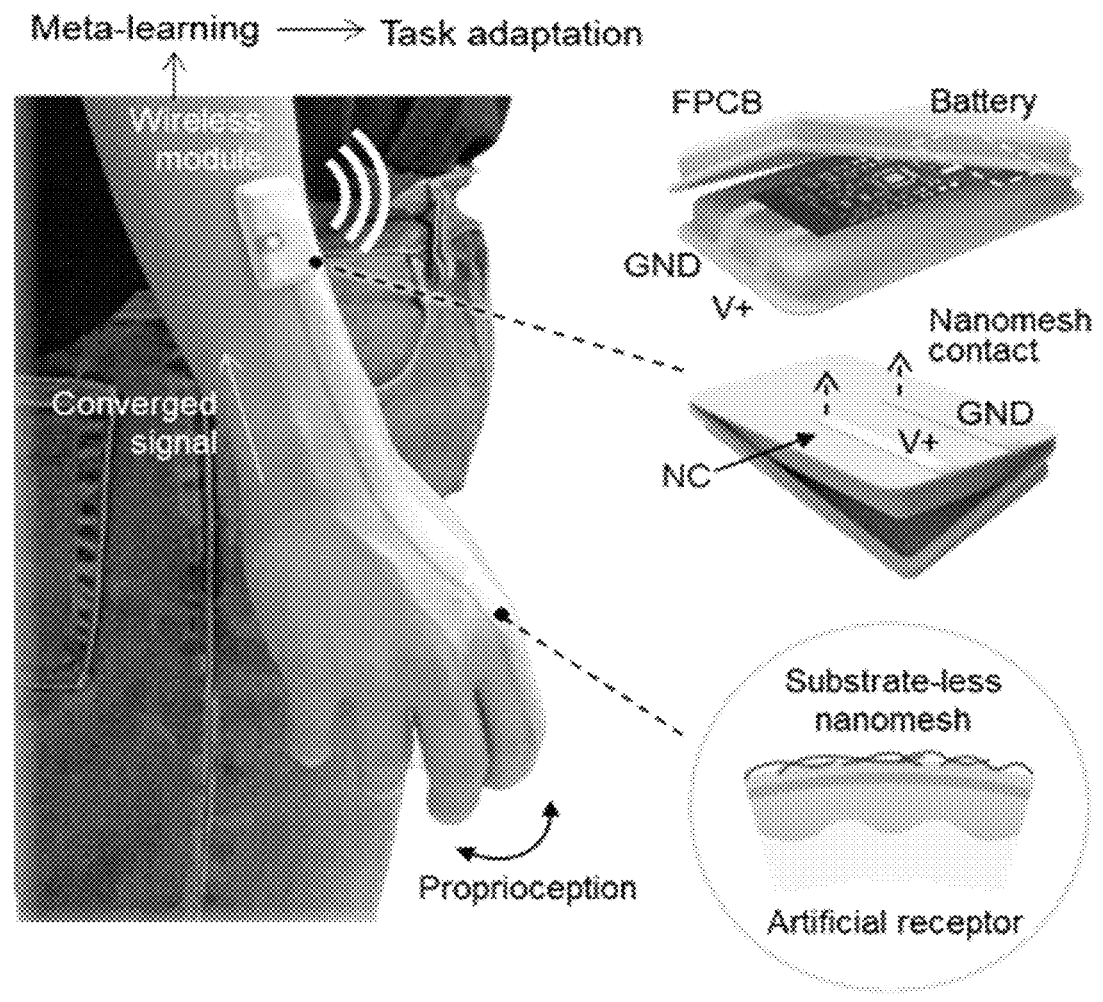

Turning to the drawings, FIGS. 1A and 1B illustrates an example artificial sensory intelligence system, according to the present disclosure that may be configured to implement to proprioception and/or meta-learning via one or more of the above substrate-less nanomesh devices. Such aspects are particular for specific example embodiments, as in FIG. 1A, that use a nanomesh artificial mechanoreceptor integrated with an unsupervised meta-learning scheme and its use for data-efficient user-independent recognition of different hand tasks. The nanomesh is based on biocompatible materials and can be directly printed onto skin without an external substrate, which improves user-comfort and most importantly increases its sensitivity. The system can collect signal patterns from fine details of skin stretches and be used to as proprioception information, analogous to the way cutaneous receptors provide signal patterns for hand motion recognition (see, e.g., Supplementary Note 1 and FIG. 13). With this approach, complex proprioceptive signals can be decoded using information from a single sensor along the index finger, without the need for a multi-sensing array. The rich multi-joint proprioceptive information can thus be produced as low-dimensional data, reducing computational processing time of the learning network (see, e.g., Supplementary Note 2 and FIGS. 14A-14E). While performing different tasks, signal patterns from various joint movements are transmitted using an attached wireless module placed on the wrist (FIG. 1B).

More particularly, FIG. 1A is an illustration of human sensorimotor stage which includes meta-learning of motions through cutaneous receptors (proprioceptive information to central nervous system (CNS)) and its rapid adaptation to unknown tasks. Resembling this nature, the first stage of the learning agent extracts the prior knowledge of human motion as motion feature space (MFS) through unsupervised Time Dependent Contrastive Learning (TD-C) from random hand motion. Prior-knowledge is then transferred with few-shot labels which allows rapid adaptation to versatile human tasks. FIG. 1B is an illustration of an artificial sensory intelligence system, which includes printed, bio-compatible nanomesh cutaneous receptors directly connected with wireless Bluetooth module through nanomesh connector (NC), and further trained through few-shot meta-learning.

Advantageously, specific embodiments of the present disclosure use a learning process based on a computing data-processor circuit (e.g., integrated with or remotely coupled to the nanomesh) that is configured to learn such motions for acting as a neural sensory node (e.g., in understanding how certain conductions patterns sensed via the nanomesh over moving surfaces of the user portion, such as random finger motions sensed at one or more finger joints) provide prior motion representation knowledge. This approach does not require large amounts of data to be collected for each individual user; rather, a time-dependent contrastive learning algorithm (TD-C learning) may be used, according to specific aspects of the present disclosure, to provide an awareness of temporal continuity and to generate a motion feature space (MFS) representation of the prior knowledge. This allows the system to learn prior knowledge using unsupervised contrastive learning from unlabeled signals collected from three different users to distinguish user-independent, task-specific sensor signal patterns from random hand motions. This prior knowledge has been shown, via use with other users in experimental example implementations, to manifest an accuracy of 80% within 20 transfer training epochs. Such experimental efforts have shown that the pre-trained model can quickly adapt to different daily tasks, such as motion command, keypad typing, two-handed keyboard typing, and object recognition, using only a few hand signals.

Figure 2A:
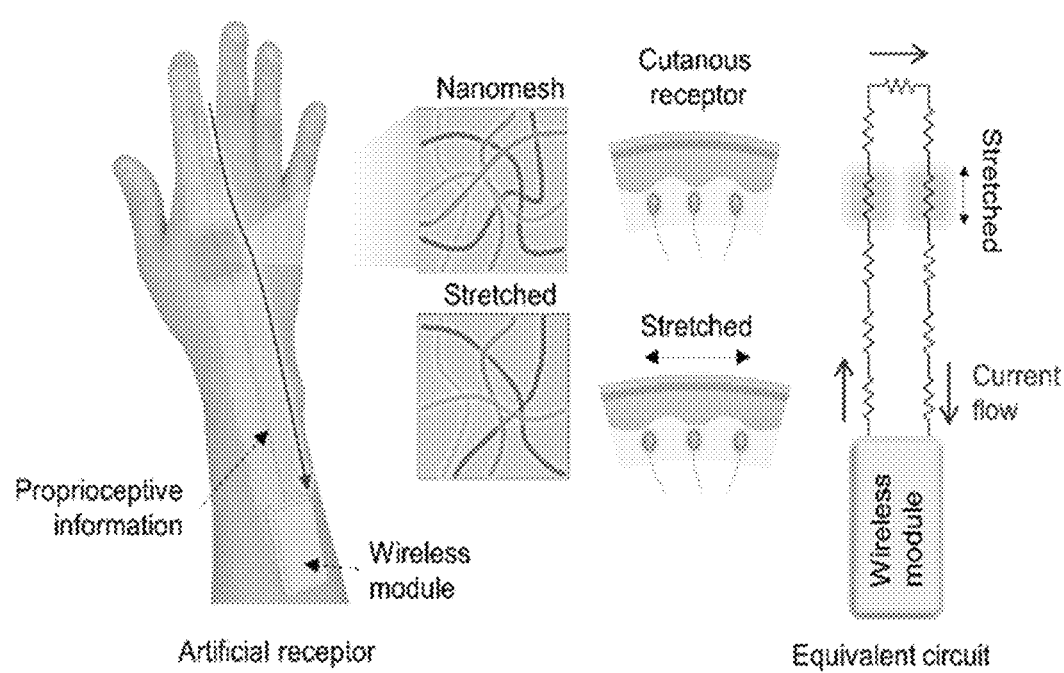
FIGS. 2A, 2B, 2C, 2D, 2E and 2F illustrate, according to certain exemplary aspects of the present disclosure, respective performance aspects of a nanomesh-type apparatus and related aspects.
Figure 2B:
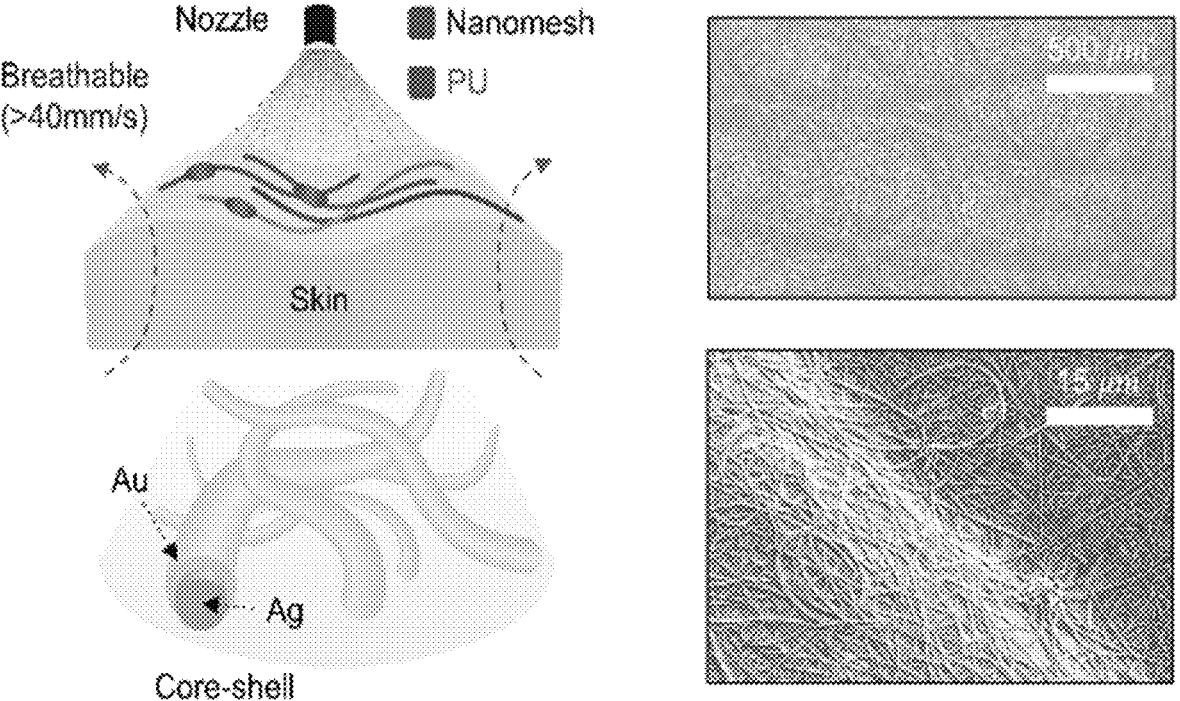

In addition to the ability to generate proprioception-like diverse sensing output patterns based on fine movements of finger and wrist, the example nanomesh is biocompatible, breathable, and mechanically stable (FIG. 2B). The gold-coated Ag(Core)/Au(Shell) nanostructures of the nanomesh prevent the cytotoxic silver ions from direct contact with skin. The long dimension of the Ag(Core) wires (length~80 µm) results in a high mechanical stability (FIGS. 17A-17F). No obvious inflammation response of skin to the nanomesh was observed by both in-vitro and in-vivo experiments (FIGS. 18A-18F). A polyurethane (PU) coating was sprayed onto nanomesh to create a droplet-like porous structure to prevent nanomesh from being easily scratched while having an air permeability of more than 40 mm/s (FIGS. 20A-20C). A scratch test was carried out with the sample printed on a porcine skin to mimic human skin. The PU-reinforced nanomesh (FIGS. 22A-22F) outlasted the unprotected nanomesh (over 1.5k cycles) when subjected to scratching from a silicon tip (FIGS. 23A-23E). These results show that the PU-protected nanomesh is suitable for daily activities (Supplementary Note 4, FIGS. 15A-15E and FIGS. 25A-25E), while is still removable as needed by rubbing during handwashing (FIG. 24). Furthermore, the nanomesh was readily applied to skin using a custom-designed portable skin printing device (FIG. 2g, FIGS. 26A-26D). A subsequently attached silicone-encapsulated wearable wireless module further provided a user-comfort and self-contained system (FIGS. 7A-7B).

Figure 2C:
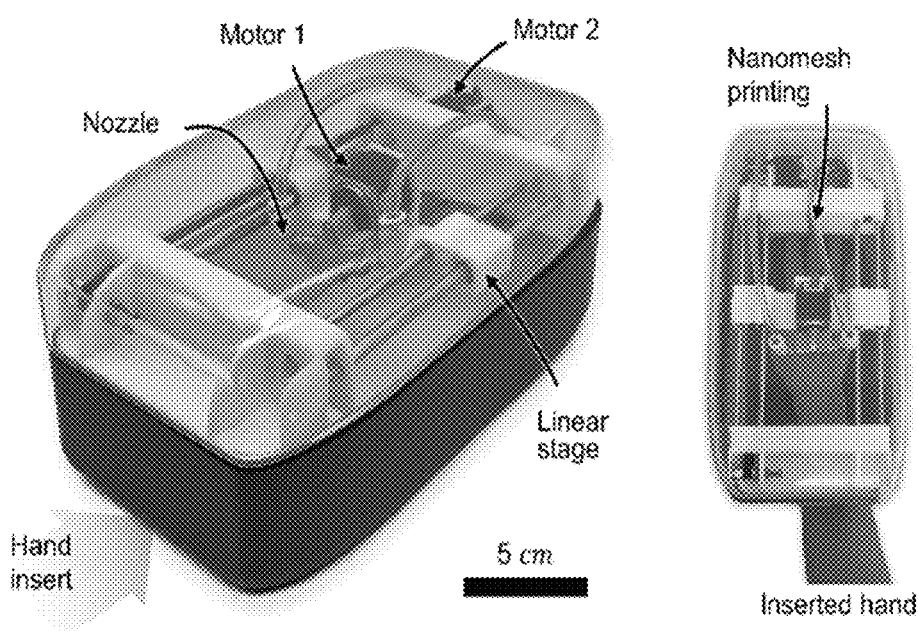
Figure 2D:
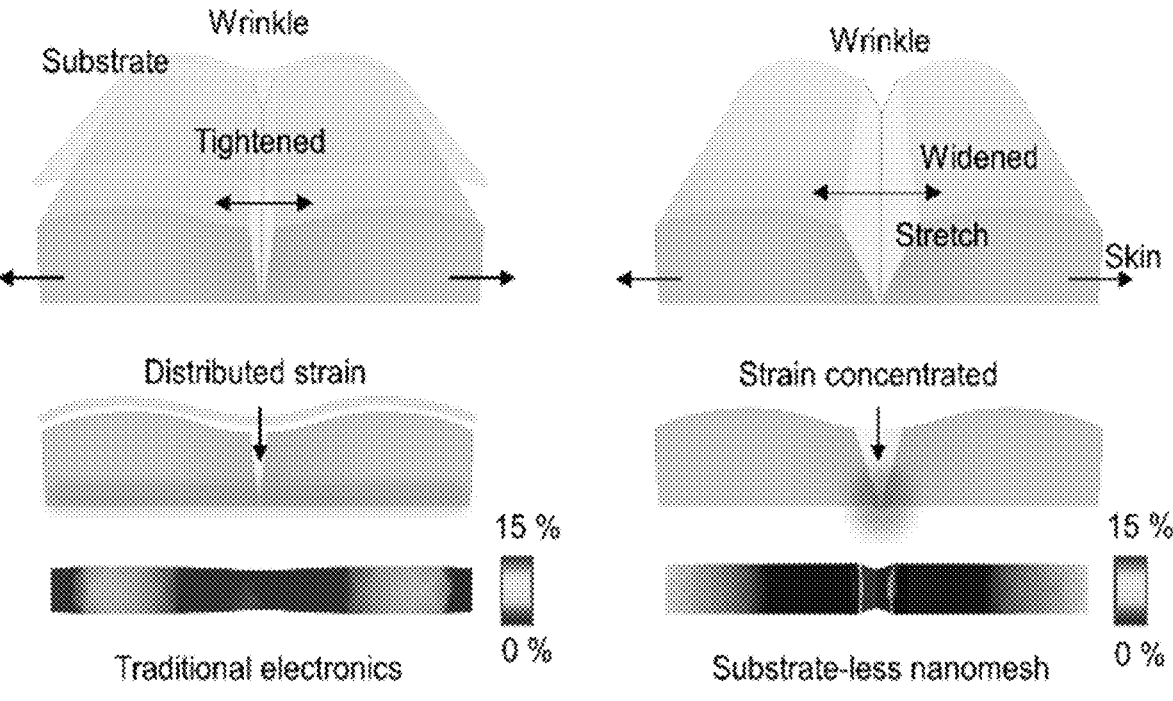
Figure 2E:
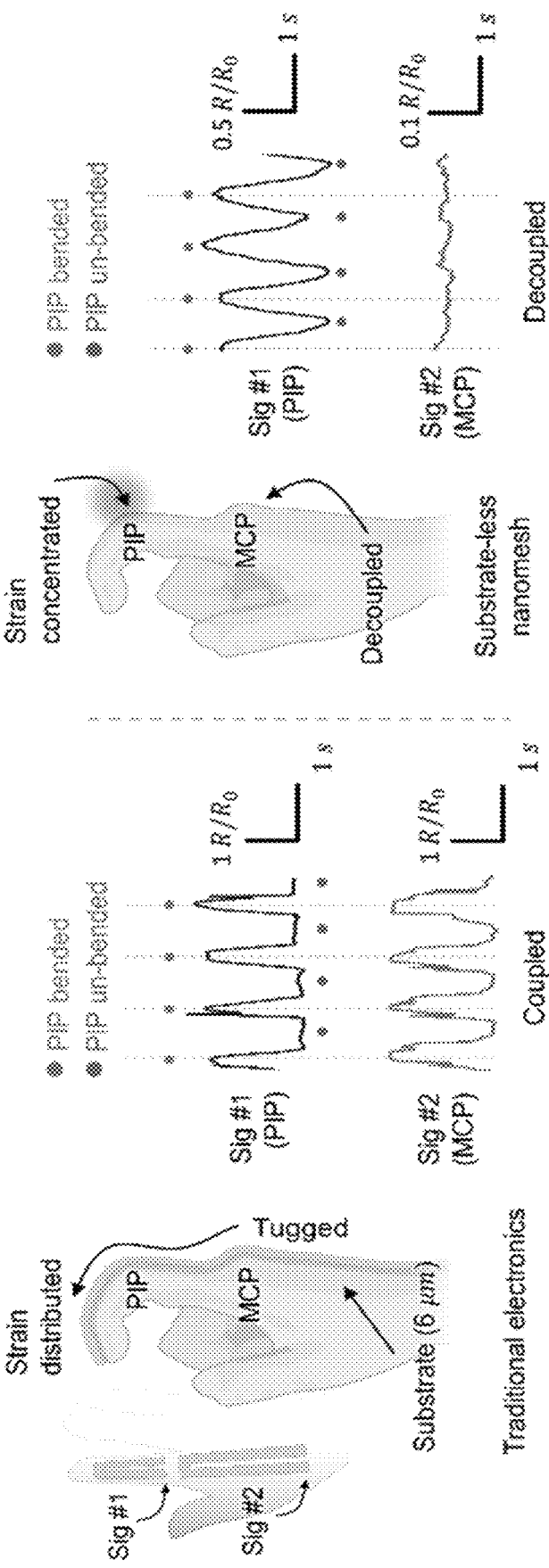
Figures 8A, 8B:
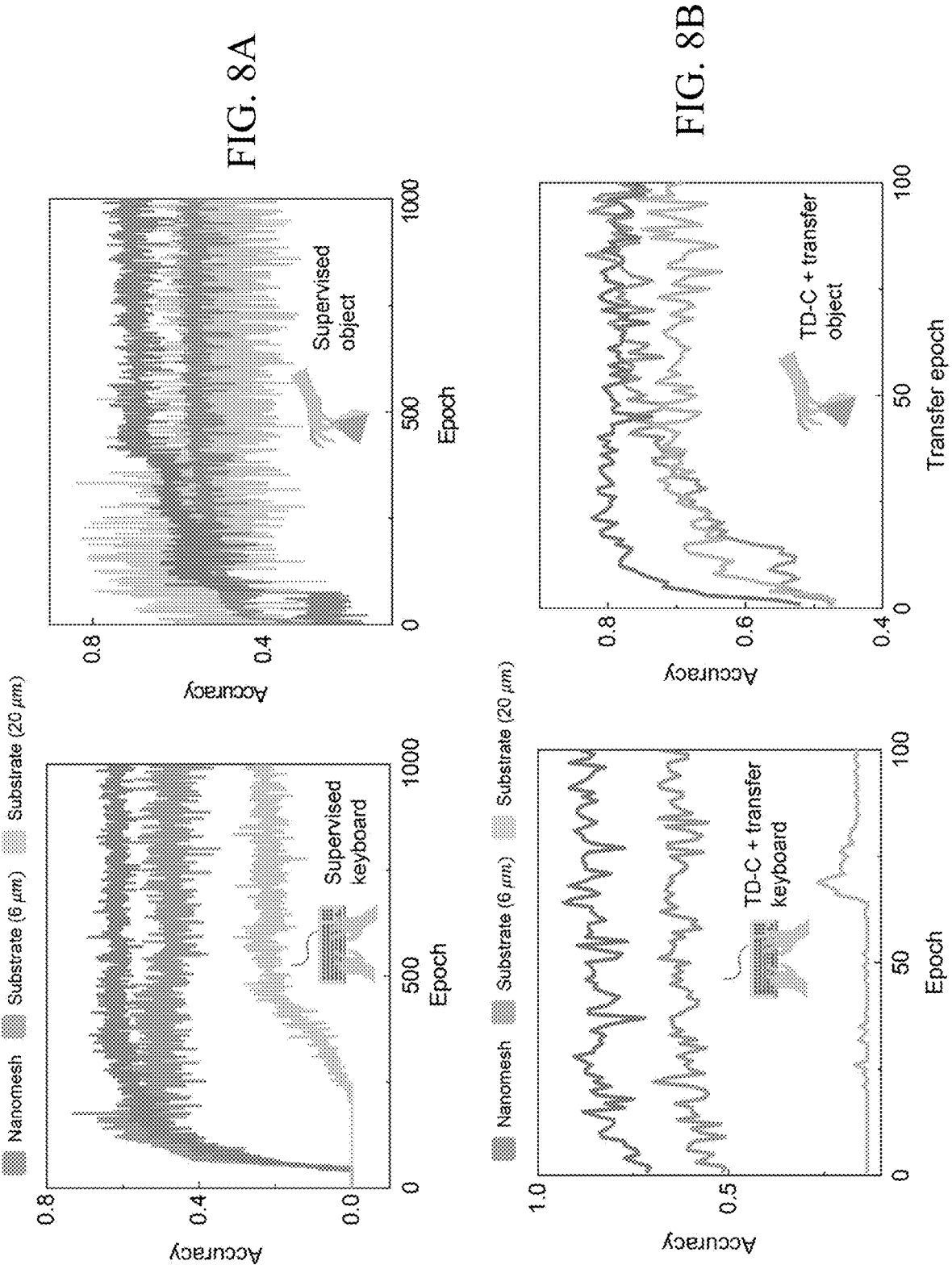
FIGS. 8A and 8B illustrate aspects of an example model validation accuracies and transfer learning accuracies for sensor signal with and without substrate, according to example embodiments of the present disclosure.

The substrate-less feature of the example artificial receptor is a marked improvement from previously reported substrate-based wearable electronics. Due to its ultra-conformal nature (Supplementary Note 3 and FIGS. 19A-19B), the substrate-less nanomesh enables capturing proprioceptive signals without losing its local information (FIG. 33). Although ultrathin sensors (sub-micrometer) were recently demonstrated, challenges remain in terms of reducing motion artifact noises since even an extremely thin layer can still suffer from substantial information degradation. Another work also demonstrated the benefit of reducing motion artifacts by directly printed sensors on human body. The high conformability of substrate-less interface may be deemed, for many but not all implementations, to be critical in sensor resistance to motion artifacts. As illustrated in FIG. 2d, during the flexion of the joints with a printed substrate-less nanomesh, the strain caused by the opening and closing of the wrinkles contributed to most of detected changes. However, the presence of a substrate reduces the conformability of the sensor and hinders the detection of changes with the wrinkles, making it harder to detect intricate changes from different types of finger movements. In addition, the example is designed via a control experiment, in which a thin layer of PU substrate (6 µm) was applied before nanomesh printing and compared with two separate printed substrate-less nanomesh sensors, to gather signals from both Proximal Interphalangeal (PIP) and Metacarpophalangeal (MCP) regions (FIG. 2E and FIGS. 21A-21B). During the isolated PIP movement under normal conditions, the stretching of the substrate placed on top of MCP joints (tugging the MCP region, FIG. 2E) resulted in strong signal changes in the MCP (Sig #2) area. However, for the substrate-less nanomesh, most of the strain was centered on the PIP joint, activating only the nanomeshes on the PIP (Sig #1) area (with resolution of 15 mm, FIGS. 21A-21B). The localized and decoupled signal properties of the substrate-less nanomesh enabled better learning performance (FIGS. 8A-8B). In contrast, performance degradation can be observed upon applying a substrate. The nanomesh further clearly differentiated various patterns of hand motions (FIG. 2f) and exhibited high durability upon various environmental effects (Supplementary Note 4 and FIGS. 15A-15E). These overall characteristics of the substrate-less nanomesh rendered the measurement of multi-joint proprioceptive information with a single sensor element possible (FIG. 33). Importantly, the example approach enabled the minimization of circuitry complexity and computing resources by providing low-dimensional but highly informative proprioceptive information to the learning network (Supplementary Note 2).

More specifically, FIGS. 2A-2F illustrate aspects of experimental performance of the nanomesh and devices being utilized, according to certain examples of the present disclosure, as may be useful to appreciate an implementation for a cutaneous nanomesh artificial mechanoreceptor. With the appreciation that proprioception relates to the body's ability to sense movement, action and location, relies on encoding mechanical signals collected by numerous cutaneous receptors into neural representations (i.e., patterns of neural activities), the cutaneous receptors are activated by the stretching of the skin and can detect various joint movements. Such a function can be emulated by employing a single two-terminal nanomesh element along the index finger extending to the wrist. The integrated signals of the entire finger postures and movements can be collected as shown in FIG. 2A. Due to the intimate contact of the nanomesh with skin, it follows closely to the topography of the skin and transforms even micro movements into resistance variations with high sensitivity (FIGS. 17A-17F). Signal outputs corresponding to fine details of elongation and compression of the skin due to arbitrary hand movements are then collected and transmitted by a wireless module (Methods and FIGS. 7A-7B).

Figure 2F:
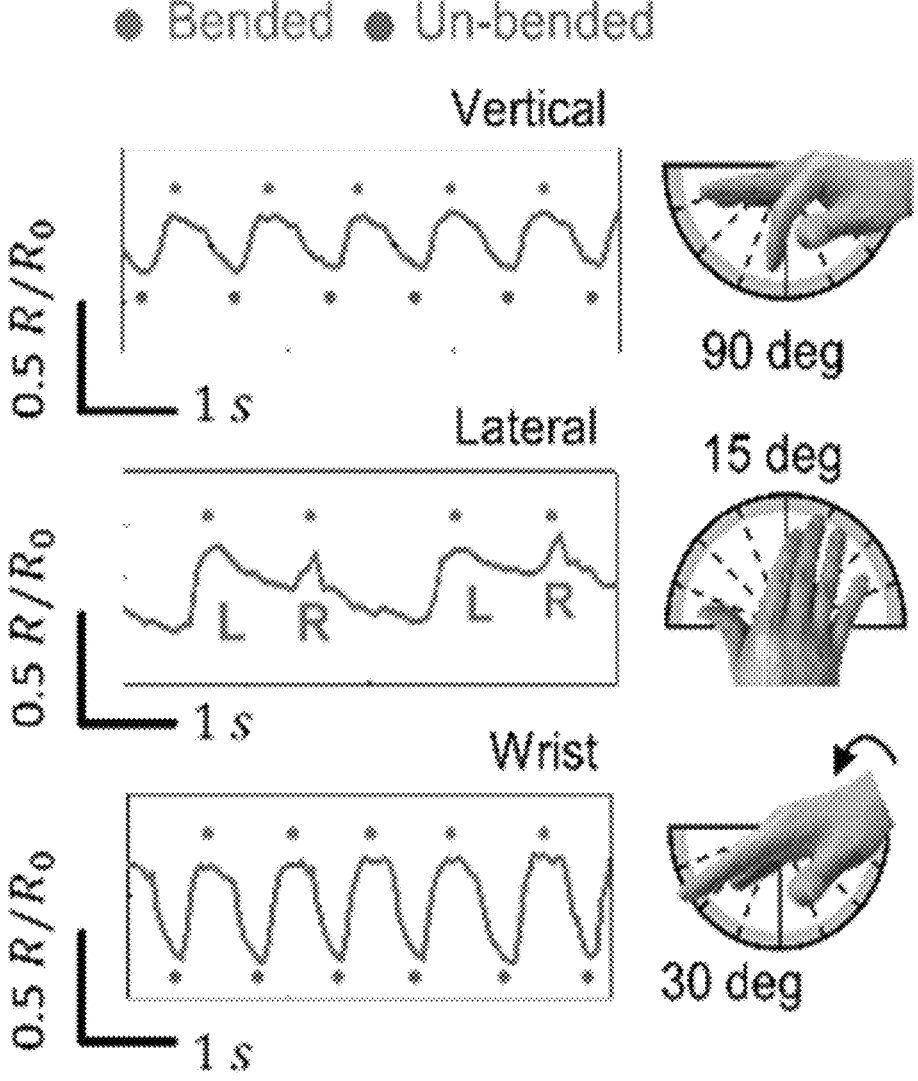

FIG. 2A shows a comparison between human cutaneous receptor and this exemplary type of nanomesh receptor. Resistance variations generated by the nanomesh are measured through the wireless module. FIG. 2B concerns reinforced nanomesh through consecutive printing of PU and core-shell Ag@Au structures. Nanomesh shows endurance against cyclic friction while maintaining high breathability and biocompatibility. The right image shows the intimate contact of nanomesh above the skin with a magnified view via scanning electron microscope (SEM) image. FIG. 2C is a photograph of the portable nanomesh printer. FIG. 2D shows traditional electronics and substrate-less nanomesh under 15% of strain. The substrate constrains the wrinkles due to its lack of intimate contact. FIG. 2E shows a nanomesh on metacarpophalangeal (MCP) area which is activated by Proximal Interphalangeal (PIP) alone movement in traditional electronic design (substrate thickness 6 μm, modulus 7 MPa), while no coupling was seen in exemplary types of design according to the present disclosure. Nanomesh is printed with 16 cycles of spraying. FIG. 2F shows the nanomesh response data to both finger and wrist movements.

Certain aspects and embodiments of the present disclosure involve meta-learning and limited (e.g., few-shot or a few-to-several shot adaptation) for a new user. In connection with processing for proprioception during the so-called sensorimotor stage, another aspect of one type of example embodiment of the present disclosure pertains to creation of a general latent feature space, termed "Motion Feature Space (MFS)". This MFS is to represent prior knowledge of human finger motions and make it generalizable to different users and daily tasks. Briefly, for arbitrary users with newly printed sensors, different signal patterns are generated in terms of signal amplitudes and frequencies due to their distinctive hand shapes and postures (FIGS. 27A-27D). When a learning model tries to infer hand gestures from signals of the users, which were not included in the training dataset, the variabilities will lead to substantial out of distribution and domain shift errors. Furthermore, considering the diversity of hand gestures and tasks performed in daily lives, it was necessary to both collect a labelled training dataset and modify model architecture for each individual task when applying previous supervised learning models for general usage. To address these limitations, experimental examples/work according to the present disclosure set out to generate a separable MFS that can be utilized for signal patterns not shown in the training dataset. While other stable methods exist for training neural networks to build feature spaces for later adaptations, these methods either deal with formalized data (tokenized words, images) or have restricted target users and tasks. Consequently, these methods are unable to use small amounts of random motion data to differentiate pattern differences caused by variations in both tasks and user bodies. Therefore, instead of mapping sensor signals to specific motion labels, experimental examples/work according to the present disclosure developed a learning model that utilizes unlabeled random motion data to meta learn, allowing us to discriminate between different signals by projecting signals into a separable space. Briefly, after a new user provides a small set of actions, these signals are separated in the example MFS to be compared to real-time user inputs, which allows the example metric-based inference mechanism to correctly recognize the gestures of the user even though the signal patterns are different from users and tasks in the training data.

Figures 9A, 9B:
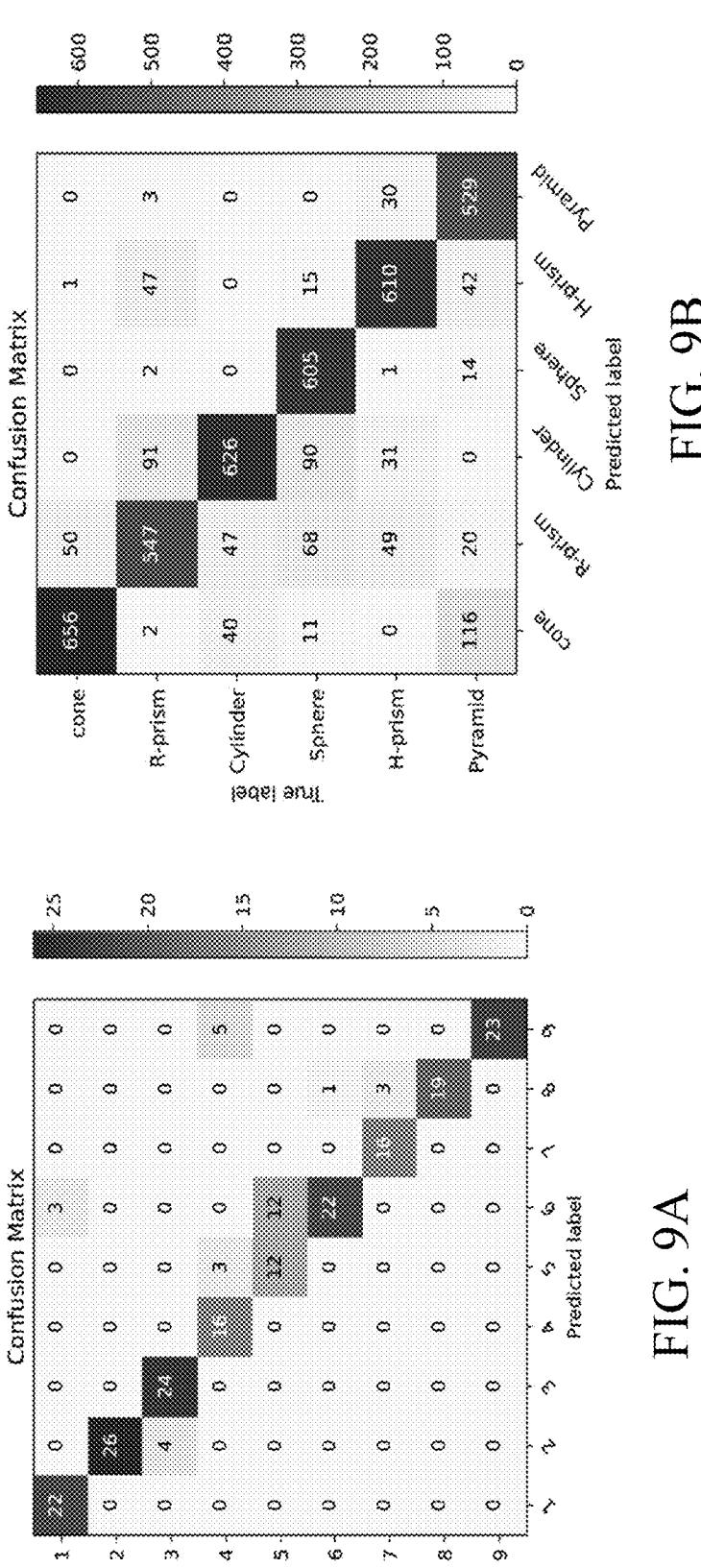
FIGS. 9A, 9B, 9C, 9D, 9E and 9F illustrate aspects of an example model performance analysis and ablation studies for components in the learning models according to example embodiments of the present disclosure.
Figure 9C:
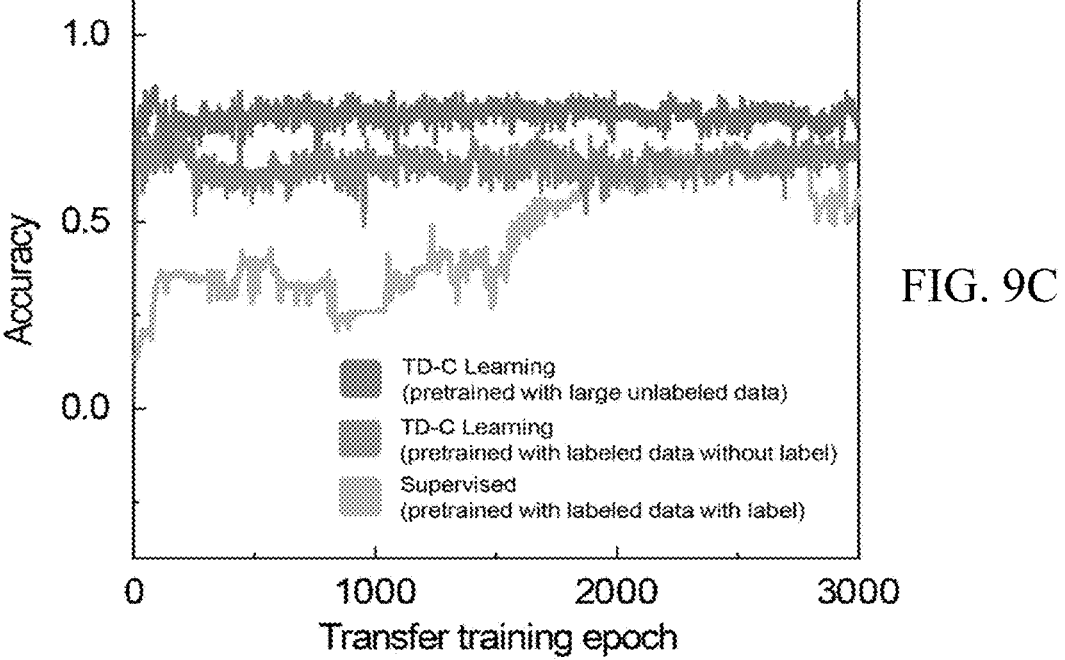
Figure 9D:
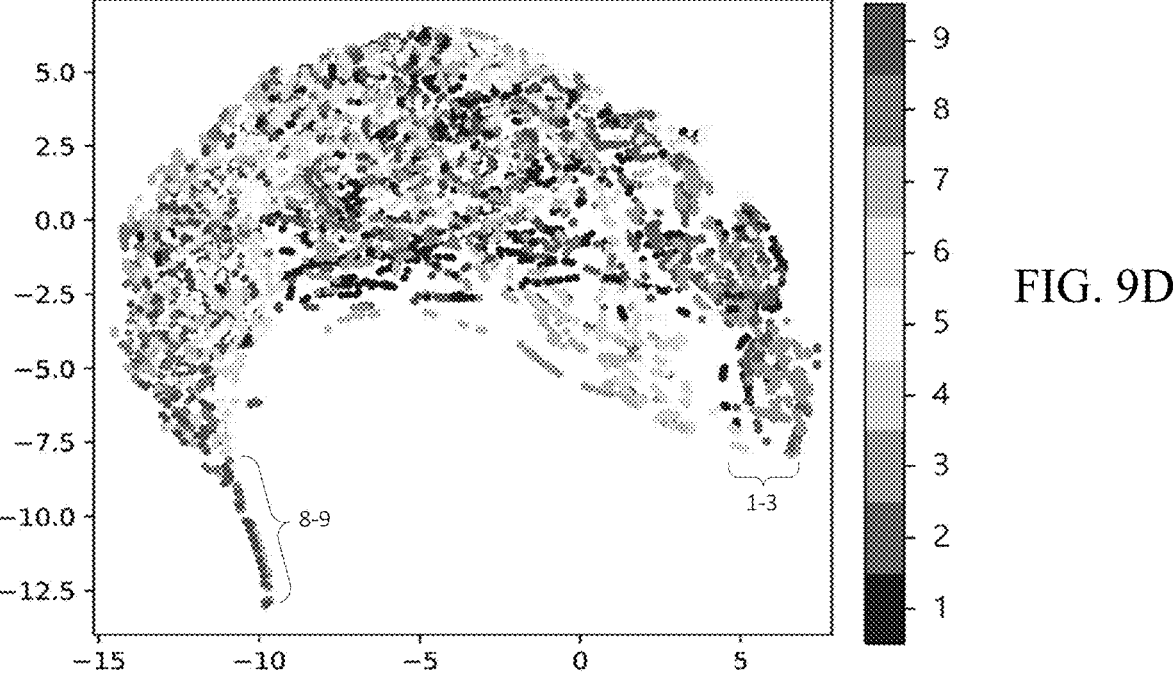
Figures 9E, 9F:
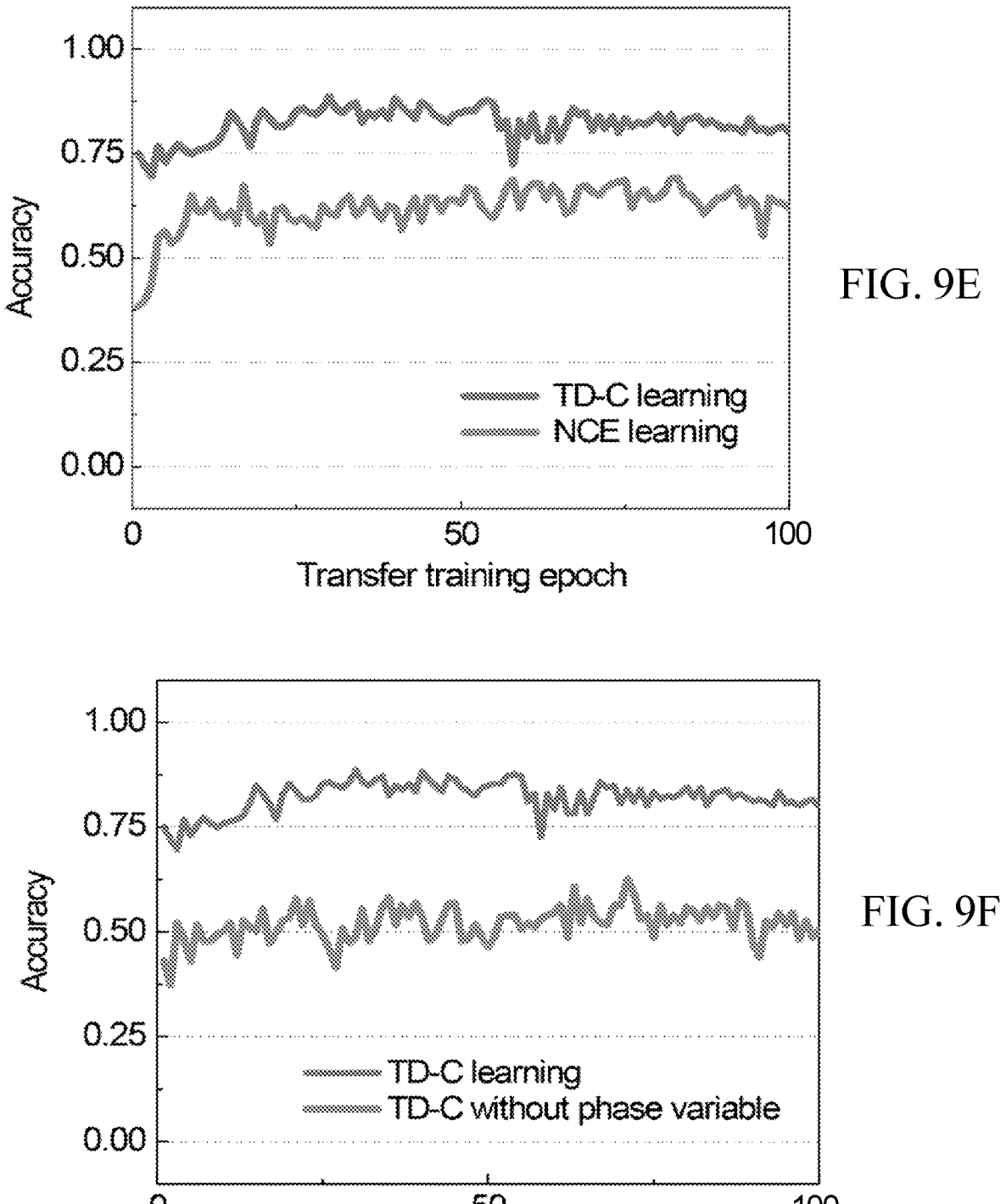

To generate MFS without labels, experimental examples/work according to the present disclosure adopt an unsupervised learning method called 'contrastive learning', in which the model learns to discriminate different inputs by maximizing similarities of positive pairs augmented from the same instances while minimizing the similarities of different instances. Previous methods have been designed to encode image data and do not consider time correlation. Analogous to how the awareness of motion continuity in time helps infants to develop a stable perception, models without time consideration would inevitably omit consecutive sensor signals, resulting in an unstable motion space and lowering the accuracy (FIG. 9E). Experimental examples/work according to the present disclosure carefully select data augmentation methods, such that the corresponding hand postures of the data augmented signals remain consistent.

Consistent with the above, certain implementations according to the present disclosure are configured with Time-Dependent Contrastive Learning (TD-C Learning) which uses temporal features to generate MFS from unlabeled random hand motions. Instead in providing specific labels to train the example neural network, experimental examples/work according to the present disclosure generated positive pairs based on time-wise correlation and trained the example model to minimize distances (based on cosine similarity) between positively paired signals in the example encoded latent space. First, experimental examples/work according to the present disclosure generated strong positive pairs through data augmentation. Given a sensor input grouped with a sliding time window (see Supplementary Note 5 and FIGS. 16A-16B for model performance for various time window sizes), experimental examples/work according to the present disclosure generated two augmented sensor signals through jittering data augmentation (FIGS. 11A-11E). While other temporal signal augmentation methods exist, those methods altered signal amplitude patterns and hindered the model from distinguishing different motions (FIGS. 11C-11E, Methods). Originating from the same sensor signals, these two signals were considered as a strong positive pair since they represent the same motion. Second, experimental examples/work according to the present disclosure assigned consecutive augmented signals (distanced at most a half of the time window) as positive pairs.

These consecutive time windows represented similar hand poses since hand motions are continuous. Therefore, experimental examples/work according to the present disclosure assigned a connection strength between signals based on their time differences and the example model receives discounted positive rewards that are proportional to connection strength for grouping consecutive sensor signals (see Methods). A Transformer encoder supported by attention mechanism was adopted to encode long-term temporal signal patterns without iterative signal processing. Giving a tolerance for the model to map semantically similar sensor signals based on temporal correlation, the model could generate better quality features and showed stronger performances when it was transferred to different tasks. See, e.g., FIGS. 6A-6B, and FIGS. 11A-11B which illustrate experimental results of the example model's ability to distinguish different sensor signals even without having any labels.

Figures 6A, 6B:
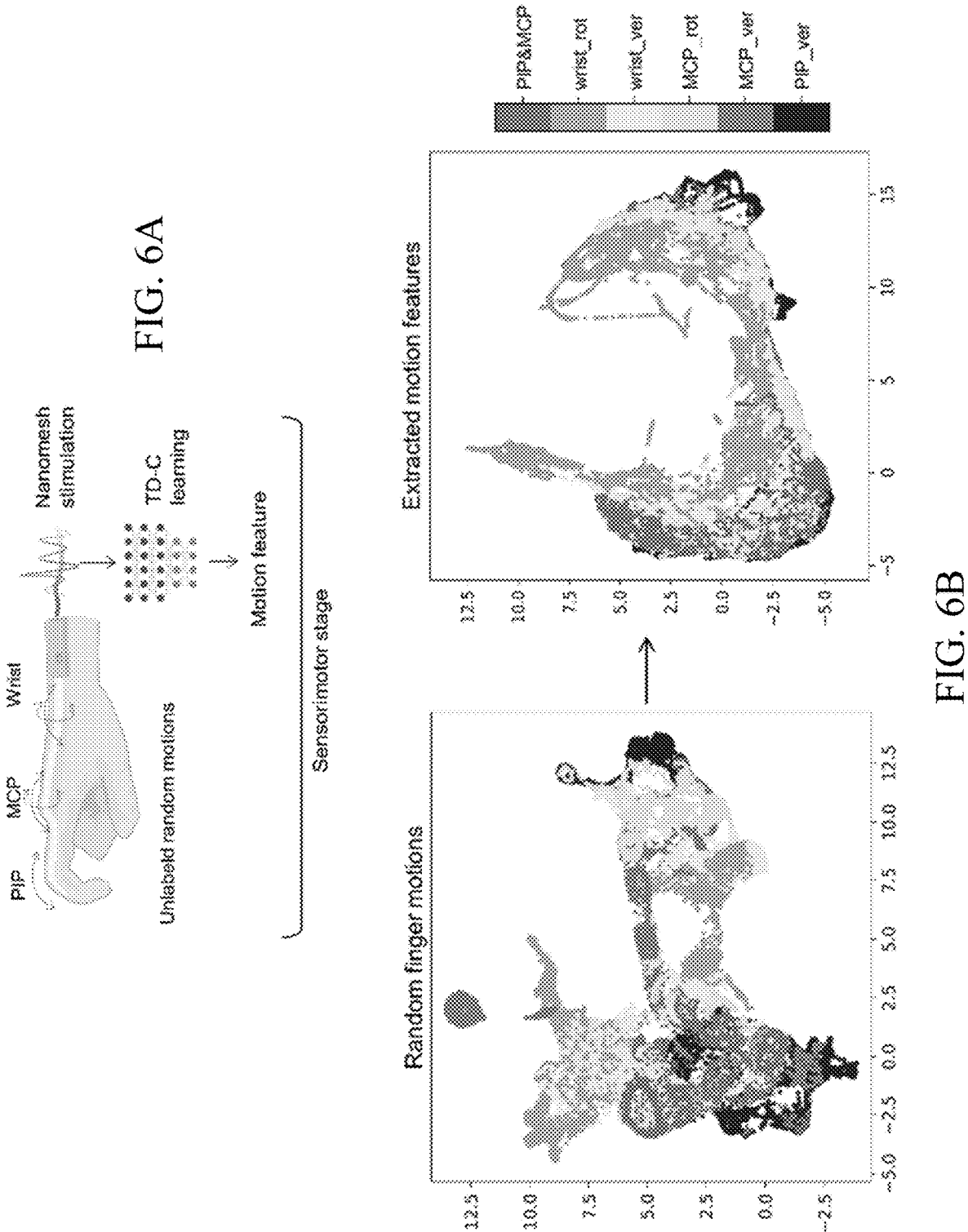
FIGS. 6A and 6B illustrate an example learning robust motion representation from unlabeled data, according to examples embodiment of the present disclosure.

To investigate the model's ability to extract useful motion features, experimental examples/work according to the present disclosure collected unlabeled random finger motions (bending and rotation) of PIP, MCP, and wrist motion signals through a single substrate-less nanomesh and then conveyed the information through the TD-C network (FIG. 6A and Method). The joint signals of PIP, MCP, and wrist are clearly represented in the 'Uniform Manifold Approximation and Projection' (UMAP) as shown in FIG. 6B, illustrating the ability of the TD-C model to extract useful information from coupled signals. Interestingly, the signals of combined motion of PIP and MCP joints were located in between PIP-only and MCP-only motions, and this revealed that the example nanomesh sensor signals contained all three joint movements and it effectively translated the skin-stretches into multi-joint proprioception. Moreover, to determine the use of resistive variations between joints for complex tasks, experimental examples/work according to the present disclosure utilized these signals for actual motion prediction. As shown in FIG. 33 and FIGS. 34A-34C, the example system was able to determine the position and the bending angle of the motion (bending and rotational), as well as the multimodal movements.

The extracted motion features were then used for few-shot adaption to arbitrary tasks. To overcome domain shift issues, experimental examples/work according to the present disclosure adopted a metric-based inference mechanism to predict users' gestures in various daily tasks (FIG. 3B). The model was first fine-tuned to refine the MFS by additionally giving rewards for mapping the same-classed latent vectors to a closer feature space. The model performs 'Maximum Inner Product Search' (MIPS) with a given few-shot labeled dataset to identify the current gesture. Comparing signals generated from the same user with the aid of the highly separable MFS, the model can avoid domain shift issues and utilize motion knowledge generated from TD-C learning. Details of learning procedures are further described in methods and pseudocode in FIG. 29.

In between two different gestures (active phase), there exists an intermediate period where users have no specific intention (inactive phase). Since inactive phases occur between active phases of motion, it is thus unavoidable for the model to project inactive phase signals near to active phase signals while considering temporal correlations, as shown in FIG. 3D. To avoid misclassification caused by neighboring inactive phases, experimental examples/work according to the present disclosure additionally train a phase block in transfer learning to clearly delineate the active and inactive phase of gestures (FIG. 28). Specifically, input signals are regarded as active phase signals if corresponding phase variables generated by the phase block are higher than a predefined threshold. Therefore, in actual testing time, experimental examples/work according to the present disclosure performed MIPS only between active phase signals and few-shot demonstrations annotated as active phases. The example model with the phase block clearly separated these entangled phases, and ablation studies on adding the phase block are shown in FIG. 9F. The user-wise few-shot labeled dataset and corresponding model predictions are illustrated in FIG. 3C. With transferable MFS and user wise metric-based inference, the example model can robustly predict hand actions from different users. In addition, the example learning framework performs robustly to variations in nanomesh density (FIG. 30). The example model's ability to transfer knowledge to users with newly printed sensors, compared to a traditional supervised learning framework was demonstrated in FIG. 3E. While the model trained with supervised learning methods required >3000 training epochs to adapt to the new user, the model trained with the example developed learning framework showed >80% accuracy within 20 transfer training epochs. FIG. 9D illustrates UMAP projection of embedded signal vectors in MFS into a 2D space where feature vectors were discriminated into correlated feature spaces.

Figure 3A:
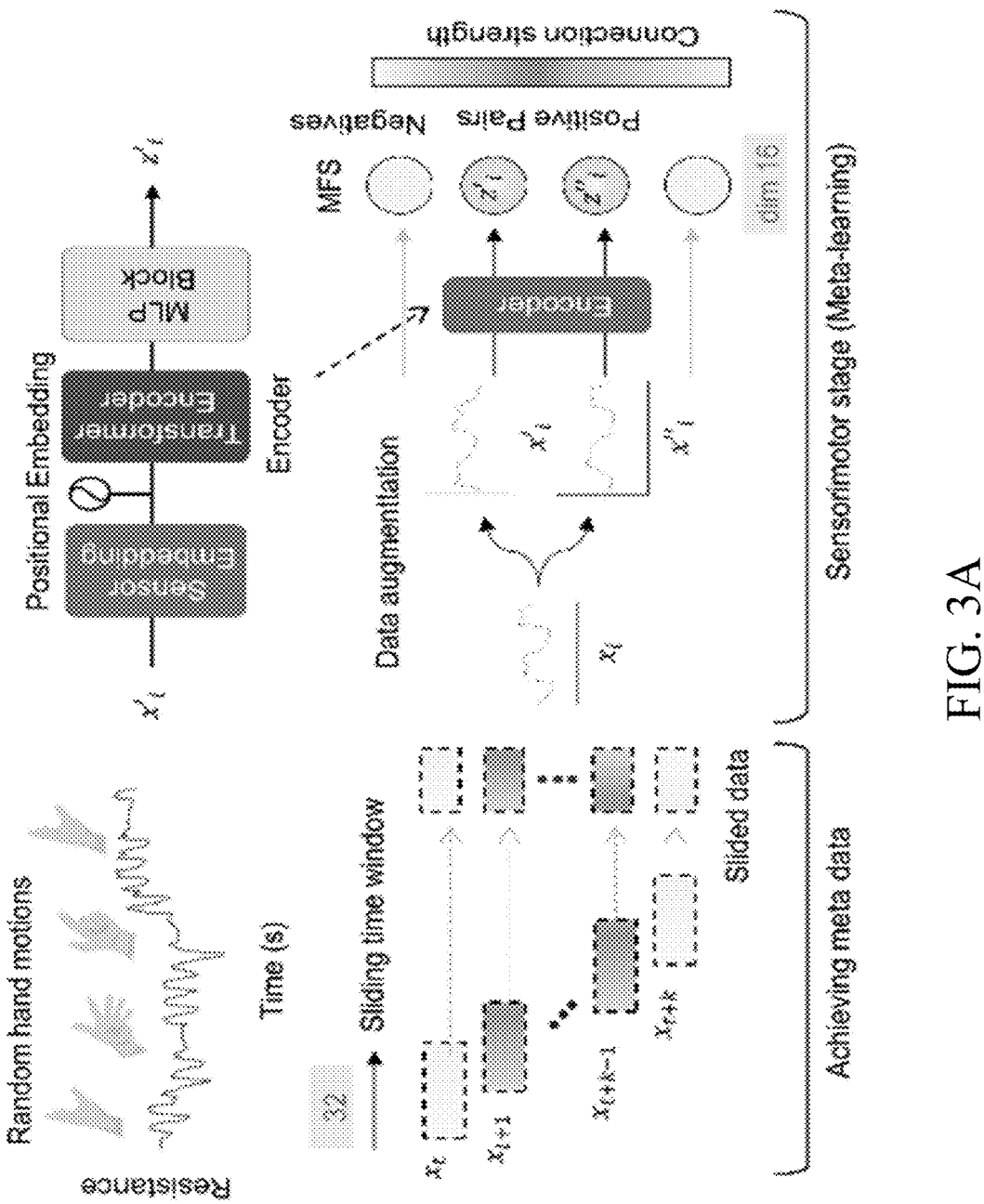
FIGS. 3A, 3B, 3C, 3D and 3E, according to certain exemplary aspects of the present disclosure, illustrate examples of TD-C Learning and experiment results on learning performance, according to example embodiments of the present disclosure.
Figure 3B:
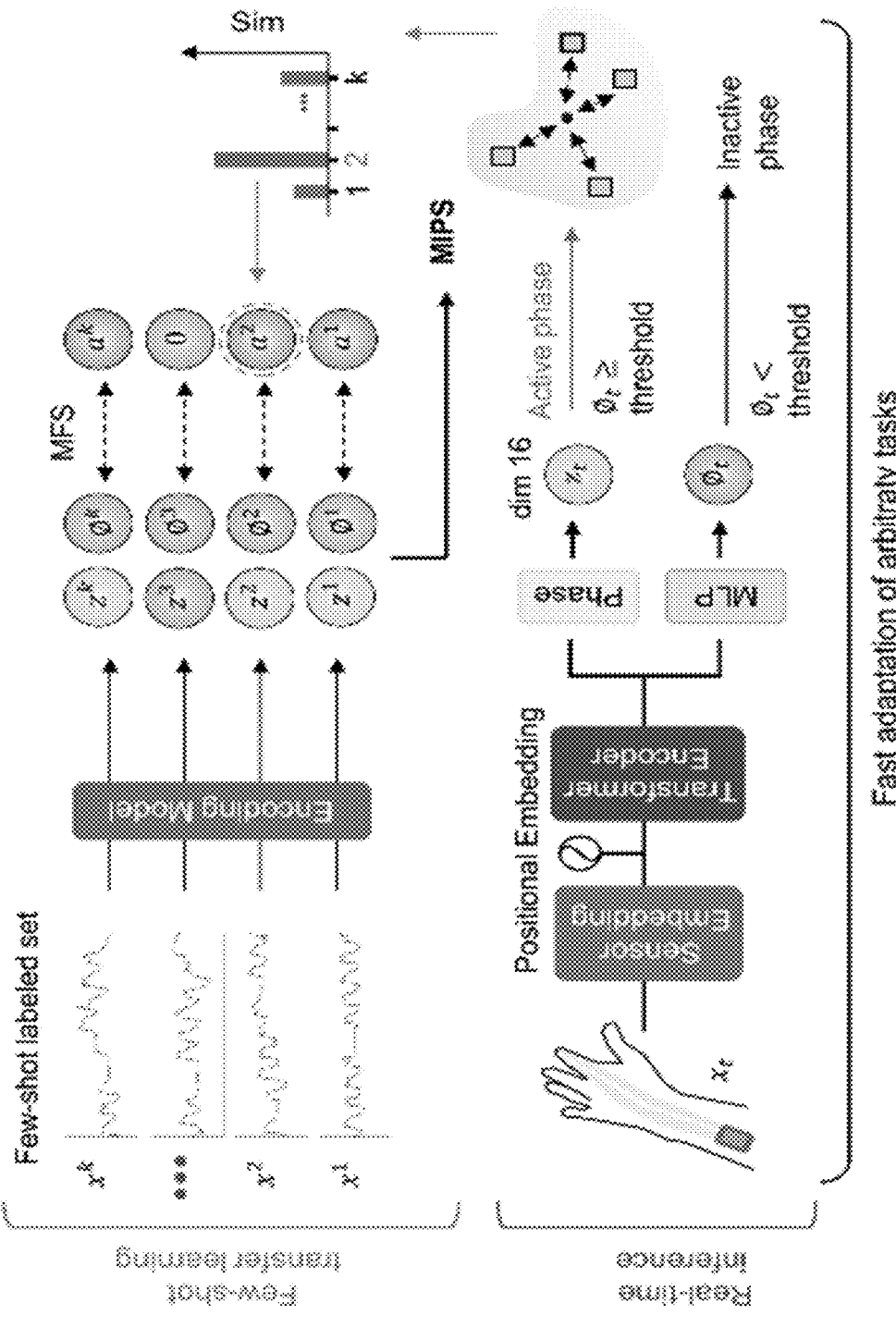
Figure 3C:
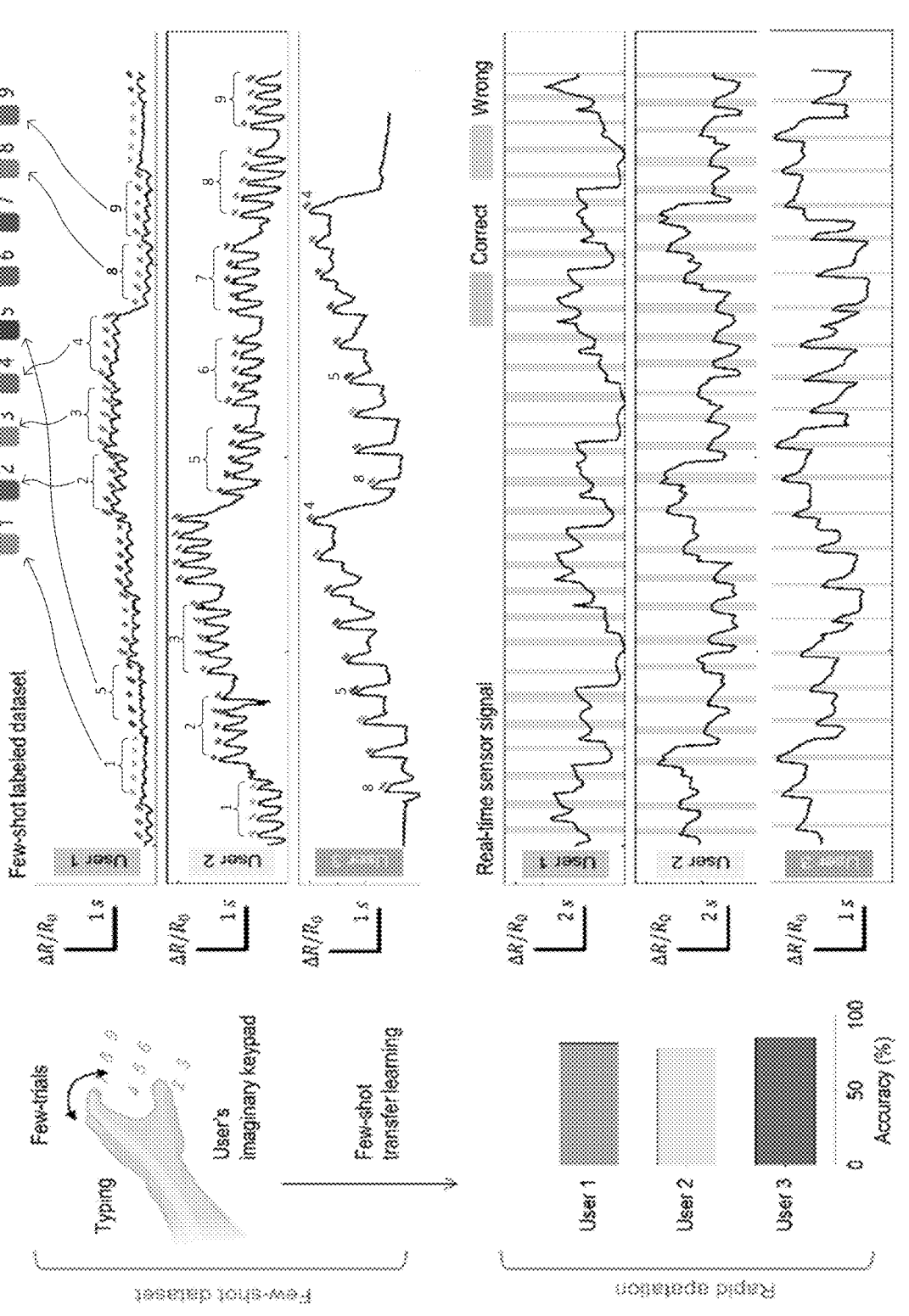
Figures 3D, 3E:
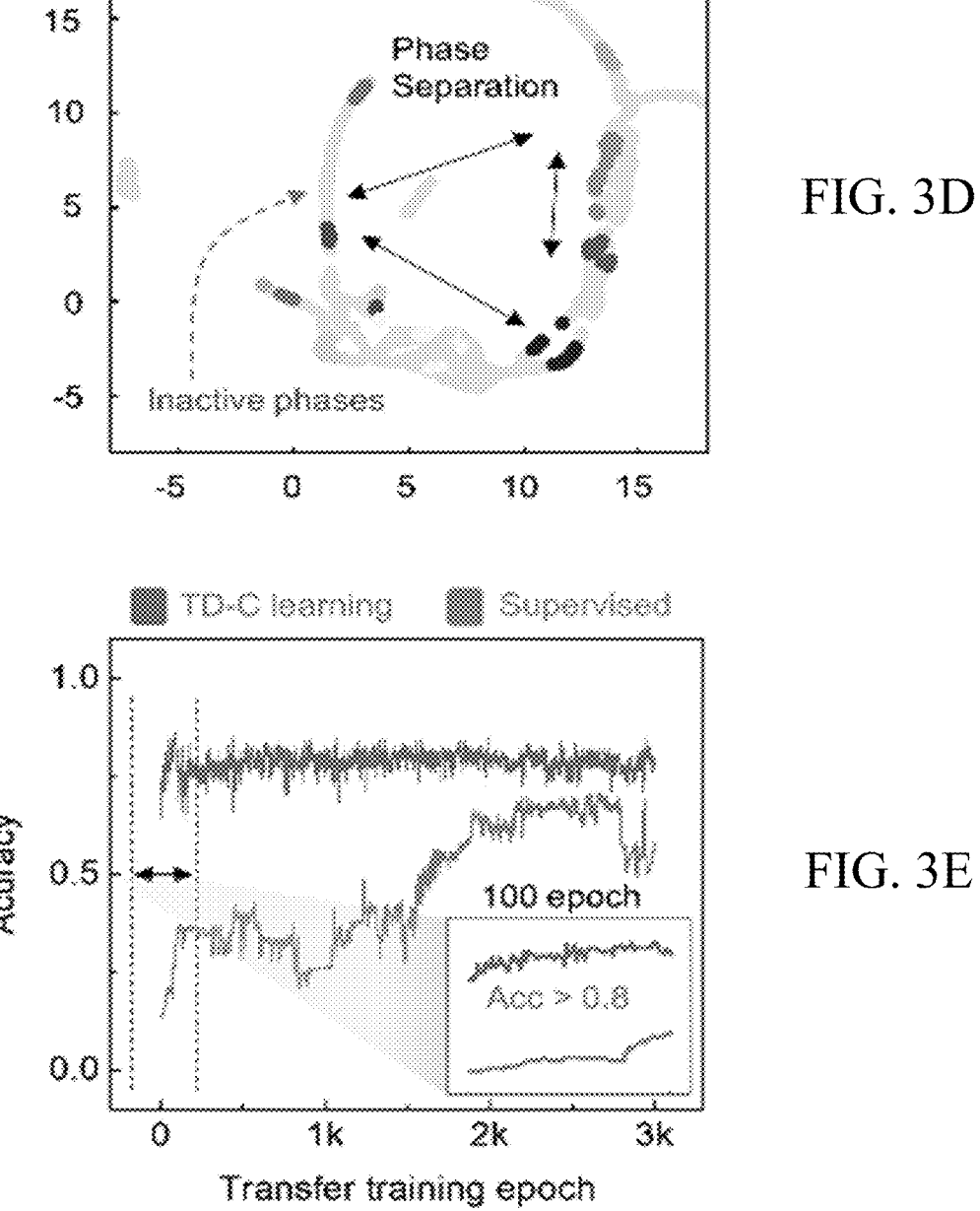

More specifically, FIGS. 3A-3E provide an example Illustration of TD-C Learning and experiment results on learning performance according to certain examples of the present disclosure: FIG. 3A, Sensor signal processing and unsupervised TD-C Learning for learning Motion Feature Space (MFS). FIG. 3B, Transfer learning and metric-based real-time inference mechanism with provided few-shot labeled dataset gathered from each arbitrary user. Dim 16 and MIPS stand for dimension of 16 and Maximum Inner Product Search, respectively. FIG. 3C, Few-shot dataset and real time sensor signal prediction for different users typing 9 different keys. FIG. 3D, UMAP projection of latent numpad typing vectors where gray dots indicate inactive phase signals and colored dots indicate active phase signals. FIG. 3E, Inference accuracy trends for 9-class numpad typing with further transfer training epochs: blue line for model pretrained with TD-C learning and red line for the same model with last linear layer modification for classification pretrained with supervised learning.

Figures 4A, 4B, 4C:
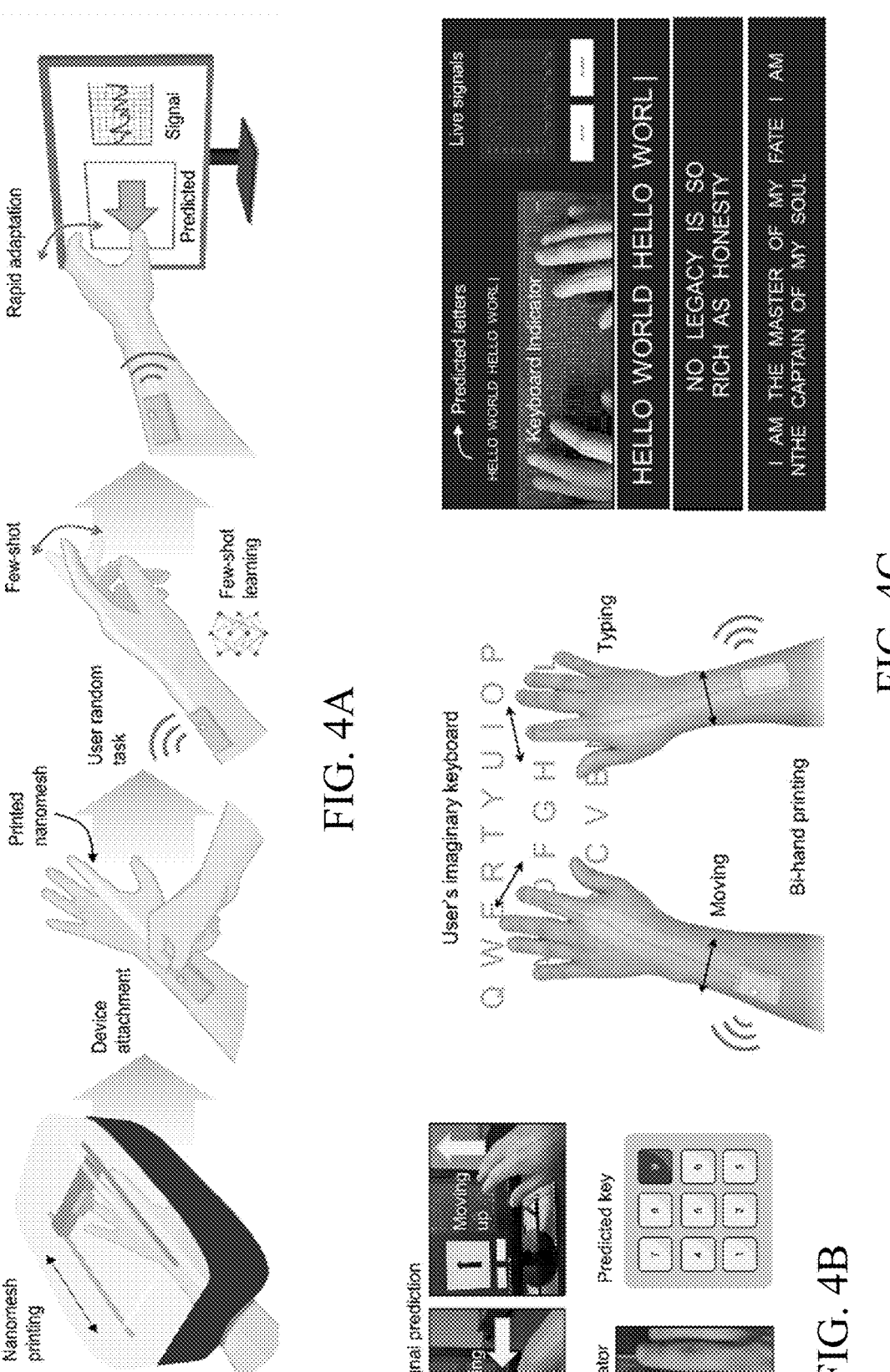
FIGS. 4A, 4B, 4C, and 4D show respective aspects of an example demonstration of fast adaptation for various daily tasks, also according to example embodiments of the present disclosure.
Figure 4D:
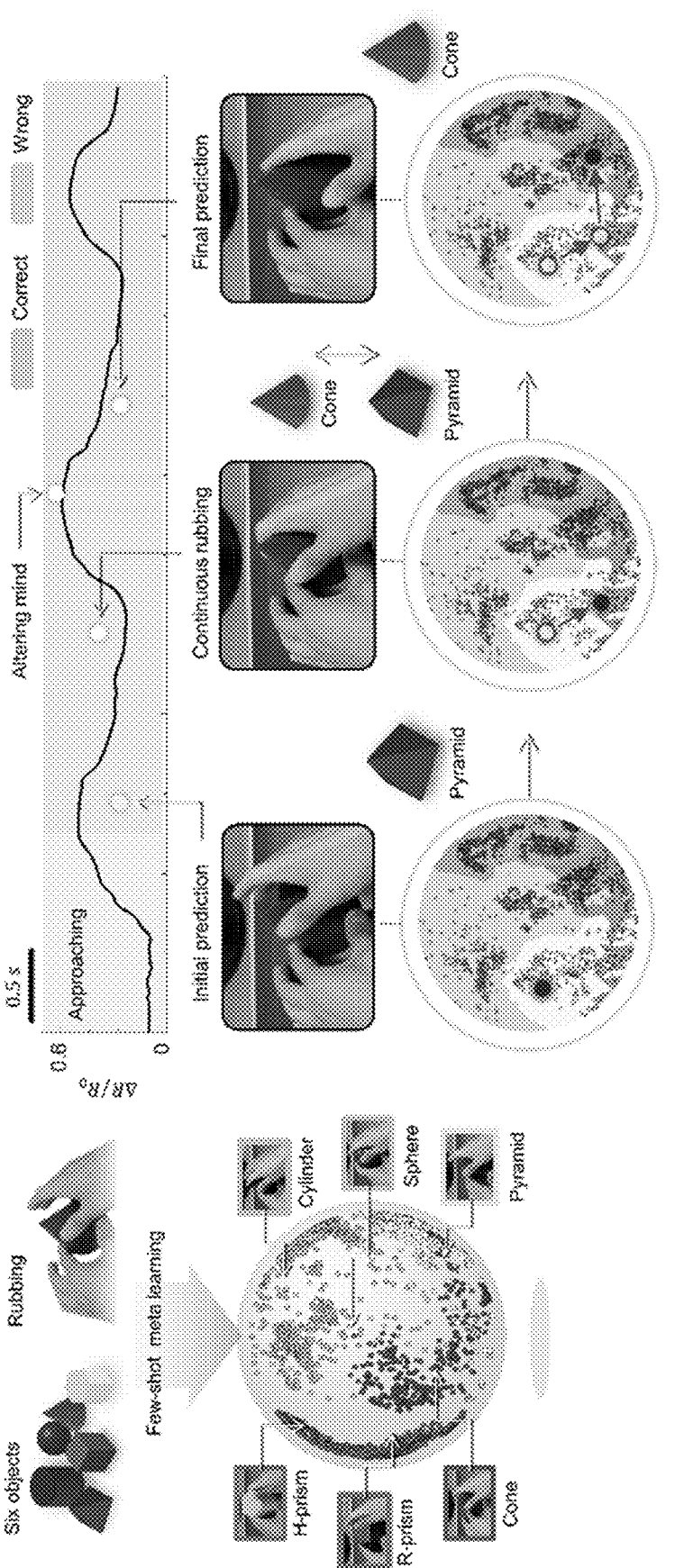

In related specific aspects, such example embodiments also serve for the fast adaptation to arbitrary tasks, and FIGS. 4A, 4B, 4C, and 4D show respective aspects of an example demonstration of fast adaptation for various daily tasks, also according to example embodiments of the present disclosure. Having demonstrated the ability of the example learning framework to use unlabeled random motion data to learn MFS and make gesture inference for arbitrary users with few-shot demonstrations, several representative daily tasks were subsequently conducted, which include: command signal recognition, one-handed numpad typing (FIG. 4B), two-handed sentence typing (FIG. 4c) and object recognition (FIG. 4D). These applications demonstrate the potential of using the example system for daily lives, including human motion recognition, human device interactions, and human object interactions. For each individual task, the user first printed the sensor by applying 16 cycles of nanomesh printing cycles through the portable printing machine (FIG. 4A). A wireless module was then attached to the two terminals of the nanomesh, and the user provided a few-shot labeled dataset by performing each individual gesture five times. The generated sensor signals and the corresponding labels were transmitted to the receiver by the module. For further grouping latent feature vectors based on a given task-specific dataset, experimental examples/work according to the present disclosure further trained the model for additional 20 transfer training epochs by providing positive rewards for mapping the same gestures into closer vectors.

Figures 12A, 12B, 12C:
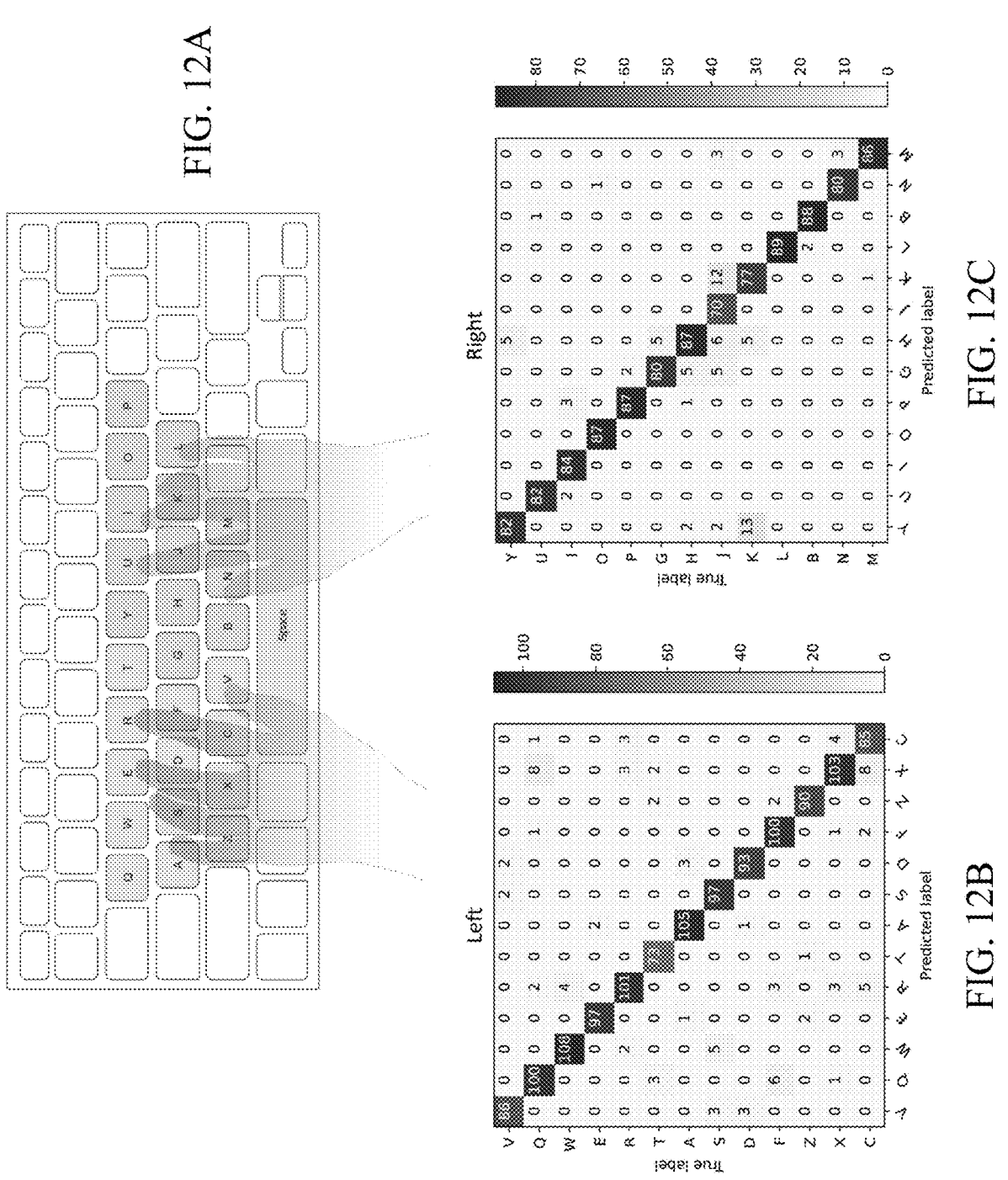
FIGS. 12A, 12B and 12C illustrate example prediction of full keyboard, according to example embodiments of the present disclosure.

In connection with such experiments, it was observed that the example model can efficiently adapt to identify new gestures added to the example few-shot labeled dataset without requiring modification to model structures or massive training processes. Even though initially trained only for lateral finger motions, the example model can be further enhanced to recognize vertical motions by further providing corresponding few-shot labels. After initial trainings for left- and right-hand gestures, respectively, the example model could then recognize gestures for all directions (left, right, up, and down) by additionally providing up- and down-hand gesture signals into the initially trained model, as shown in FIG. 4B. Furthermore, the example model was able to distinguish fast and subtle movements of finger motions that move along the user's small imaginary keypad by discriminating between 9 different numpad keys. The example model achieved 85% accuracy within 20 transfer epochs (FIG. 9C). Experimental examples/work according to the present disclosure used the numpad typing task as a major benchmark for comparing the example methods with others, since it consists of 9 classes of similar hand postures. To analyze the transfer capability of the training framework to the opposite hand, an additional sensor was printed to the left hand, allowing the user to type with two hands on the whole Qwerty keyboard (FIG. 4C). When given a sentence, an arbitrary user initially provided a few-shot labels by typing each character five times. The pre-trained model was further transferred to two different models to discriminate between the two-handed keyboard typing signals (FIGS. 31A-31C and FIG. 32) of typed sentences of "Hello World" and "Imagination". Moreover, it can be also directly applied to predicted longer sentences, such as "No legacy is so rich as honesty", William Shakespeare and "I am the master of my fate I am the captain of my soul", Invictus. Minor typos may occur when typing longer sentences and can be readily modified through open-source word correction libraries for further practical usage, as shown in FIG. 38. The above keyboard application demonstrated that the example inference mechanism can accurately deal with asynchronously generated multiple sensor signals to decode a wide finger motion ranging from the left and right ends of keyboard. The full keyboard of the alphabet was predictable as shown in FIGS. 12A-12C, where each hand took charge of the left half and right half of the keyboard.

In the same way as humans identify objects through the gestural information during interactions, users with nanomesh could continuously rub the surface of different objects and eventually recognized them. The sphere diagram in FIG. 4D illustrates UMAP projections of embedded labeled dataset onto the contour of a sphere, where different colors represent 6 different objects. Since the shape of the pyramid and cone was similar and thus hard to distinguish from each other, the corresponding embedded points (yellow and purple) were initially intermixed together. As a result, while hand interacting with a pyramid, the model initially predicted it as a cone, and continuous rubbing twice allowed the model to eventually predict it as a pyramid. The embedded vectors continuously move from the yellow region to the boundary, and then to the purple region. This is akin to humans taking time to recognize objects, and altering their minds during interactions with various sections of the object. The model can classify the objects with 82.1% accuracy via only 20 transfer epochs vs. thousands using supervised training method (FIGS. 8A-8B, FIGS. 9B and 5).

More specifically, FIGS. 4A-4D provide an example Demonstration of fast adaptation for various daily tasks according to certain examples of the present disclosure: FIG. 4A, Illustration of general process of nanomesh printing, wireless device attachment, few-shot inference, and prediction. FIG. 4B, Command signal prediction and virtual keypad typing recognition. For command signals, it is initially provided only for lateral hand motions, the model can further be generalized to predict both lateral and vertical hand motions as the user provides more demonstration on vertical hand signals. FIG. 4C, Two-handed Qwerty keyboard typing recognition with nanomesh printed on both hands. Predicted letters appear on the user interface as a user consecutively types various sentences. Acrylic keyboard identifier is placed beneath to show the intention of the user (FIG. 32). FIG. 4D, Group of recognition objects and UMAP projection of embedded vectors for signals in a few-shot demonstration set. Sequential changes of position in projected embedding space of real time user signals as the user starts to interact with an object.

Turning now to certain further specific experimental aspects and activity, various equipment, materials and methodology was used to implement example embodiments and to program, test and measure performance of such example embodiments. For instance, these experimental aspects and activity involved a software and system design of a wireless measuring module (i.e., CPU-based circuit). Accordingly, one such device integrates a miniaturized flexible printed circuit board (PCB) that includes ADC sensing element, Bluetooth Low Energy (BLE) module, Lithium polymer battery, and anisotropic flexible connector (FIG. 5 and FIGS. 6A-6B). An embedded nanowire network (ENW) at the end of the connector allows conformal and direct contact with the existing nanomesh electronics. The two terminals of nanomesh are connected to the wireless module via direct contact with ENW, then translated digital signals from a voltage divider are further conveyed to the receiver through Bluetooth transmission by 30 Hz of data rate. The compact wireless module can measure arbitrary hand motions while maintaining conformal contact with the printed nanomesh. The wireless system is programmed through SoC (CC2650, Texas Instruments) with the Code Composer Studio (CCS). The packet of the measured analogue sensor signals is transferred in a data rate of 30 Hz, where the receiving SoC transforms the received packets into UART data transmission. Python integrated Labview system transfers this data into the learning network for task identification.

For mechanical simulation of one example substrate-less nanomesh device, strain distribution of the traditional substrate-based and the example substrate-less electronic was compared through finite element method (FEM, COMSOL Multiphysics). Depth and width of the wrinkles are set as 500 μm and 200 μm, respectively. A thin layer (6 μm, measured by Bruker Dektak XT-A, FIGS. 34A-34C) of PU material (Alberdingk) is applied above the wrinkle to investigate strain distribution of the substrate-based electronics.

Also in connection with such experimental aspects and embodiments, a portable printing system was used. This system involves a linear stage and the nozzle which are moved by a Nema 11 stepping motor, controlled by L298N controlling driver (FIGS. 26A-26D). Spray nozzle (Air atomizing nozzles, Spraying Systems Co.) is connected to 20 psi air pressure through compact air compressor (Falcon power tools). The nozzle is controlled via 5V activated solenoid gas valve, and the entire nozzle is moved through the linear stage with 20 mm/s speed. 5 mg/ml of Ag—Au nanomesh solution is prepared and sprayed 16 cycles over the entire hand covered with a Polydimethylsiloxane (PDMS) stencil mask. Then, 3 cycles of diluted (25 mg/ml) water-based PU (U4101, Alberdingk) were spray coated.

Such experimentation also investigated biocompatible materials such as Ag@Au core-shell nanomesh synthesis. In one such effort, first, Ag nanowires (~80 µm in length, ~80 nm in diameter) were synthesized by modified one-pot polyol process. In 50 mL of ethylene glycol (EG), 0.4 g of polyvinylpyrrolidone (Mw~360,000) and 0.5 g of silver nitrate (AgNO3) were sequentially dissolved using a magnetic stirrer. Then, 600 µL of FeCl3 (2 mM) was rapidly injected into the mixture and stirred mildly. The stirrer was carefully removed from the mixture solution once all chemicals was thoroughly mixed. Finally, the mixture solution was immersed in a preheated silicone oil bath (130° C.). After 3 hr of nanowire growth, the resultant solution was cleaned using acetone and ethanol to remove the chemical residues along with centrifugation of 1500×g for 10 min three times. The purified Ag nanowires were re-dispersed in water for the use. For preparation of the Au precursor solution, 30 mg of chloroauric acid (HAuCl4, FW 339.79, Sigma-Aldrich), 17 mg of sodium hydroxide (NaOH, Samchun Chemicals) were dissolved in 70 ml of distilled water. After 30 minutes, hue of the solution turned from yellowish to transparent, 33 mg of sodium sulfite (Na2SO3, Sigma-Aldrich) was added to the solution to the solution. For the Ag nanowires preparation solution, 800 mg of poly(vinylprrolidone) (PVP, MW 55000, Sigma-Aldrich), 70 mg of NaOH, 300 mg of L-ascorbic acid (AA, Samchun Chemicals), and 10 mg of Na2SO3 were added to 100 ml of the previously synthesized Ag nanowire solution (Ag: 20 mg). Thereupon, the Au precursor solution was slowed poured into the Ag nanowire preparation solution for 2 minutes. After 30 minutes, the Ag@Au core-shell nanowires were fully synthesized and cleansed for three times through centrifugation and dispersed into water with 10 mg/ml concentration and sprayed for nanomesh formation (FIGS. 35-36).

For measurement of nanomesh breathability, measuring was conducted using a custom-built acrylic air channel (FIGS. 20A-20C). An air pump was built at the back end of the air channel to create consistent airflow, and the nanomesh was installed in the center. Flow rate and pressure drop between the nanomesh were monitored via flow meter and differential manometer. Pressure drop is measured with varying flow rates, and air permeability of different samples are calculated through Darcy's law $$q = -\frac{k\Delta P}{\mu L},$$

where q, k, P, µ, and L denote flux, permeability, pressure, viscosity, and channel length, respectively.

Cell toxicity was compared between the control, PU only, Ag nanomesh with PU, Ag@Au nanomesh with PU. L929 (KCLB, Seoul, South Korea), a mouse fibroblast cell, were cultured in Dulbecco's modified Eagle's medium (DMEM, 11885-084; Thermo Fisher Scientific, MA, USA) containing 10% fetal bovine serum (F2442; Sigma-Aldrich, MO, USA) and Anti-Anti (15240-062; Thermo Fisher Scientific), at 37° C. with 5% $CO_2$. Nanomeshes with different conditions (PU, Ag with PU, Ag—Au with PU) were prepared and used for in vitro toxicity evaluation. After attaching the sample to the bottom in a ⅒ size of the well area, 5×$10^5$ cells/well were seeded on the 6-well culture plate (3516; Costar, MA, USA). After incubation for 24 hr, cell morphological changes were observed and photographed using Nikon Eclipse TS100 microscope (Nikon, Japan). To analyze the toxicity of cells, MTT assay was performed using 3 wells for each sample. Cells were incubated in 0.5 mg/ml MTT solution (M6494, Thermo Fisher Scientific) at 37° C. for 1 hr, then the solution was removed and DMSO was used to dissolve MTT formazan. Absorbance was measured at OD=540 nm using an Epoch Microplate spectrometer (BioTek Instruments Inc., VT, USA), and normalized using a control (unpaired, two-tailed Student's t-test).

Such experimentation also involved In vivo testing via spraying. Four-week-old Hos:HR-1 male mice were purchased from Central Laboratory Animal Inc. (Seoul, South Korea) for spraying. All experiments involving mice were performed with the approval of Konkuk University Institutional Animal Care and Use Committee (KU21212). All animals were maintained in a 12 h light/dark cycle at 23±1° C. and 50±10% relative humidity with free access to food and water. Hos:HR-1 mice were anesthetized by intraperitoneal administration of alfaxalone 100 mg/kg and xylazine 10 mg/kg. After placing the anesthetized mouse under portable printing system, nanomesh solution was sprayed. A surgical cloth with a window of about 1×4 cm was covered so that the nanomesh could be applied only to the exposed area. To maintain body temperature, a heating pad or an infrared lamp were used. After application, the mice were returned to the cage for recovery, and 24 hours later, $CO_2$ euthanasia was performed to obtain skin sample. Fixed skin samples were dehydrated (ethanol 70%, 80%, 90%, and 100%), transferred to xylene for 2 hr incubation, and infiltrated with paraffin. Paraffin blocks were prepared using a Tissue-Tek TEC5 Tissue embedding console system (Sakura Finetek Japan, Tokyo, Japan), and sectioned using the Microm HM 340E microtome (ThermoScientific, Walldorf, Germany) at a thickness of 5 µm. Subdermal implant of Ag—Au nanomesh is also carried out with 7 days (Extended). The tissue slices were placed on a glass slide (Marienfeld, Lauda-Königshofen, Germany) and stained with hematoxylin and eosin. Slides were photographed using an Olympus IX70 fluorescence microscope (Olympus, Japan) and a Nikon D2X (Nikon, Japan).

For graph analysis of such a substrate-less nanomesh network, graph theory was used to analyze the electrical properties of the nanomesh network (FIGS. 17A-17F). First, Adjacent matrix (A) is formed from the distributed random nanomesh network (A random nanowire (length of 100 µm) network is distributed in 500×500 µm). Then the Incidence matrix (I) is formed to generate graph network of the nanomesh, where the edge and node represents nanowires and intersections, respectively. According to Ohm's law, current flow of each wire can be calculated by i=Clx, where C is conductivity and Ix represents the voltage difference of the nodes (x is the node matrix). Then the current of each node can be expressed by $I^T$ Clx following the Kirchhoff's Law. Therefore, the voltage and the current of the network can be related by Laplacian matrix $L=ICI^T$, with the relationship of Vi=L. Voltage and the total resistance of the nanomesh can be derived using the boundary conditions of the input and output current flow of both ends of the edge (i(o)=1, i(N)=−1). The resistance of the network under 20% strain, and the sensitivity of the nanomesh under 15% strain are derived from averaging 100 simulation runs for each segment. Percolation threshold is found at 6 cycles of spraying, where the network density can be derived as 180

/500 μm. Therefore, approximate nanomesh density per each spraying cycle can be obtained.

For gesture-recognition in such experimentation, nanomesh was applied with 16 cycles of spraying (linear stage with 20 mm/s speed. 10 mg/ml of Ag—Au nanomesh solution). Then wireless module is attached to the terminal of the nanomesh and three users are asked to perform of data collections for three times for each application total of 10 min. Each few-shot data collection lasted around 1 min (~1800 data points), with 30 sec of rest before the next trial. Data is saved to check whether the data is well collected, and the adaptation performance is evaluated. This process took less than 5 min (e.g., realizing raw data as shown in FIG. 36). All experiments were performed in strict compliance with the guidelines of IRB at Seoul National University (Project title, Electrophysiological signal sensing by direct-printed electronic skin, IRB no., 2103/001-008). Informed consent was obtained from all participants.

Certain example embodiments used in such experimentation involved assessing methods for dataset acquisition. According to certain examples of the present disclosure, a model framework is used to learn transferable information from unlabeled motion data of a limited number of users and be generalized to various daily tasks with only a few labeled sets given as a guidance (this may be implemented to contrast previous approaches in which gestures classification from sensor signals focused on model prediction accuracies with a designed experimental setup where users are instructed to perform a specific task having a fixed number of classes). Consistent with such examples of the present disclosure, the pretrained models are to adapt to various daily tasks and this may be compared to normal supervised learning framework. There are three different types of dataset that are used in certain examples of this experimentation, pretrain dataset $X_{pretrain}=\{s_i\}$, few-shot labeled dataset $$X_{train}^{user\_j} = \{x^k, a^k\},$$

for task adoption, and task-wise testing dataset $$X_{test}^{user\_j} = \{x^k\}.$$

Pretrain dataset is used when pretraining the example models and it is generated from random motions (900 s of random finger movements). The models that are used for task-wise adaptation represented in supplementary videos are trained with unlabeled data that are collected from three users performing random hand motions while skin sensors are printed on their fingers. To quantitatively compare the example training framework to a normal supervised learning framework, experimental examples/work according to the present disclosure additionally collected a labeled dataset while a user types keyboard numpad. The keyboard inputs are regarded as data labels and these labels are used for pretraining supervised model. Quantitative comparisons between the example framework and supervised pretraining frameworks are based on model pretrained using numpad typing dataset, while labels are only used for supervised learning framework. In experimental examples/work according to the present disclosure four different applications are prepared, each representing real life hand computer interaction cases (FIGS. 4C-4E). For each application, experimental examples/work according to the present disclosure collected a five-shot labeled dataset for transfer learning the example model. In terms of five-shot, it means a user performs each gesture class for five times, for example, in the object interaction task, rubbing an object from a left end to a right end would be regarded as a single shot. Corresponding gesture labels are collected as the user typing keyboard keys that represent specific gesture labels. Collected few-shot labeled dataset is then used for retraining the data embedding model. For reflecting the real-life usages scenarios, the task-wise testing dataset is collected while a user naturally interacts with the system, for example typing different numpad keys or rubbing random objects after retraining the model.

Such experimentation involved signal preprocessing and data augmentation with a focus on limiting the sensor input domain. To this end, the sensor values are normalized through minmax normalization. Minimum and maximum values among each individual pretraining dataset and few-shot labeled dataset are used to normalize corresponding dataset. For real time user test scenarios, user signal inputs are normalized based on minimum and maximum values of a given user labeled dataset. Given a signal group collected for the same user $R=\{r_i, i \in N\}$, corresponding normalized signal group $S=\{s_i \in [0,1], i \in N\}$ is generated as $$s_i = \frac{r_i - \min(R)}{\max(R) - \min(R)}, \forall r_i \in \mathcal{R}.$$

Sensor signals are collected with 30 fps and signal $s_t$ represents normalized sensor signal collected in time frame $t \in N$ ($s_t$ and $S_{t+1}$ are $\frac{1}{30}$ second apart from each other). Consecutive 32 sensor signals are grouped as a single model input, so that the model can utilize not only the current sensor signal but also temporal signal patterns to generate signal embeddings. A sliding time window of size 32 with stride 1 is used to group consecutive raw signal inputs to generate model inputs $(x_t=[S_{t-31}, S_{t-30}, \ldots, S_{t-1}, s_t])$.

Two different types of signal data augmentation are used for unique purposes while generating motion feature spaces. Firstly, signal jittering is used to generate strong positive pairs for contrastively training the example learning model. Given an input signal sequence, $x_t$, a strong pair $[x't,x''_t]$ is generated as follows:

$$x'_t=[s'_{t-31},s'_{t-30}, \ldots ,s'_{t-1},s'_t], \text{ where } s'_i=s_i+z'_i,z'_i{\sim}N (0,0.1),$$

$$x''_t=[s''_{t-31},s''_{t-30}, \ldots ,s''_{t-1},s''_t], \text{ where } s''_i=s_i+z''_i, z''_i{\sim}N(0,0.1).$$

Generated from the same input signal, the strong pair [x', x''_t] will be regarded as positive pairs having positive strength of size 1. When generating a strong positive pair with data augmentation, experimental examples/work according to the present disclosure involving carefully choosing which data augmentations are to be used, and this led to further successful demonstrations with experiment results showing on task transfer accuracy for different types of data temporal signal augmentation methods in FIGS. 11A-11E.

While out-of-distribution issues are mitigated with data normalization that bounds input signal domains, experimental examples/work according to the present disclosure use data shifting augmentations to mitigate signal differences between different users and printed sensors. Given an input signal sequence $x_t$, another input signal sequence $x_\tau$ is generated as $$x_\tau = \begin{cases} x_t + z, \ z \sim U[0.3, 0.5] \ \text{for max}(x_t) < 0.5 \\ x_t - z, \ z \sim U[0.3, 0.5] \ \text{for min}(x_t) \geq 0.5 \end{cases}$$

Unlike signals generated by jittering, which were regarded as positive pairs representing the same hand motions, experimental examples/work according to the present disclosure regard shifted signals as a completely new input. Since the amplitude of a sensor signal is correlated with the amount of sensor deformation, shifting signals in the y-axis would result in new signal patterns representing different hand motions. At the same time, the model can learn how to embed sensor signals positioned in various input domains. This is a conventional way of data augmentation which is used to increase the amount of training dataset by providing more training examples.

Such experimentation also involved the attention mechanism in a transformer encoding block. Given a signal input sequence with a size of 32, $x_t \in [0,1]^{32}$, the model first embeds sensor signals into high dimensional vectors $x_{enc} \in R^{32 \times 32}$ with a sensor embedding block, $f_{enc}$, consisting of a single linear layer:

$$x_{enc} = [v_{t-31}, v_{t-30}, \ldots, v_{t-1}, v_t], v_i = f_{enc}(s_i) \in R^{32}, \forall i \in [t-31, t]$$

Before encoding the signals into a motion feature space with the attention mechanism, experimental examples/work according to the present disclosure add positional embedding to the embedded vectors so that the model can understand the relative position of input sequences while encoding them in parallel. A positional embedding is one of key features of transformer architecture which allows the model to avoid iterative computation for each time frame. Position encoded input vector $x\_enc\_pos_t$ is generated as follows:

$$x_{encpos_t} =$$

$$x_{enc_t} + pos = [v_{t-31}^{pos}, v_{t-30}^{pos}, \ldots, v_{t-1}^{pos}, v_t^{pos}] = [v_{t-31}, v_{t-30}, \ldots, v_{t-1}, v_t] +$$

$$[pos_1, pos_1, \ldots, pos_{window_{size}}],$$

$$pos_i := \begin{cases} \sin(\omega_k, t), \text{if } i = 2k \\ \cos(\omega_k, t), \text{if } i = 2k+1 \end{cases}, \omega_k = \frac{1}{10000^{2k/32}}$$

This approach allows unique positional vectors to be added to different positions in a time window as demonstrated in FIG. 10B.

Entire signal windows are encoded into latent vectors by using Transformer Encoding Layers that utilize multi-head attention blocks. Given an embedded vector $x\_enc\_pos_t \in R^{32 \times 32}$ consisting of 32 vectors representing sensor signals for each time frame, the model first encode the vector into three representative vectors called query query$_t$, key key$_t$, and value value$_t$. For each query, the model compares its values with other keys to generate attention weights, and these weights are multiplied by their values to generate embedded vectors that have referred to entire time window signals. This can be computed in parallel by matrix multiplication, which massively increases model encoding speed for sequential signals.

$$\text{query}_{t_{ij}} = W_{q_j}(v_i^{pos}), \text{key}_{t_{ij}} = W_{k_j}(v_i^{pos}),$$

$$\text{value}_{t_{ij}} = W_{v_j}(v_i^{pos}), i \in [t-31, t], j \in [0, 3]$$

where $W \in R^{32 \times (n\_head \times 32)}$ indicates linear layers that project embedded vector $$v_i^{pos}$$

into multiple query, key and value triplet heads. Instead of generating a single triplet (query, key, value) for each embedded vector $$v_i^{pos},$$

experimental efforts according to the present disclosure generate multiple (query, key, value) triplets that are called heads. Utilizing the ability to easily compute attention in parallel, the model is designed to generate multiple attentions simultaneously. In this work, four heads in parallel were generated (in connection with such experimental examples/work according to the present disclosure) which is a half the number of heads compared to the original language model for fast real time computation.

Given a query and key value heads, query$_{t_{ij}}$, key$_{t_{ki}}$, the model first computes attention as follows:

$$attn_{ik_j} = \text{softmax}(\frac{\text{query}_{t_{ij}}}{\sqrt{32}} \times \text{key}_{t_{kj}}^T), i \in [t-31, t], j \in [0,3]$$

Generated attention vectors contain weights that determine the amount of information that the model gathers from different values. Therefore, for each time frame vector, the model generates output vectors as $$o_{t_{ik_j}} = attn_{ik_j} * \text{value}_{t_{kj}}$$

Accordingly, the output vectors for j-th head are computed as:

$$o_t = [o_{t_i}, \forall i \in [t-31, t]]$$

where $$o_{t_i} = concat\left(\sum_{k=t-31}^t o_{t_{ik_j}}, \forall j \in [0,3]\right).$$

The above multi-head attention mechanism is repeated three times. Through stacked attention blocks, the model can encode temporal signal patterns by learning how to extract useful information from sequential signal inputs without iteratively processing every time frame.

After encoding temporal signal patterns, experimental examples/work according to the present disclosure further project output vectors with a position-wise feedforward layer. Projected vectors are concatenated to generate a latent vector representing entire signal sequence as below:

$$q_t = concat(W_t o_{t_i} + o_{t_i}, \forall i \in [t-31, t])$$

This is a linear block applied to each time frame output with residual connection. Using integrated representation qt, the model generates motion feature vector and phase variable as below:

$$z_t = f_z(q_t), z_t \in R^{16}$$

23

$$\emptyset_t = \text{Softmax}(\text{sigmoid}(f_\emptyset(q_t))), \emptyset_t \in \mathbb{R}^2$$

Where $f_z$ and $f_\emptyset$ are two separate three-layered linear blocks with LeakyReLU activation function in between linear layers. At the end of phase block, experimental examples/work according to the present disclosure apply sigmoid function and softmax function so that phase variable express binary state of input signal (active and inactive phase). Phase block is not trained and used in pretraining stage.

Such experimentation also involved structure and implementation temporal augmentation contrastive feature learning. Given latent motion feature vectors $Z=\{z_i\}$ encoded by the model, experimental examples/work according to the present disclosure apply Timely Discounted Contrastive Loss, which is a generalization of InfoNCE by applying guided tolerance for mapping semantically similar signals to a closer space. For each latent motion feature vector, experimental examples/work according to the present disclosure have a time variable t that indicates the time that corresponding sensor signals are collected. Based on the time distance between two different latent features vectors, they are subdivided into positive pairs $Z^+$ and negative pairs $Z^-$ as follows:

$$\begin{cases} (z_i, z_j) \in Z^+, \text{ if } |t_i - t_j| \le D_w/\tau \\ (z_i, z_j) \in Z^-, \text{ if } |t_i - t_j| > D_w/\tau \end{cases}$$

where $\tau$ is a hyperparameter that determines tolerance distance, and $D_w$ is window size for the sliding time window.

For latent motion features generated from the same motion signals through data augmentation would have zero distance since time labels are the same. For each positive pair, a time discount factor is assigned based on the distance between two vectors as below:

$$TD_{ij} = \exp(-\alpha|t_i - t_j|^2)$$

Alpha is a hyperparameter that determines discount rate, in this work, the hyperparameter is set as 4. Therefore, applying the time discount factor, a new loss function is realized as below:

$$\text{TDC\_Loss}(Z) = -\mathbb{E}_{i,j,st(z_i,z_j)\in Z^+}\left[\log\frac{TD_{ij}*\exp\left(\frac{cossim(z_i, z_j)}{temp}\right)}{\sum_{p\in Z^+}TD_{ij}*\exp\left(\frac{cossim(p)}{temp}\right)+\sum_{p\in Z^-}\exp\left(\frac{cossim(p)}{temp}\right)}\right]$$

Where temp refers to temperature and it is set as 0.07. By giving a time discount factor and extending the boundary of positive pairs for signals correlated with their measure time, there can be avoidance of the model from pushing semantically similar signals apart.

Specific details were used for transfer learning with a few-shot labeled set. For each task, such as keyboard typing or object recognition, pretrained models can be fine tuned with a few-shot labeled dataset given by a specific user. In transfer learning according to examples of the present disclosure, the motion feature space can be used for clearly discriminating task gestures, and at the same time used to train phase block so that the model can distinguish active and inactive phase for the current user.

Therefore, given a few-shot labeled dataset $$X_{train}^{user} = \{x^k, a^k, t^k\},$$

the model first encodes each signal inputs to motion feature space to form labeled set $$Z_{train}^{user} = \{z^k, \emptyset^k, a^k, t^k\},$$

where $z^k$ is encoded latent motion feature vector of $x^k$ and $\emptyset^k$ is a predicted phase variable. The gesture label $a^k$ represent one of action gestures, and in particular 0 action would indicate inactive phase where the user is not intending to perform any of the gestures in the task. Therefore, in experimental examples/work according to the present disclosure, additional generate phase label may be expressed as:

$$\begin{cases} a_\emptyset^k = 0, \text{ if } a^k = 0 \\ a_\emptyset^k = 1, \text{ if } a^k \ne 0 \end{cases}$$

The model is then fine-tuned with the loss function stated below:

$$\text{Loss}(Z_{train}^{user}) = TDC_{Loss}(\{z^k\}) + \alpha NCELoss(\{z^k, a^k\}) + \beta BCELoss(\{\emptyset^k, a_\emptyset^k\})$$

where NCE_Loss indicates InfoNCE[39] where signals are regarded with the same labels as positive pairs, and BCE-Loss is a binary Cross entropy loss. Hyperparameter alpha and beta are assigned for controlling the ratio between different loss values.

FIG. 5 illustrates an example taxonomy of augmented soft sensors combined with machine intelligence according to certain examples of the present disclosure.

FIGS. 6A and 6B illustrate an example learning robust motion representation from unlabeled data according to certain examples of the present disclosure: FIG. 6A, Schematic illustration of the wireless module that transfers multi-joint proprioceptive information. Random motions of PIP, MCP, and Wrist motions are collected. FIG. 6B, UMAP embedding of raw random finger motions and after motion extraction through TD-C learning.

FIGS. 7A and 7B illustrate an example wireless module for measuring changes of nanomesh according to certain examples of the present disclosure: FIG. 7A, Schematic illustration of the wireless module that transfers proprioceptive information through simple attachment above the printed nanomesh. Illustration and image of the module is shown. Flexible printed circuit board (FPCB), lithium polymer battery, and connector is shown. Right image depicts backview of the module. Nanomesh connector (NC) is applied, and electrical contact is made by simple attachment of the module to the printed nanomesh. FIG. 7B, Block diagram of the main components constituting the wireless module. Photograph shows real-time measurement through the module.

FIGS. 8A and 8B illustrate example model validation accuracies and transfer learning accuracies for sensor signal with and without substrate according to certain examples of the present disclosure. To investigate how substrate-less property contributes to the model discriminating different subtle hand motions, the same amount of sensor signals is collected while a user typing Numpad keys and interacting with 6 different objects. FIG. 8A, Collected dataset is divided into training and validation datasets with a ratio of 8:2 for normal supervised learning. FIG. 8B, For transfer learning, TD-C learning is applied with unlabeled random motion data to pretrain the learning model and use the first five-shot demonstrations to further transfer learning. Directly attached to the finger surface, nanomesh without substrate outperforms sensor with substrates in different tasks and training conditions.

FIGS. 9A, 9B, 9C, 9D, 9E and 9F illustrate example model performance analysis and ablation studies for components in the learning models according to certain examples of the present disclosure: a, Confusion matrix for numpad typing data for each typing stroke after 20 transfer training. b, Confusion matrix for object recognition tasks for individual signal frame after 20 transfer training. c, More detailed comparison between TD-C Learning and supervised learning with last layer modification. For more precise comparison, such experimentation additionally trained TD-C learning model with labeled data used to train supervised model by removing labels. Even with the same number of training samples, the learning framework significantly outperform normal supervised learning when the model is transferred to predict different tasks. With more easily collectable unlabeled training samples, TD-C learning model pretrained with large random motion data shows higher accuracies in all transfer training epoch than other models. d, UMAP projection of latent vectors of labeled keypad typing data projected by the model pretrained with TD-C learning method. e, Ablation study for transfer accuracy comparison between applying timewise dependency loss and original contrastive learning loss. f, Ablation study for applying phase variable by comparing transfer accuracy trends for models with and without phase discrimination when inferencing different gestures in MFS.

Figure 10A:
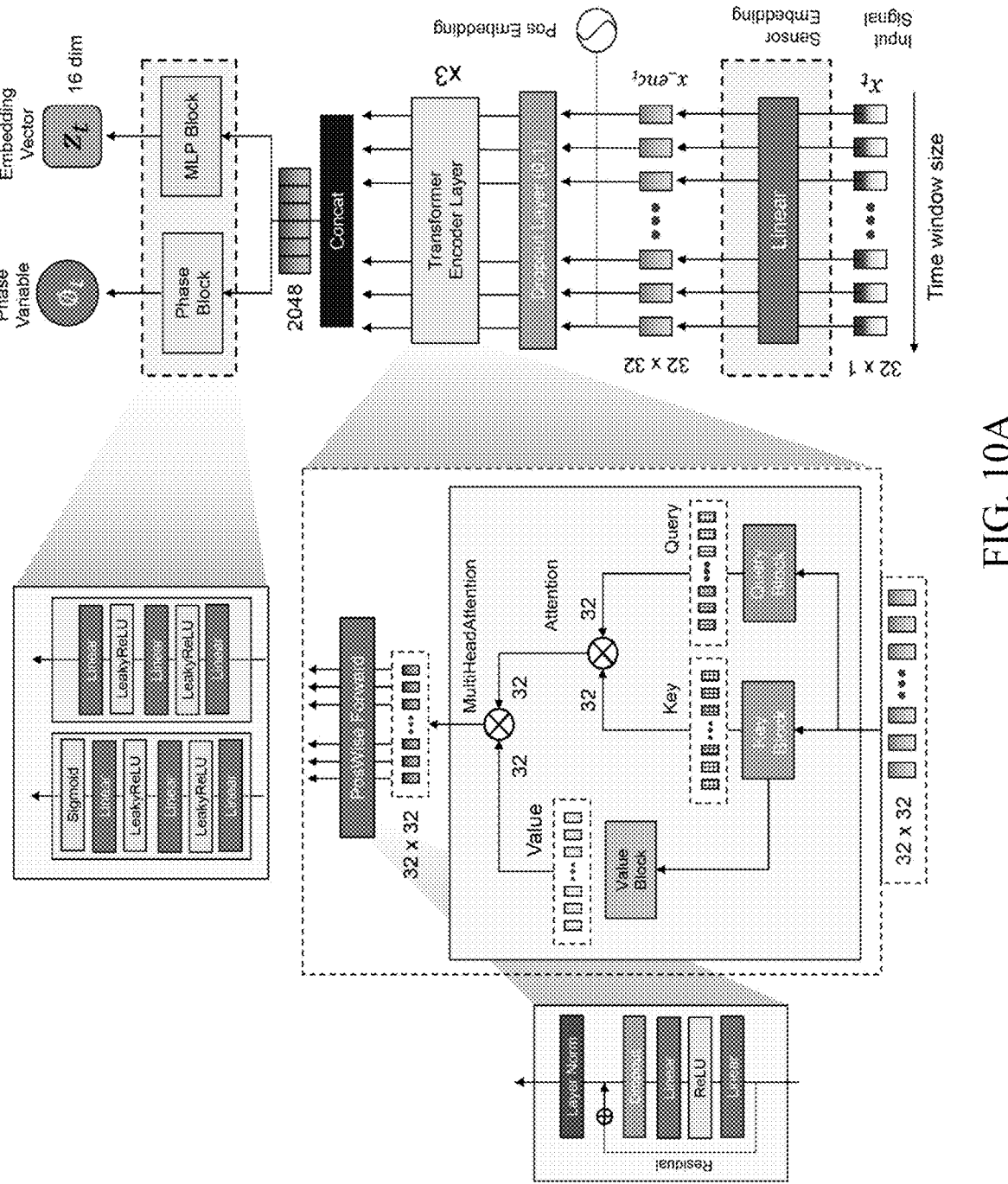
Figures 10B, 11A, 11B:
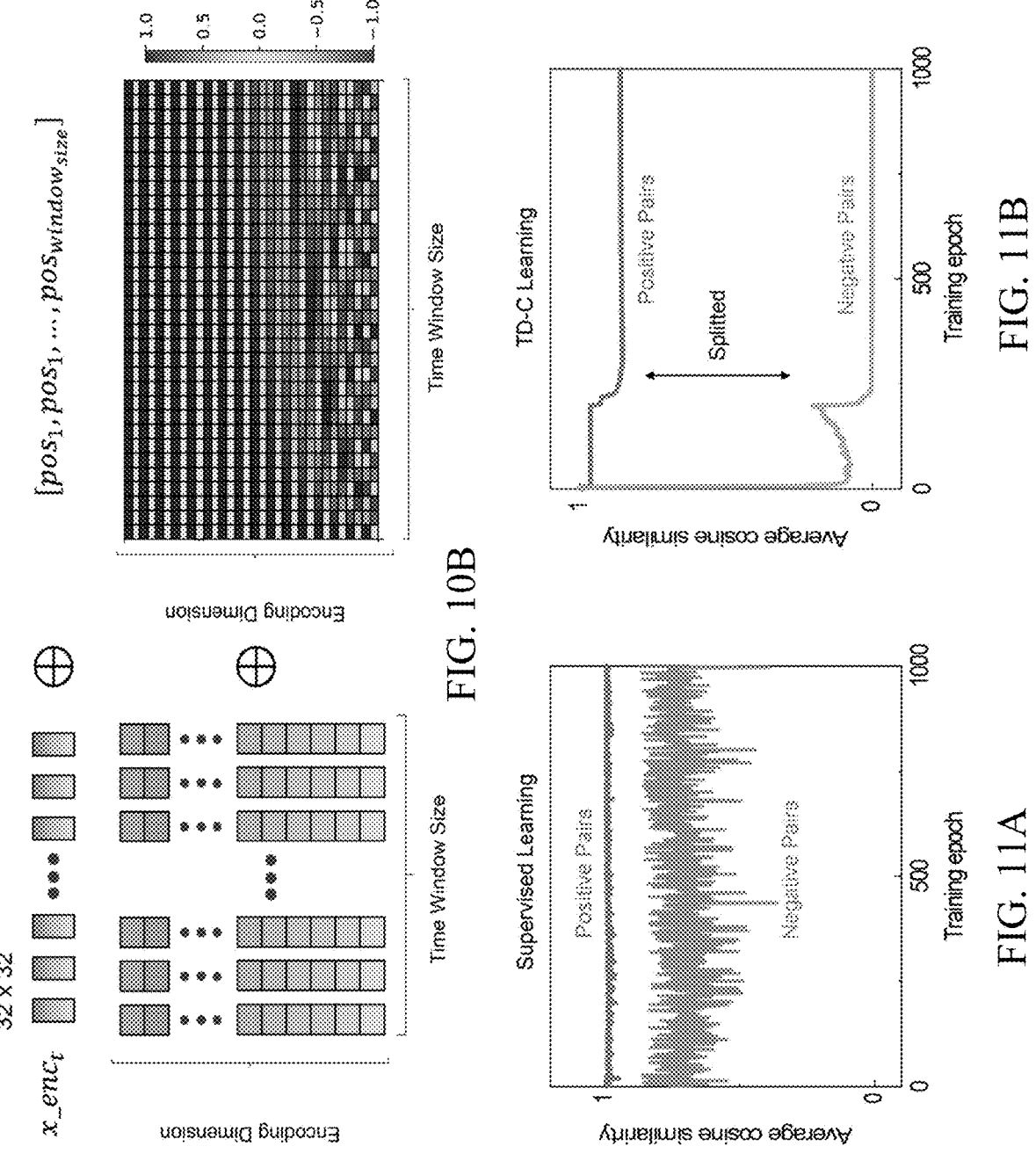
Figure 11C:
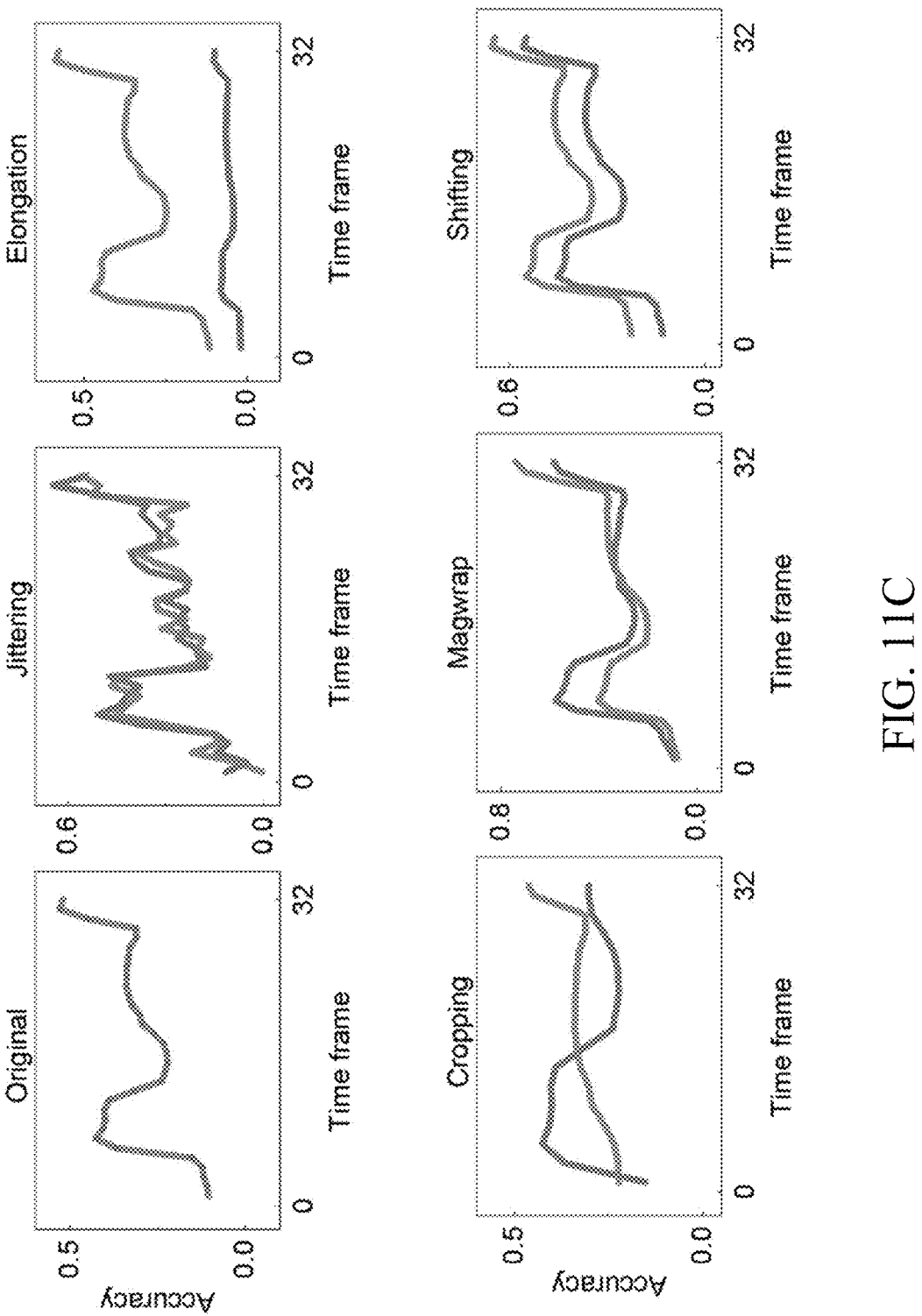
Figure 11D:
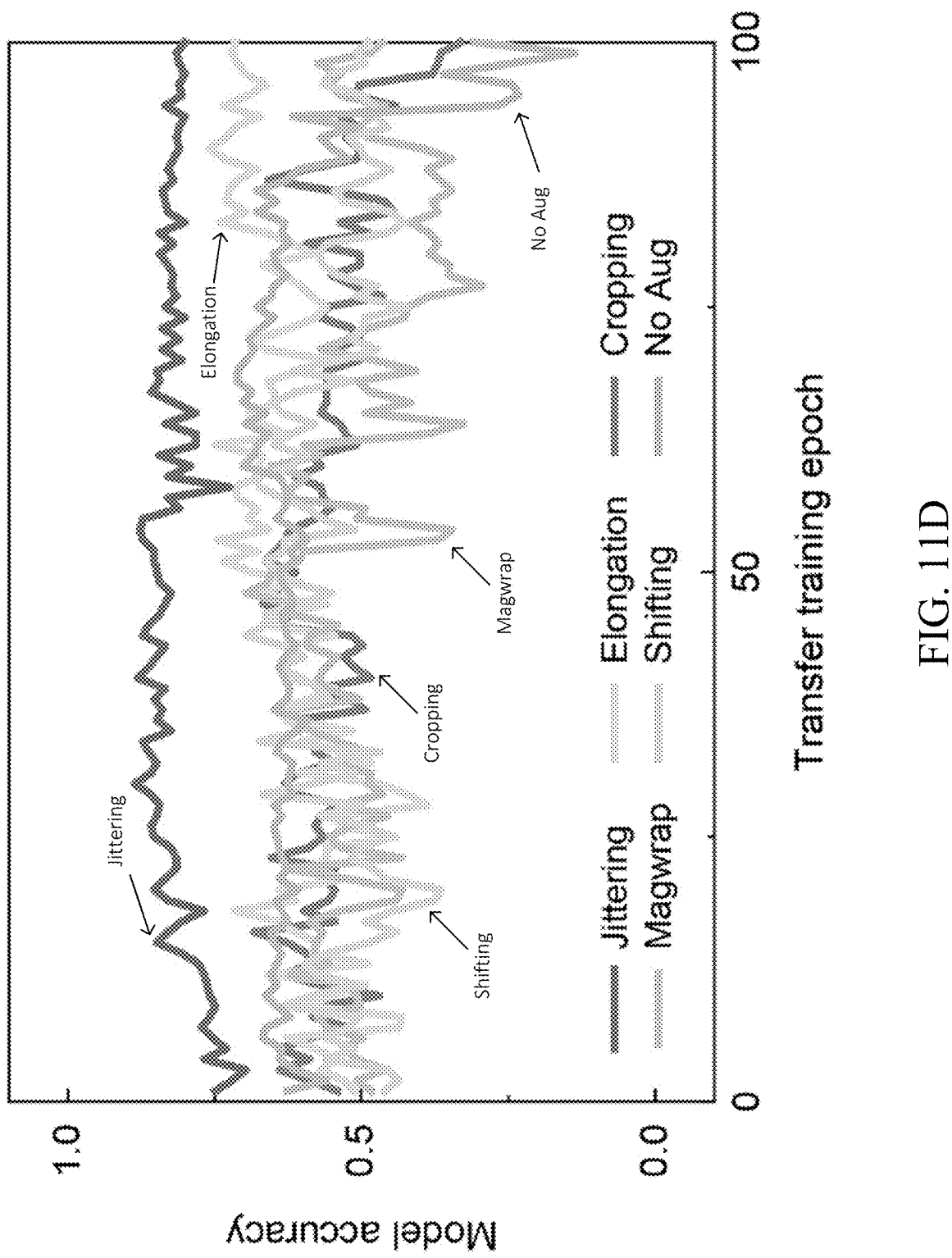

FIGS. 10A and 10B illustrate example details of the learning model architecture according to certain examples of the present disclosure: FIG. 10A, Illustration of detailed layer structure for signal encoding model. The temporal signal patterns are encoded though transformer encoders with the aid of attention mechanism. Following linear blocks, MLP block and phase block, utilize encoded latent vectors to generate embedding vectors in such feature space and phase variables distinguishing active and inactive phases. FIG. 10B, Visualization of positional embedding used to advise model time-wise correlation between signal frames within a time window. Positional embedding allows the model to process temporal signal patterns in parallel using attention mechanisms enabling fast encoding of complex signal patterns for real time usages.

FIGS. 11A, 11B, 11C, 11D and 11E illustrate example ablation studies on different learning methods and different temporal signal data augmentations according to certain examples of the present disclosure: FIG. 11A, Cosine similarity for supervised learning framework. FIG. 11B, Similarity based on TD-C learning. FIG. 11C, Examples of signal patterns before and after applying different data augmentations. FIG. 11D, Transfer accuracy comparison for learning models pretrained with different data augmentations predicting user numpad typing data. Jittering augmentation that does not change signal amplitude or frequencies allows the model to generate more transferable feature spaces. FIG. 11E, Summary table of prediction accuracy for different data augmentations. Compared to models trained with different data augmentations, the model trained with jittering shows 20% higher accuracy in average.

FIGS. 12A, 12B and 12C illustrate example prediction of full keyboard according to certain examples of the present disclosure: FIG. 12A, Each hand taking charge for the left half and right half of the keyboard. FIG. 12B, Confusion matrix of left side of keyboard. FIG. 12C, Confusion matrix of right part of keyboard. (Five-shot demonstrations for each key for transfer training dataset, accuracy left: 93.1%, right 93.1%).

FIG. 13 illustrates an example nanomesh system which translates skin stretch into proprioception according to certain examples of the present disclosure.

FIGS. 14A, 14B, 14C, 14D and 14E illustrate example model performance analysis based on different hyperparameter sizes (inner latent vector dimension in Transformer Encoder and final embedding vector dimension) according to certain examples of the present disclosure: a. Average transfer learning times for a single transfer epoch with different hyperparameter sizes b. Average inference times for a mini-batch of 100 signal windows for different model parameters. c, Average transfer learning accuracies for 20 transfer training epochs for three times. d, Conceptual diagram showing estimated model behaviors in when the dimension of hyperparameter is high or the number of sensors is larger. e, Conceptual diagram demonstrating desired model behavior with single sensor and learning framework according to the present disclosure.

Figures 15A, 15B, 15C:
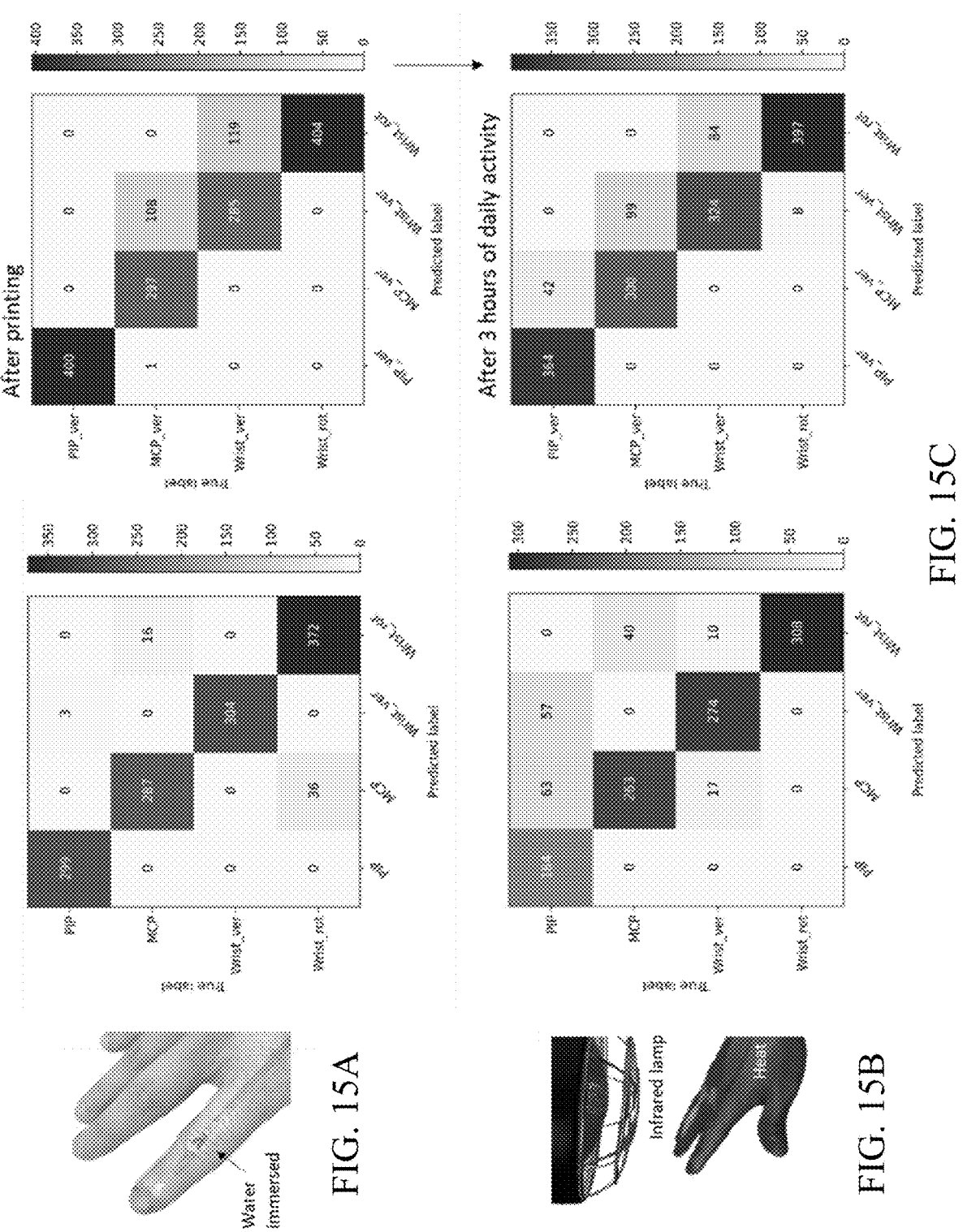
Figure 15E:
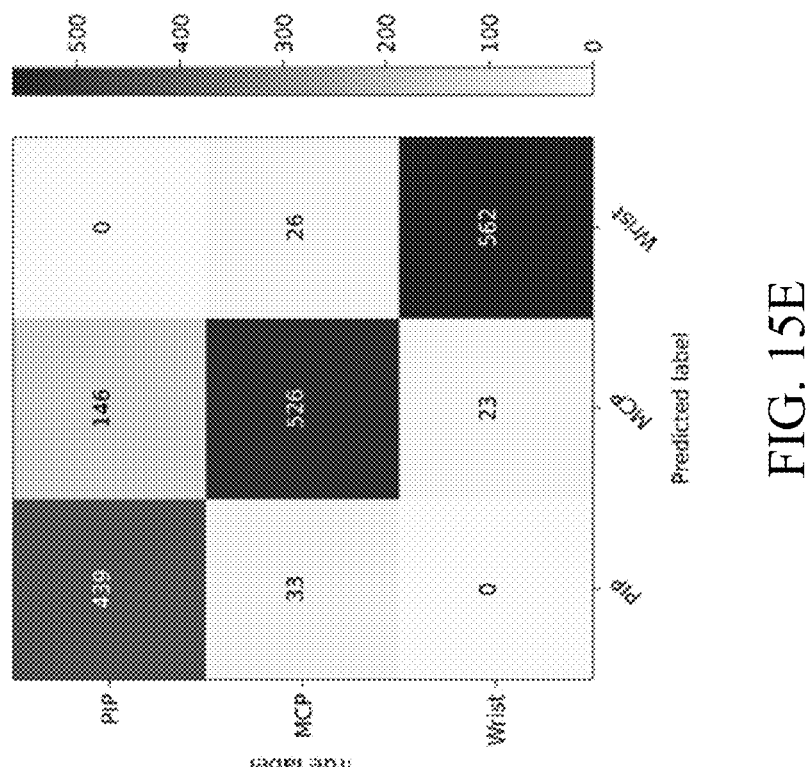
Figure 15D:
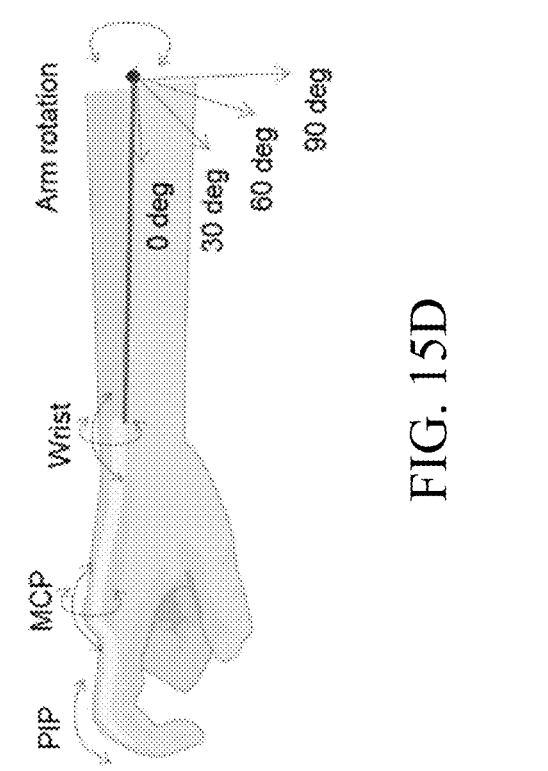

FIGS. 15A, 15B, 15C, 15D and 15E illustrate example impact of various environmental conditions of nanomesh according to certain examples of the present disclosure: FIG. 15A, Motion prediction while immersed in water. FIG. 15B, Motion prediction while exposed to heat (~40° C.) through infrared lamp. FIG. 15C, Performance difference after 3 hours of daily activity. FIG. 15D, Performance under arm rotation (0-90 deg), FIG. 15E, and its confusion matrix of localizing the motions.

FIGS. 16A and 16B illustrate example performance comparison for different time window sizes: a, average number of signal frames for beginning and ending a certain class gesture in different tasks. b, model transfer accuracy for three different tasks for model trained with different time window sizes.

Figures 17A, 17B, 17C, 17D:
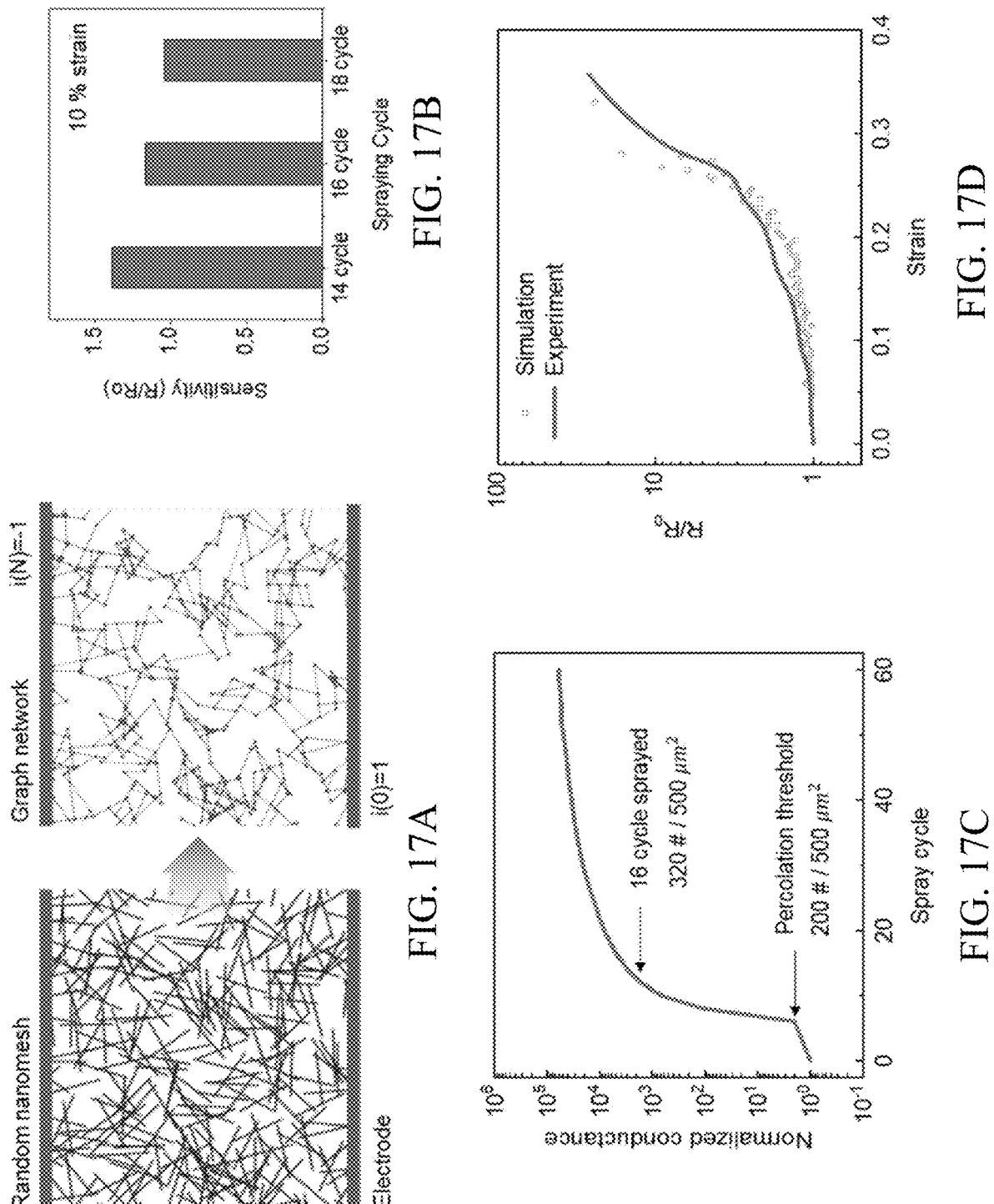
Figure 17E:
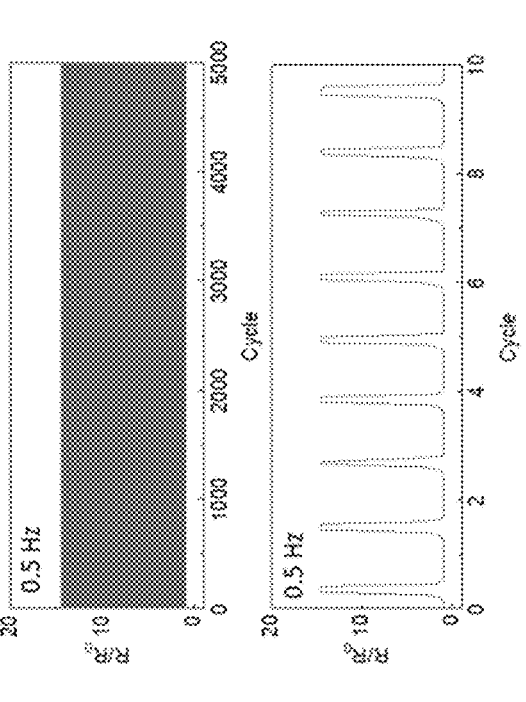
Figure 17F:
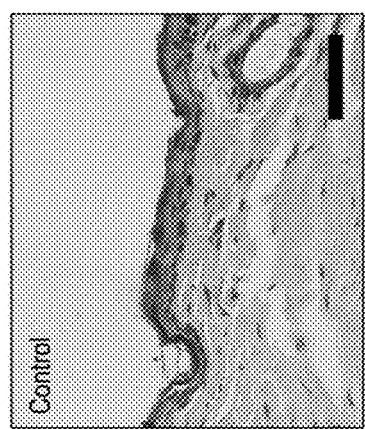

FIGS. 17A, 17B, 17C, 17D, 17E and 17F illustrate example graph simulation of nanomesh with different densities and its mechanical properties according to certain examples of the present disclosure: FIG. 17A, Distributed random nanomesh and corresponding graph network. FIG. 17B, Sensitivity variations with different nanomesh density. FIG. 17C, Normalized conductance measurement during nanomesh spraying. FIG. 17D, Resistance variation of nanomesh under 35% strain. FIG. 17E, Hysteresis of the nanomesh before and after 5000 dynamic stretching cycles. FIG. 17F, Cyclic durability of the nanomesh and below is the magnified time scale.

Figure 18A:
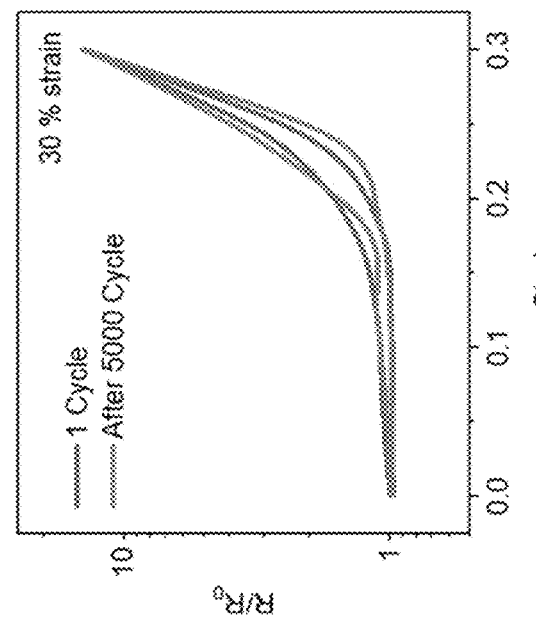
Figure 18B:
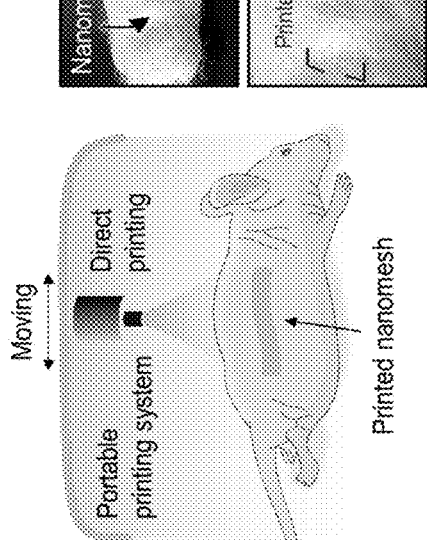
Figure 18C:
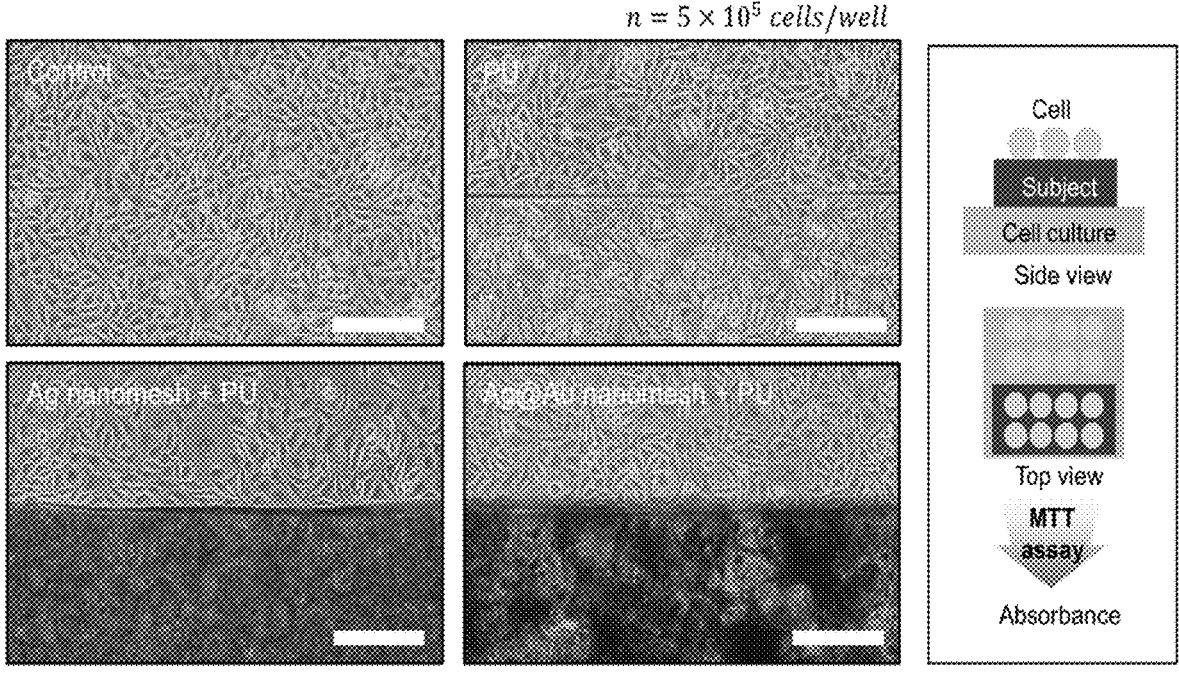
Figure 18D:
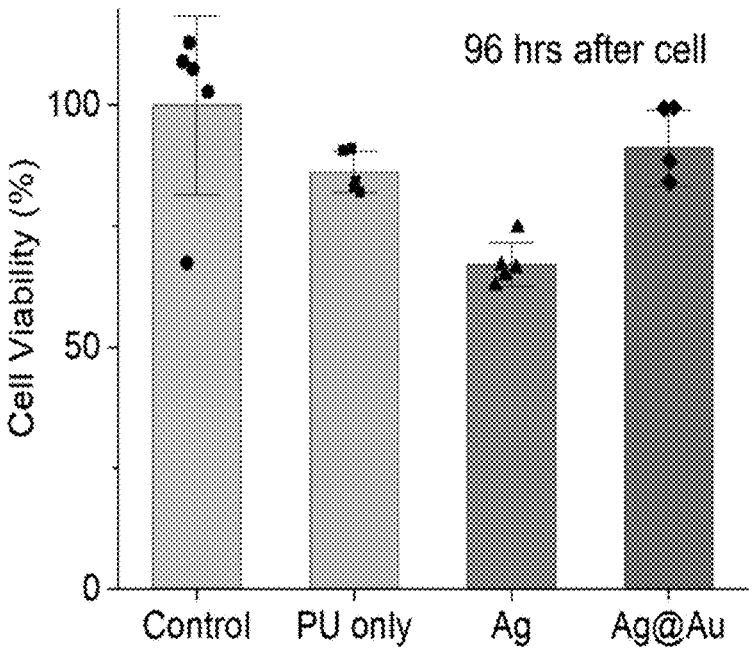
Figures 18E, 18F:
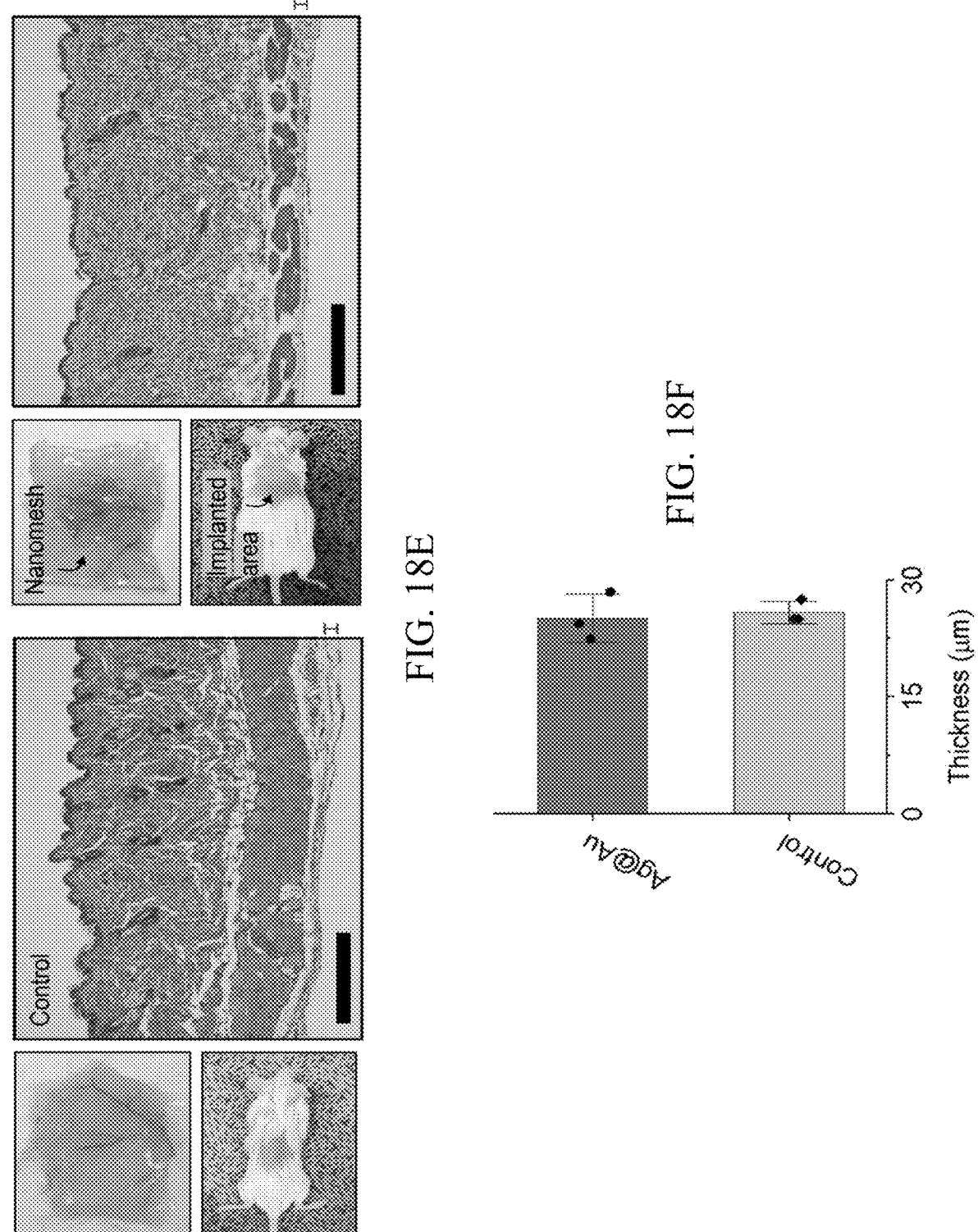

FIGS. 18A, 18B, 18C, 18D, 18E and 18F illustrate an example biocompatibility test of the nanomesh according to certain examples of the present disclosure: FIG. 18A, Direct printing of Ag—Au nanomesh above Hos:HR-1 male mice by portable printing system. FIG. 18B, Skin histopathology of applied nanomesh. Scale bar, 200 μm. Images are representative of three independent experiments. From the images of the control and the nanomesh printed skin slice, no significant changes such as infiltration of inflammatory cells or structural abnormalities were found in both samples. FIG. 18C, Cell toxicity microscope image where the samples are applied above fibroblast cell. Scale bar, 100 μm. Images are representative of five independent experiments. FIG. 18D, To analyze the toxicity of cells, MTT assay was performed. Data is represented as mean±s.d., n=5 independent cell samples. FIG. 18E, Subdermal implantation of Ag—Au nanomesh. Scale bar, 250 μm. From the images of the control and the nanomesh implanted skin slice, no inflammatory signs or hemorrhages were observed. FIG. 18F, When the thickness of fibrous capsule surrounding implanted nanomesh were measured, no significant changes were found in both samples. Data is represented as mean±s.d., n=3 independent samples.

FIGS. 19A and 19B illustrate example mechanical properties of nanomesh according to certain examples of the present disclosure: FIG. 19A, Nanomesh modulus through nanoindentation test. FIG. 19B, Nanomesh applied on skin replica (ecoflex), and its thickness (~150 nm, measured by Bruker Dektak XT-A).

FIGS. 20A, 20B and 20C illustrate example nanomesh breathability measurement according to certain examples of the present disclosure: FIG. 20A, Flow rate of nanomesh respect to pressure drop. Flow rates are compared with only PU bonder, nanomesh, and nanomesh with PU. FIG. 20B, Air permeability of three samples. FIG. 20C, Experimental setup of measuring air permeability of samples. Air pump is controlled to adjust flow rate and the pressure drop from the sample is measured by the differential manometer.

FIGS. 21 and 21B illustrate example spatial resolution of nanomesh according to certain examples of the present disclosure: FIG. 21A, Experimental setups for individualized PIP and MCP signal measurement. FIG. 21B, Measurement of MCP (Sig #2) signals under PIP alone movement, and the resolution found to be 15 mm.

FIGS. 22A, 22B, 22C, 22D, 22E and 22F provide example SEM images of reinforced nanomesh with PU bonder according to certain examples of the present disclosure: a, Nanomesh with PU bonder. Scale bar, 100 am. b-e, Magnified image of augmented nanomesh. f, Blue regions indicate bonded PU.

Figures 23D, 23E:
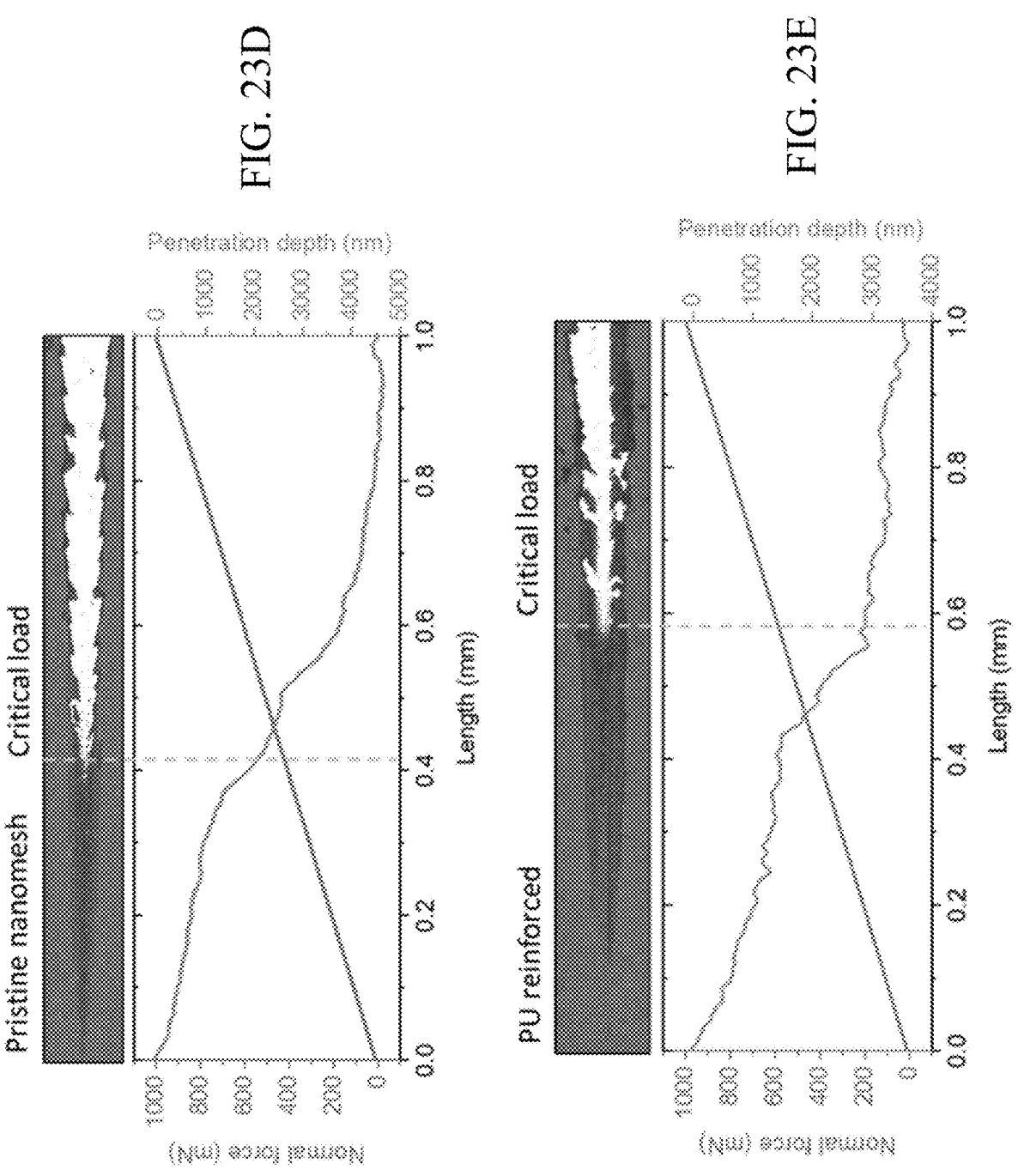

FIGS. 23A, 23B, 23C, 23D and 23E illustrate an example friction test of reinforced nanomesh according to certain examples of the present disclosure: FIG. 23A, Friction test experimental setup. Augmented nanomesh with PU bonder is undamaged under friction as shown in the image. FIG. 23B, Applied friction measured during the test under normal force of 0.2 N. FIG. 23C, Resistance change under friction. Reinforced nanomesh endures under 1500 friction cycles. FIG. 23D, Scratch test of pristine nanomesh and FIG. 23E, PU reinforced nanomesh.

FIG. 24 illustrates example removal of nanomesh according to certain examples of the present disclosure.

Figures 25C, 25D, 25E:
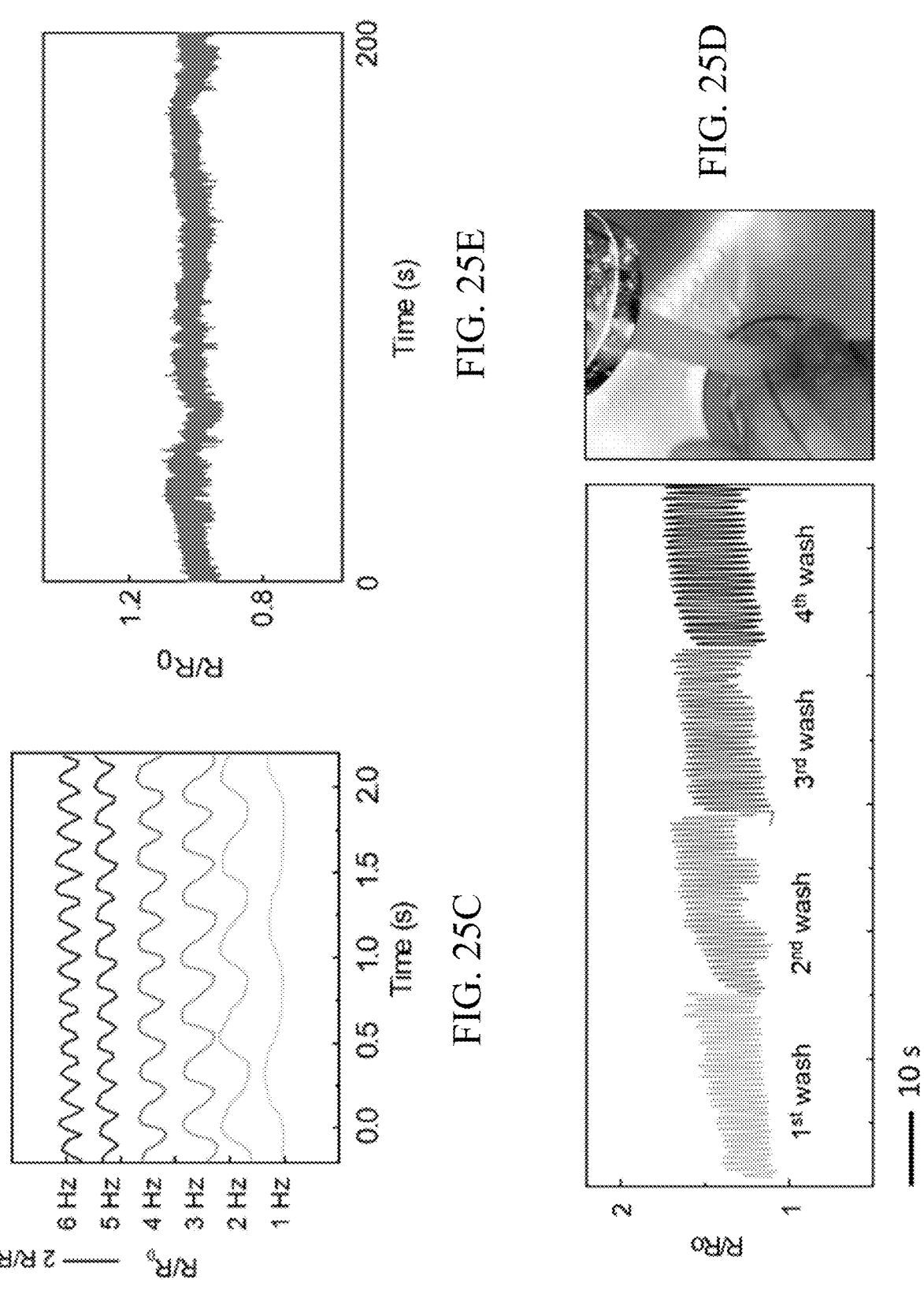

FIGS. 25A, 25B, 25C, 25D and 25E illustrate example nanomesh performance on daily activities according to certain examples of the present disclosure. FIG. 25A, Nanomesh output signals on various finger bending angles. FIG. 25B, Output signals of lateral finger movements with different angles. FIG. 25C, Nanomesh under high finger bending frequency. FIG. 25D, Endurance under washing. FIG. 25E, Cyclic test with 1000 cycles.

FIGS. 26A, 26B, 26C and 26D illustrate example portable printer setup according to certain examples of the present disclosure: FIG. 26A, Portable printing system includes a spray nozzle, two stepping motors, and air/liquid hose. FIG. 26B, Magnified image of the spray nozzle. FIG. 26C, Nanomesh applied above hand covered with PDMS mask. After printing, the PDMS mask is gently removed. FIG. 26D, Photograph of the printed nanomesh.

Figures 27A, 27B:
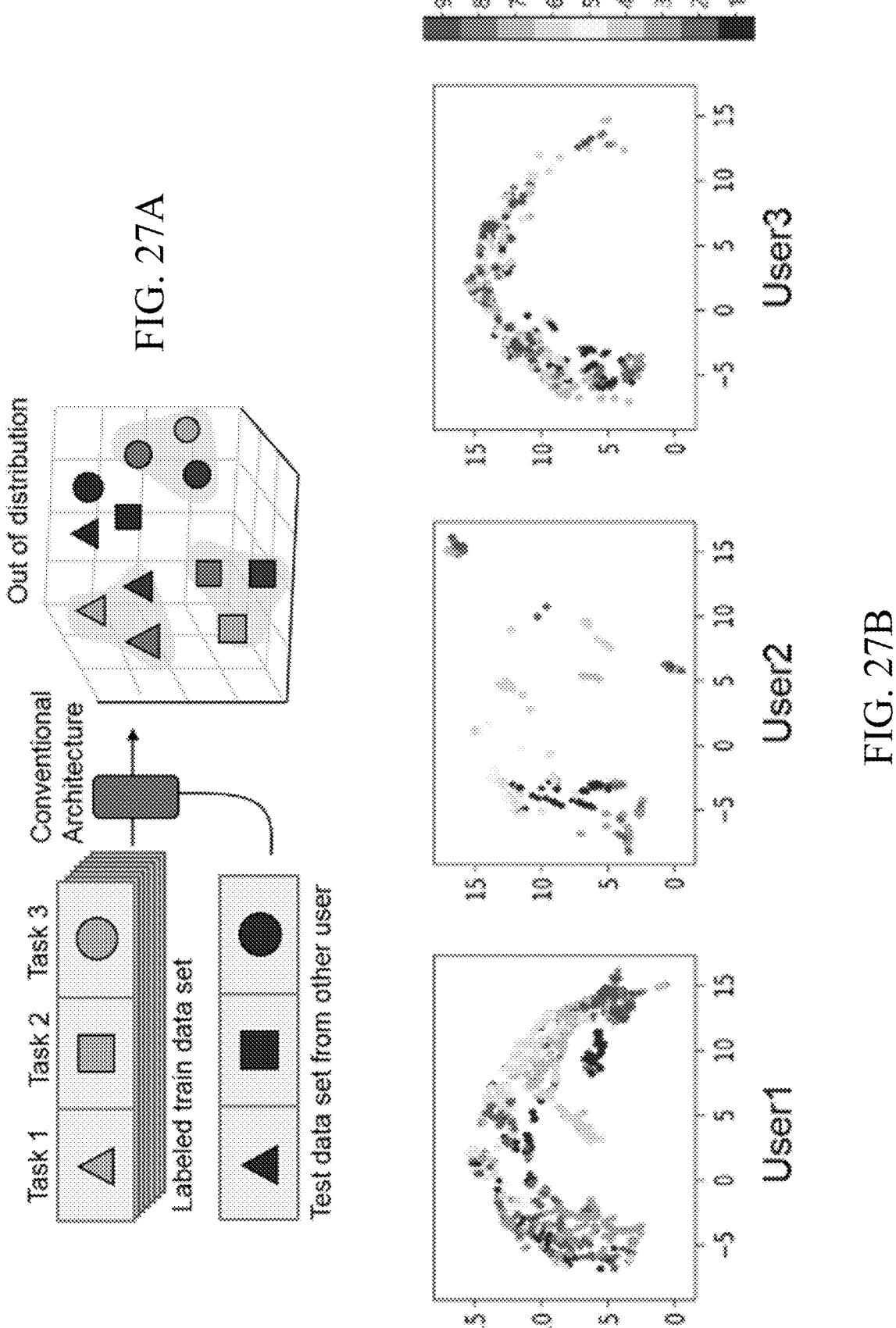
Figures 27C, 27D:
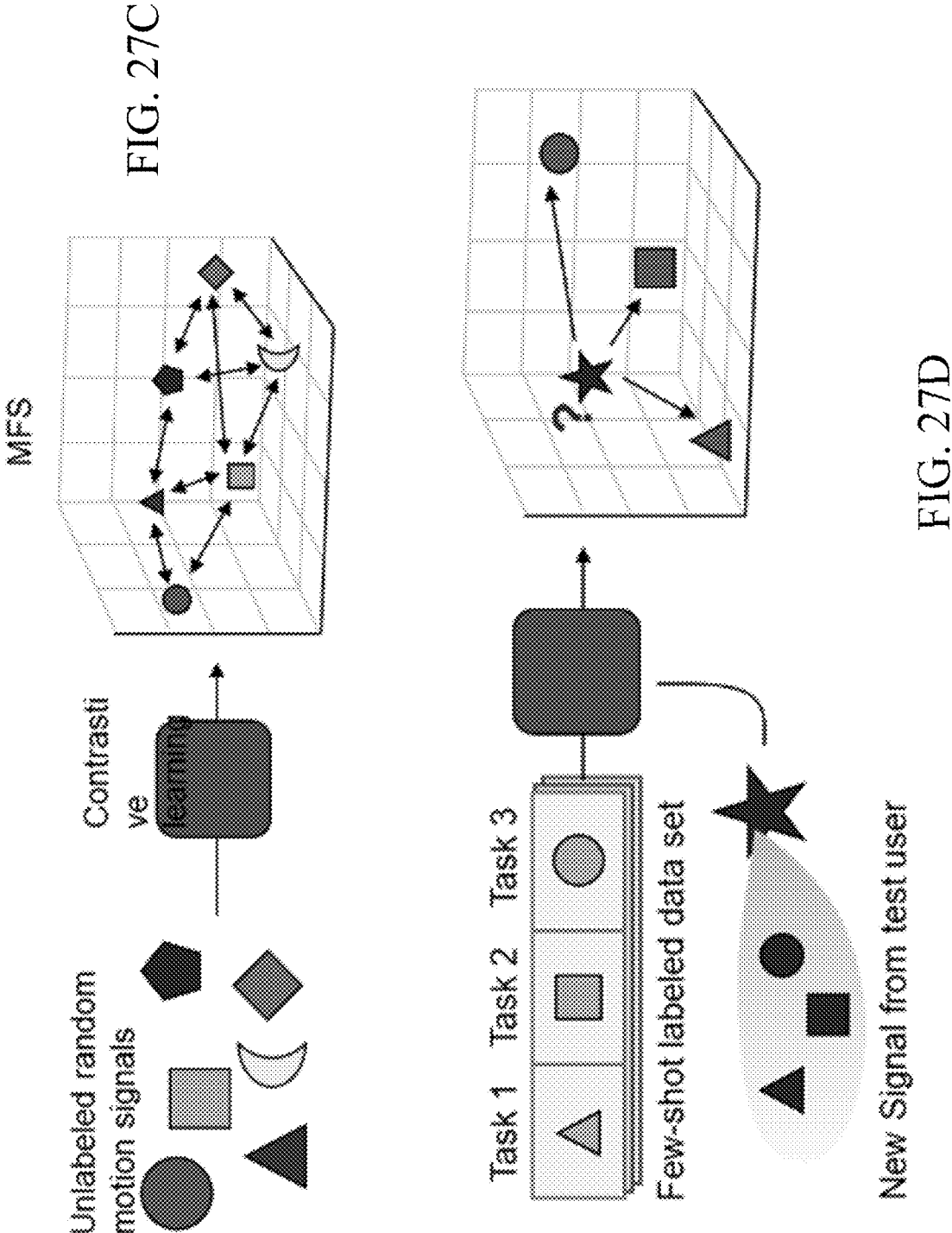

FIGS. 27A, 27B, 27C and 27D illustrate example domain differences between users and algorithmic motivations to overcome out-of-distribution problems according to certain examples of the present disclosure: FIG. 27A, Illustration of out-of-distribution for users not shown in the training dataset. Even though the test user is performing the same tasks as those of the training users, signals of the test user can show different patterns, which makes models trained with training dataset hard to identify new users' gestures. FIG. 27B, UMAP projection of embedded signals for different users typing numpad keys from 1~9, where the same gestures are mapped to different spaces for different users. FIGS. 27C-27D, This type of example architecture, according to the present disclosure, first learns how to separate different sensor signals in highly separable MFS. Given a user-specific few-shot labeled dataset, new input signals can be predicted by comparing the dataset to label data in pre-trained MFS.

FIG. 28 illustrates example predicted phase variable when inferencing different tasks according to certain examples of the present disclosure. Phase variable generated from the phase block is used to distinguish active phase from inactive phase for robust gesture inferences. The phase variable vary between 0 and 1 with different frequencies depending on performing tasks. The phase variable alters in relatively lower frequencies for hand motion and object recognition tasks compared to typing tasks that rapidly change in between active and inactive phases.

FIG. 29 provides example pseudocode for learning algorithm according to certain examples of the present disclosure: 1, TD-Learning process. 2, Transfer Learning algorithm. 3, Metric-based inference mechanism.

FIG. 30 illustrates an example schematic diagram of total learning steps according to certain examples of the present disclosure. During pretraining step, only unlabeled random data is used to learn how to encode and compare sensor signals through TD-C learning. Then with given specific user and task providing few-shot label data, the efforts transfer learn the pretrained model to adapt to user and task specific data, and embed few-shot label signals after fast adaptation. Finally, for a real time signal, signals are encoded with adapted model and perform maximum inner product search within embedded data to predict signal classes.

FIGS. 31A, 31B and 31C illustrate example performance comparison for sensor with different nanomesh density according to certain examples of the present disclosure: FIG. 31A, normalized sensor signals for skin-sensor with three different density. FIG. 31B, transfer learning accuracy for sensor with different nanomesh density within 50 transfer training epochs. FIG. 31C, A bar chart illustrating maximum accuracy within 50 transfer epochs in FIG. 31B.

FIG. 32 illustrates example average cosine similarity connections between different letters signals when typing with left and right hands. Keyboard letters having similar sensor deformation patterns show higher average cosine similarity even if the letters are placed in completely different locations within a keyboard. For example, requiring similar amounts of PIP joint bending, 'H', 'L', shows high cosine similarities while 'R' and 'D' shows low average cosine similarity since users highly bend DIP and PIP joints for typing 'D', causing significant sensor deformation.

FIG. 33 illustrates example acrylic keyboard identifier according to certain examples of the present disclosure.

FIGS. 34A, 34B and 34C illustrate example nanomesh achieving various proprioceptions according to certain examples of the present disclosure: FIG. 34A, Nanomesh measuring various joint motions, and the model decodes its location and the bending angle (10 shot bending motion for transfer training). FIG. 34B, Nanomesh measuring multimodal motions and the model decodes the multi movements of PIP & Wrist, MCP & Wrist, and PIP & MCP & Wrist movements (10 shot bending motion for transfer training). FIG. 34C, Real-time resistance variation plot of different joint motions.

FIG. 35 illustrates example substrate thickness measurement according to certain examples of the present disclosure. Substrate is peeled off from the skin and measured through profilometer.

FIG. 36 is an example image of nanomesh solutions of Ag and Ag@Au according to certain examples of the present disclosure.

FIGS. 37A and 37B respectively illustrate example few-shot labeled set and real-time test signals according to certain examples of the present disclosure.

Figure 38:
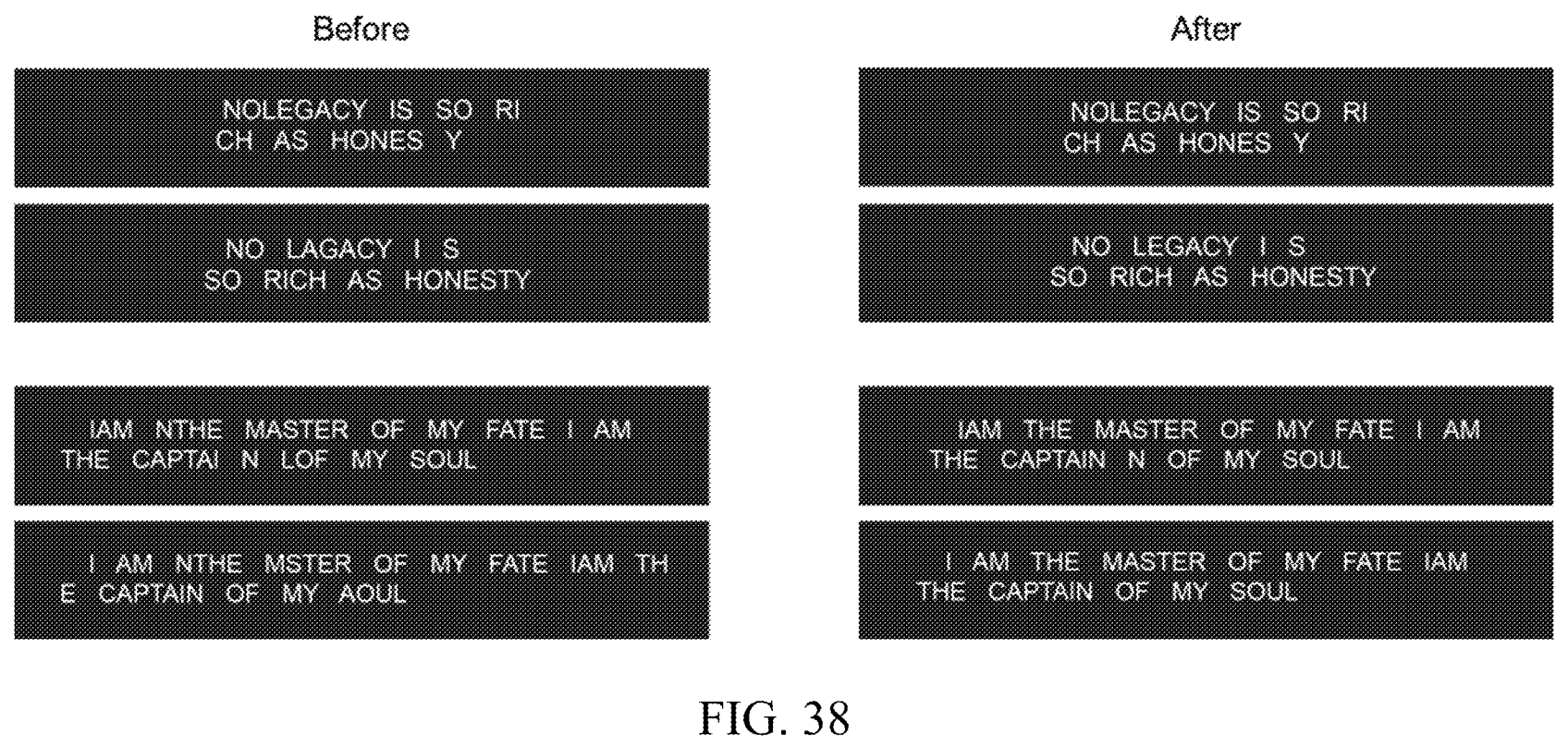

FIG. 38 illustrates example sentence correction through open-source word correction library (jamspell) according to certain examples of the present disclosure.

Supplementary Notes: As the above discussion refers to various supplementary notes for a better understanding of background and more detailed methodology/materials, following discussion sets forth such notes with some discussion in order.

Supplementary Note 1. Expending the biological essence of cutaneous receptors. Cutaneous receptors are activated by the skin stretch and are at least as sensitive to joint angle movements. Skin stretching itself can even produce movement illusions to the subject without the stimulation of muscle spindles. Especially, cutaneous receptors at the back of the hand contribute to the hand proprioception. Inspired by this phenomenon, the example developed nanomesh effectively produces proprioceptive information from measuring large area skin-stretches, and the converged signals are collected through the wireless module as illustrated in FIG. 13. As shown in FIGS. 6A-6B, random motions of multi-joint finger motions have been measured, and its motion features have been extracted by the contrastive learning architecture. This prior learned latent space which contains multi-joint information can be further fine-tuned to predict the angle, location, and multi-joint movements as shown in FIGS. 34A-34C.

Figures 14A, 14B, 14C, 14D, 14E:
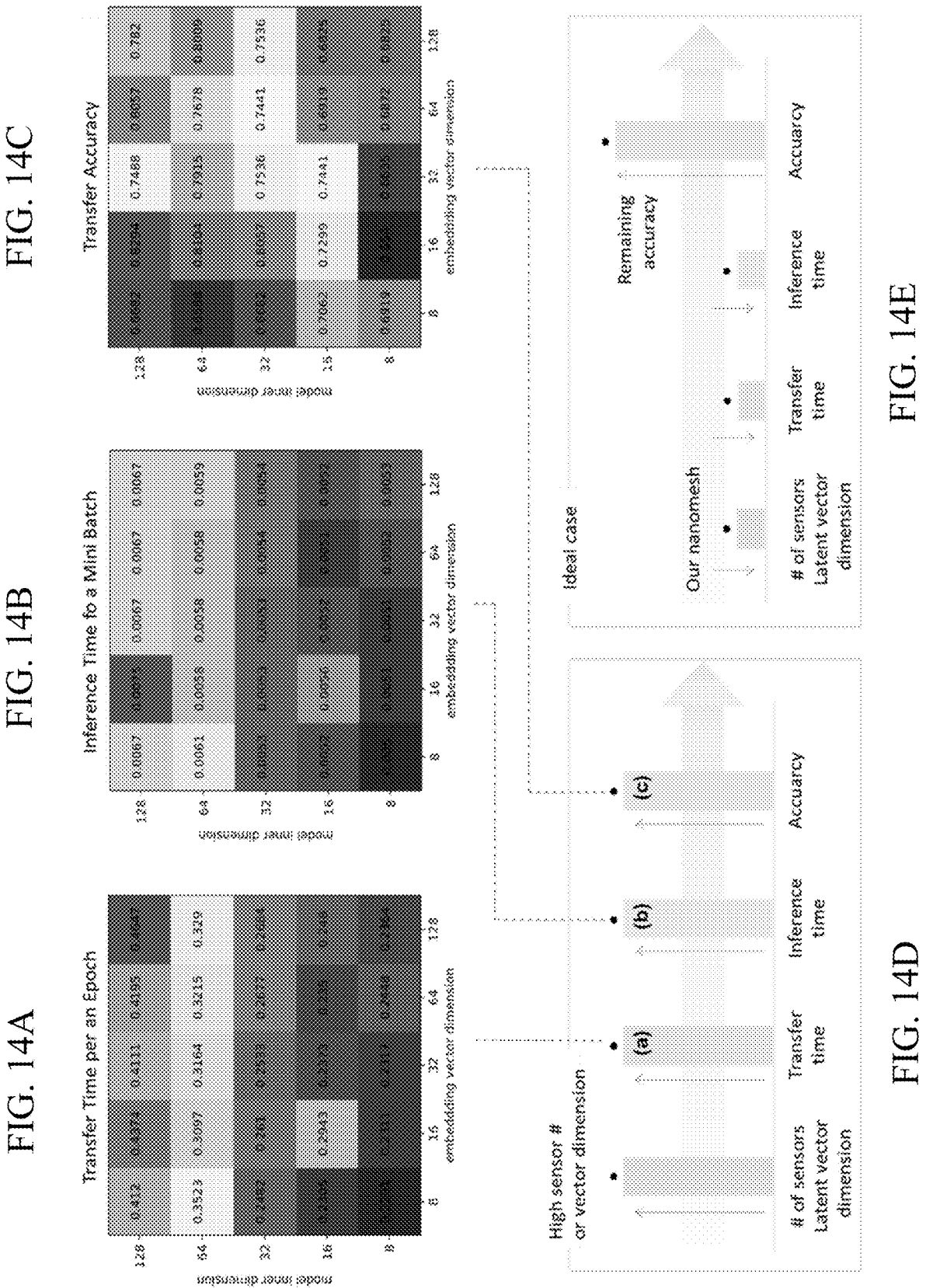

Supplementary Note 2. Effect of sensor dimensions to transfer time, inference time, and accuracy. The example learning network is composed of relatively computationally expensive networks such as a transformer encoder, and the processing time could be increased as the hyperparameter size increase (FIG. 14A). If the model is provided by high dimensional sensor signals (e.g. large number of sensors), the hyperparameter sizes should be increased to fully encode sensor behavior, resulting in high model complexity. Therefore, the network necessitates sensors that could provide low-dimensional data with high values of proprioceptive information, which the example substrate-less nanomesh fits this requirement. To investigate how sensor input dimensions affect learning network, further experiments were conducted for finding the correlation between latent vector dimension and the model performance, inference time, and transfer learning time.

As shown in FIG. 14A, higher accuracy of the model can be observed while increasing the inner hyperparameter dimension (Transformer's self-attention module) from 8 to 128. Pursuing higher number of sensors following with large data dimension would increase the accuracy, but unfortunately, it would also bring larger transfer learning time (FIG.

14B) and inferencing time (FIG. 14C) as shown in FIG. 14D. Therefore, in order to reduce computation cost while maintaining the accuracy, it is important to have highly informative sensor signals that contain condensed information of multiple joint movements (FIG. 14E).

Supplementary Note 3. Factors for maintaining skin conformability. In order to study skin conformability, an energy minimization method of the surfaces can be adopted. Total energy of the system consists of three energies $$U\_total\text{-}U\_bending\text{+}U\_membrane\text{+}U\_adhesion$$

where U_bending is bending energy, U_membrane is membrane energy, and U_adhesion is interface adhesion energy. For conformal contacts, the energy of the conformal system should be lower than the unconformable state (which the energy is 0). Assuming that the skin morphology is a sinusoidal form, the approximate condition for the inherent contact can be expressed as:

$$(\pi E\_skin\ h\_rough)/(\gamma\_m\lambda\_rough)\text{-}\llbracket E\_skin\ \lambda\_rough$$
$$\rrbracket\ \hat{}\ 2/(\pi\hat{}2(\llbracket EI\rrbracket\_m))\text{-}16{<}0$$

where E_skin, h_rough, λ_rough, γ_m, $\llbracket EI \rrbracket$ m are modulus of skin, skin roughness amplitude, skin roughness wavelength, work of adhesion, and effective bending stiffness of the membrane, respectively. The morphology of the skin is set as previously reported (e.g., λ_rough≈140 μm and h_rough≈100 μm), and the work of adhesion can be approximated as ~0.2 N/m, then the (important or sometimes critical) membrane thickness of the nanomesh can be evaluated as ~128 μm. As a result, such an example experimental system has high conformability since, in various examples according to the present disclosure, the nanomesh thickness is in a large range that is significantly more than such an important or critical thickness (as specific examples according to the present disclosure: more than a magnitude of order smaller, more than two magnitudes smaller, more than two-and-one-half magnitudes smaller, and more than approximately three orders of magnitude smaller, than such an important or critical thickness).

Supplementary Note 4. Stability from various environmental noise. To verify that the model performs well in various external conditions, the model performance is checked in higher temperatures and immersed in water as demonstrated above (e.g., in the previous answer). Furthermore, the model performance is checked at different arm angles. For example, the arm was rotated for 0, 30, 60, 90 degrees and bent PIP, MCP and wrist for five each to collect transfer learning and data, and model accuracy was tested for bending PIP, MCP, wrist on 0, 30, 60, 90 degree arm rotation (FIG. 15D). Under various conditions, testing was performed to ascertain that the model can differentiate different finger joint movements, and as shown in FIGS. 15A-15E, it was shown that the example system can robustly classify different joint motions even under the various external conditions.

Supplementary Note 5. Model Performance on various time window size. To verify correlation between time window size and model performance, such experimentation according to the present disclosure prepared different modeling/models pretrained with various window sizes from 4 to 64. With the same unlabeled random motion data, this experimentation prepared 5 pretrained model trained with input window of size 4, 8, 16, 32, 64 respectively. To verify model transfer accuracy, experimental examples/work according to the present disclosure prepared three different datasets, object recognition, numpad typing, and hand command, which consists of 5-shot demonstrations of transfer train dataset and labeled transfer test dataset for accuracy measurement. FIGS. 16A-16B illustrates the average number of signal frames for beginning and ending a certain class gesture in different tasks, and their model transfer accuracy for models trained with various window sizes. Models trained with 32 window size outperformed models trained with other window sizes. In particular for the numpad typing dataset, the model trained for 64 window size showed a huge decrease in performance. Since it takes relatively short (25 frames) time frames for typing a key, signals of previously typed keys are included in size 64 windows. As a result, the model learns spurious correlation and shows low performance in actual testing time.

Accordingly, many different types of processes and devices involving a substrate-less nanomesh may be advantaged by such aspects, the above aspects and examples as well as others (including the related examples in the above-identified U.S. Provisional Application).

It is recognized and appreciated that as specific examples, the above-characterized figures and discussion are provided to help illustrate certain aspects (and advantages in some instances) which may be used in the manufacture of such structures and devices. These structures and devices include the exemplary structures and devices described in connection with each of the figures as well as other devices, as each such described embodiment has one or more related aspects which may be modified and/or combined with the other such devices and examples as described hereinabove may also be found in the Appendix of the above-referenced Provisional Application.

The skilled artisan would also recognize various terminology as used in the present disclosure by way of their plain meaning. As examples, the term 'multitude' (e.g., in the context of strands included in a nanomesh material) refers to a number in a range from about 25-100 nm at the low boundary to a number, at the high boundary, that is very large. For example, the large number might be limited by a density and/or thickness limitation for a given application (e.g., so many strands that the thickness of the nanomesh might be wieldy (e.g., thereby interfering with a desired level of porousness to enable breathability, and/or inhibiting flexibility of the user portion, increasing the number of strands does not add anything in terms of functionality). In some examples according to the present disclosure, such thicknesses may be exceeded (without regard to such important or critical thickness) with the number being so large that conductance-related information provided by the user's movements is redundant and thus causing the number of strands to be increased beyond a measurable value. In other examples, the term multitude is characterized or set by a range in the number of strands defined as a function of: an (average) thickness of the nanomesh (e.g., less than 1 micron with a given region or feature area under observation for a change of conductance), wherein for certain densities, this number may range from 25-1000; the average thickness of the strands (e.g., 20-100 nm). In certain more-detailed and/or experimental examples, the quantity corresponding to a multitude of strands in the nanomesh was roughly defined by the density of the nanomesh and in such instances, the density is in a range of #100/mm²-#1000/mm².

Also, the Specification may describe and/or illustrates aspects useful for implementing the examples by way of various semiconductor materials/circuits which may be illustrated as or using terms such as layers, blocks, modules, device, system, unit, controller, and/or other circuit-type depictions. Also, in connection with such descriptions, the term "conductive strands" may refer to materials that are semi-conductive and/or that are at least somewhat conductive and have other electrical properties useful for carrying out the sensing and/or training which may be involved. Such semiconductor and/or semiconductive materials (including portions of semiconductor structure) and circuit elements and/or related circuitry may be used together with other elements to exemplify how certain examples may be carried out in the form or structures, steps, functions, operations, activities, etc.

It would also be appreciated that terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner. Further, the adjective "example" unless otherwise indicated refers to aspects and efforts according to the present disclosure, and articles such as "a" or "an" (e.g., "a" and/or "an") refers to "at least one" or "one or more", and the term "and/or" as in A and/or B, should be understood to contemplate the possibilities of including one of the terms, either of the terms, or both terms. Also, unless otherwise noted, the use of the words "approximate," "about," "around," "substantially," etc., mean plus or minus ten percent.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed:

1. An apparatus comprising:
a nanomesh, including a sensing circuit and a multitude of conductive strands connected to the sensing circuit, to be directly applied in a substrate-less form to secure to a tissue of a user without a substrate between the sensing circuit and the tissue; and
the multitude of conductive strands formable on, and to conform to, the tissue and, in response to movement of the tissue, to
stretch and unstretch, and
generate signals, via the conductive strands, indicative of the movement of the tissue while the nanomesh is secured to the tissue.

2. The apparatus of claim 1, further including the sensing circuit, and wherein the tissue corresponds to skin of the user.

3. The apparatus of claim 1, including the sensing circuit and further including current sourcing circuitry to cause current to flow in the conductive strands, and wherein the sensing circuit is to detect, in response to the generated signals indicative of the movement of the tissue, variations of resistance, or conductance, manifested in the conductive strands.

4. The apparatus of claim 1, further including: the sensing circuit and a wireless signal transmitter to wirelessly send the signals, as generated via the conductive strands, to a remotely-located computing data processor circuit.

5. The apparatus of claim 1, further including a computing data processor circuit to sense, in response to the signals generated via the conductive strands, the movement of the tissue.

6. The apparatus of claim 1, further including a computing data processor circuit to recognize different proprioception patterns, in response to the signals generated via the conductive strands, and in response sensing different types of the movement of the tissue.

7. The apparatus of claim 1, further including a porous protective coating covering the multitude of conductive strands.

8. The apparatus of claim 1, further including:

a computing data processor circuit to sense and autonomously learn, in response to the signals generated via the conductive strands, the movement of the tissue, and the sensing circuit, wherein the computing data processor circuit, the nanomesh and the sensing circuit are cooperatively configured as a substrate-less artificial mechanoreceptor equipped with meta-learning.

9. The apparatus of claim 1, further including:

a computing data processor circuit to sense, in response to the signals generated via the conductive strands, the movement of the tissue, and the sensing circuit, wherein the computing data processor circuit, the nanomesh and the sensing circuit are cooperatively configured to recognize position and bending angle of a joint of the user.

10. The apparatus of claim 1, further including:

a computing data processor circuit to sense, in response to the signals generated via the conductive strands, the movement of the tissue, and the sensing circuit, wherein the computing data processor circuit, the nanomesh and the sensing circuit are cooperatively configured to recognize an active phase of one or more motion-based gestures of the user.

11. The apparatus of claim 1, further including:

a computing data processor circuit to sense, in response to the signals generated via the conductive strands, the movement of the tissue, and the sensing circuit, wherein the computing data processor circuit, the nanomesh and the sensing circuit are cooperatively configured to discern or predict one or more different types of motion-based gestures of the user.

12. The apparatus of claim 1, wherein the conductive strands have a material composition that includes a biocompatible conductive material.

13. The apparatus of claim 1, wherein the nanomesh, including the multitude of conductive strands, is to be directly applied in a substrate-less form to the tissue without a substrate as an interface between the nanomesh and the tissue.

14. The apparatus of claim 1, wherein the substrate-less form is a liquid form.

15. A method comprising:

directly applying a nanomesh in a substrate-less form, including a sensing circuit and a multitude of conductive strands being connected to the sensing circuit, to a tissue of a user without a substrate between the sensing circuit and the tissue and causing the multitude of conductive strands to conform to the tissue; and generating output signals, in response to movement of the tissue and to the multitude of conductive strands stretching and unstretching, to indicate the movement of the tissue while the nanomesh is secured to or against the tissue.

16. The method of claim 15, wherein the nanomesh, including the multitude of conductive strands, is to be directly applied in a substrate-less form to the tissue without a substrate as an interface between the nanomesh and the tissue.

17. The method of claim 15, including using a porous protective coating covering the multitude of conductive strands, the porous protective coating being breathable, or venting heat from the user while secured to or against the tissue.

18. The method of claim 15, wherein the tissue is skin of the user over and/or immediately adjacent a joint of the user.

19. The method of claim 15, wherein the substrate-less form is a liquid form, and further including training a logic circuit to interpret motions of the user based on changes in the nanomesh's conductance during the motions.

20. A method comprising:

forming a nanomesh, including a sensing circuit and a multitude of conductive strands being connected to the sensing circuit, for direct application in a substrate-less form to secure to a tissue of a user without a substrate between the sensing circuit and the tissue, wherein the nanomesh is to conform to the tissue; and generating output signals, in response to movement of the tissue and to the multitude of conductive strands stretching and unstretching, to indicate movement of the tissue while the nanomesh is secured to or against the tissue.

* * * * *